12) United States Patent
Rathi et al.

(10) Patent No.: US 11,907,887 B2
(45) Date of Patent: Feb. 20, 2024

(54) METHODS AND APPARATUS FOR UNATTENDED DELIVERIES

(71) Applicant: Nuro, Inc., Mountain View, CA (US)

(72) Inventors: Benjamin Bhanu Rathi, Novi, MI (US); Robert Irving Luan, San Jose, CA (US)

(73) Assignee: Nuro, Inc., Mountain View, CA (US)

( * ) Notice: Subject to any disclaimer, the term of this patent is extended or adjusted under 35 U.S.C. 154(b) by 0 days.

(21) Appl. No.: 17/197,275

(22) Filed: Mar. 10, 2021

(65) Prior Publication Data

US 2021/0295242 A1 Sep. 23, 2021

Related U.S. Application Data

(60) Provisional application No. 62/993,551, filed on Mar. 23, 2020.

(51) Int. Cl.
*G06Q 10/083* (2023.01)

(52) U.S. Cl.
CPC ................................ *G06Q 10/083* (2013.01)

(58) Field of Classification Search
None
See application file for complete search history.

(56) References Cited

U.S. PATENT DOCUMENTS

| | | |
|---|---|---|
| 3,064,252 A | 11/1962 | Varela |
| 4,138,504 A | 2/1979 | Mack |
| 4,527,158 A | 7/1985 | Runnels |
| 4,766,548 A | 8/1988 | Cedrone et al. |

(Continued)

FOREIGN PATENT DOCUMENTS

| | | |
|---|---|---|
| CN | 107609529 A | 1/2018 |
| DE | 102013208348 A1 | 11/2014 |

(Continued)

OTHER PUBLICATIONS

Curtis, Sophie; Skype founders invent self-driving robot that can deliver groceries for £1; Nov. 2015; https://www.telegraph.co.uk/techn ology/news/11962566/Skype-fou nd ers-invent-self-d riving-robot-that-can-d eliver-groceries-for-1 . html (Year: 2015).*
Ren, Zhile, et al. "Three-dimensional object detection and layout prediction using clouds of oriented gradients," Proceedings of the IEEE Conference on Computer Vision and Pattern Recognition, pp. 1525-1533 (2016).

(Continued)

*Primary Examiner* — Omar Zeroual
*Assistant Examiner* — Duane N. Moore

(57) ABSTRACT

According to one aspect, a method includes propelling a vehicle to a location. The vehicle includes at least one compartment configured to contain at least one delivery item and at least one transfer mechanism, the transfer mechanism arranged to be activated to cause the delivery item to be purged from the at least one compartment. The method also includes determining when the vehicle is authorized to deliver the delivery item at the location, aligning the vehicle with respect to a target at the location, opening a door to the at least one compartment, and activating the transfer mechanism after opening the door. Activating the transfer mechanism includes causing the transfer mechanism to purge the delivery item such that the delivery item is obtained by the target. The target is arranged to receive the delivery item when the delivery item is purged from the at least one compartment.

19 Claims, 39 Drawing Sheets

(56) References Cited

U.S. PATENT DOCUMENTS

| | | |
|---|---|---|
| 4,777,416 A | 10/1988 | George, II et al. |
| 4,952,911 A | 8/1990 | D'Ambrosia et al. |
| 5,128,861 A | 7/1992 | Kagami et al. |
| 5,179,843 A | 1/1993 | Cohausz |
| 5,204,814 A | 4/1993 | Noonan et al. |
| 5,207,784 A | 5/1993 | Schwartzendruber |
| 5,377,106 A | 12/1994 | Drunk et al. |
| 5,510,763 A | 4/1996 | Deckard et al. |
| 5,636,122 A | 6/1997 | Shah et al. |
| 5,844,808 A | 12/1998 | Konsmo et al. |
| 5,877,688 A | 3/1999 | Morinaka et al. |
| D411,814 S | 7/1999 | Chibuka et al. |
| 5,922,040 A | 7/1999 | Prabhakaran |
| 6,021,394 A | 2/2000 | Takahashi |
| 6,034,803 A | 3/2000 | Sullivan et al. |
| 6,151,539 A | 11/2000 | Bergholz et al. |
| 6,170,242 B1 | 1/2001 | Gordon |
| 6,181,981 B1 | 1/2001 | Varga et al. |
| 6,230,150 B1 | 5/2001 | Walker et al. |
| 6,323,941 B1 | 11/2001 | Evans et al. |
| 6,411,202 B1 | 6/2002 | Gal et al. |
| 6,556,598 B1 | 4/2003 | Angott |
| 6,571,150 B2 | 5/2003 | Arai et al. |
| 6,598,692 B2 | 7/2003 | Angott |
| 6,600,981 B2 | 7/2003 | Ruffner |
| 6,609,101 B1 | 8/2003 | Landvater |
| 6,636,598 B1 | 10/2003 | Thomson et al. |
| 6,857,073 B2 | 2/2005 | French et al. |
| 7,030,968 B2 | 4/2006 | D'Aligny et al. |
| 7,036,844 B2 | 5/2006 | Hammer et al. |
| 7,051,539 B2 | 5/2006 | Junge et al. |
| 7,139,721 B2 | 11/2006 | Borders et al. |
| 7,177,825 B1 | 2/2007 | Borders et al. |
| 7,190,465 B2 | 3/2007 | Froehlich et al. |
| 7,227,116 B2 | 6/2007 | Gleckler et al. |
| 7,281,891 B2 | 10/2007 | Smith et al. |
| 7,521,935 B2 | 4/2009 | Uchida |
| 7,534,984 B2 | 5/2009 | Gleckler |
| 7,676,404 B2 | 3/2010 | Richard et al. |
| D615,905 S | 5/2010 | Arnell |
| 7,798,885 B2 | 9/2010 | Wong et al. |
| 7,798,886 B1 | 9/2010 | Williamson |
| 7,944,548 B2 | 5/2011 | Eaton |
| 8,072,581 B1 | 12/2011 | Breiholz |
| 8,113,421 B2 | 2/2012 | Yepez et al. |
| 8,191,779 B2 | 6/2012 | Illingworth et al. |
| 8,326,707 B2 | 12/2012 | Fan et al. |
| 8,528,685 B2 | 9/2013 | Scherbring et al. |
| 8,579,055 B2 | 11/2013 | Sasahara et al. |
| 8,630,897 B1 | 1/2014 | Prada Gomez et al. |
| 8,675,184 B2 | 3/2014 | Schmitt et al. |
| 8,744,642 B2 | 6/2014 | Nemat-Nasser et al. |
| 8,788,341 B1 | 7/2014 | Patel et al. |
| 8,836,922 B1 | 9/2014 | Pennecot et al. |
| 8,862,388 B2 | 10/2014 | Wu et al. |
| 8,989,053 B1 | 3/2015 | Skaaksrud et al. |
| 8,996,224 B1 | 3/2015 | Herbach et al. |
| 9,008,890 B1 | 4/2015 | Herbach et al. |
| 9,043,012 B2 | 5/2015 | Davey et al. |
| D734,211 S | 7/2015 | Ahn et al. |
| 9,086,273 B1 | 7/2015 | Gruver et al. |
| 9,147,192 B2 | 9/2015 | Dawson et al. |
| 9,230,236 B2 | 1/2016 | Villamar |
| 9,256,852 B1 | 2/2016 | Myllymaki |
| 9,292,889 B2 | 3/2016 | Garden |
| 9,307,383 B1 | 4/2016 | Patrick |
| D755,673 S | 5/2016 | Ahn et al. |
| 9,381,890 B2 | 7/2016 | Lee et al. |
| 9,383,753 B1 | 7/2016 | Templeton et al. |
| 9,488,984 B1 | 11/2016 | Williams et al. |
| 9,489,490 B1 | 11/2016 | Theobald |
| 9,494,439 B1 | 11/2016 | Ross et al. |
| 9,494,935 B2 | 11/2016 | Okumura et al. |
| 9,507,346 B1 | 11/2016 | Levinson et al. |
| 9,547,945 B2 | 1/2017 | McCabe et al. |
| 9,552,564 B1 | 1/2017 | Martenis |
| 9,561,941 B1 | 2/2017 | Watts et al. |
| 9,599,477 B1 | 3/2017 | Aula et al. |
| 9,613,346 B2 | 4/2017 | Crow et al. |
| 9,619,723 B1 | 4/2017 | Chow et al. |
| 9,637,310 B1 * | 5/2017 | Zou ................ B65G 43/10 |
| 9,672,734 B1 | 6/2017 | Ratnasingam |
| 9,684,914 B1 | 6/2017 | Porter et al. |
| 9,731,896 B2 | 8/2017 | Elazary et al. |
| 9,741,010 B1 | 8/2017 | Heinla |
| 9,786,187 B1 | 10/2017 | Bar-Zeev et al. |
| 9,796,529 B1 | 10/2017 | Hoareau et al. |
| 9,802,568 B1 | 10/2017 | Larner |
| 9,811,848 B2 | 11/2017 | Reuss et al. |
| 9,815,633 B1 | 11/2017 | Kisser et al. |
| 9,824,394 B1 | 11/2017 | Boates et al. |
| 9,898,884 B1 | 2/2018 | Arora et al. |
| 9,905,133 B1 | 2/2018 | Kumar et al. |
| 9,916,557 B1 | 3/2018 | Gillen et al. |
| 9,916,703 B2 | 3/2018 | Levinson et al. |
| 9,984,525 B2 | 5/2018 | Will et al. |
| 10,005,609 B1 | 6/2018 | Biene et al. |
| 10,029,787 B1 | 7/2018 | Lesser et al. |
| 10,120,384 B2 | 11/2018 | Wilkinson et al. |
| 10,130,232 B2 | 11/2018 | Atchley et al. |
| 10,140,587 B2 | 11/2018 | Garden |
| 10,198,707 B1 | 2/2019 | Bolton et al. |
| 10,248,120 B1 | 4/2019 | Siegel et al. |
| 10,286,558 B1 | 5/2019 | Asada et al. |
| 10,303,171 B1 | 5/2019 | Brady et al. |
| 10,317,119 B2 | 6/2019 | Zou |
| 10,380,534 B2 | 8/2019 | Khasis |
| 10,403,155 B2 | 9/2019 | Kimchi et al. |
| 10,414,344 B1 | 9/2019 | Northcott et al. |
| 10,497,161 B1 | 12/2019 | Jones et al. |
| 10,514,690 B1 | 12/2019 | Siegel et al. |
| 2002/0023594 A1 | 2/2002 | Greene |
| 2002/0048624 A1 | 4/2002 | Blanchet et al. |
| 2003/0056481 A1 | 3/2003 | Trefz |
| 2003/0195788 A1 | 10/2003 | Loeb et al. |
| 2003/0204445 A1 | 10/2003 | Vishik |
| 2003/0209375 A1 | 11/2003 | Suzuki et al. |
| 2003/0236723 A1 | 12/2003 | Angott |
| 2004/0074688 A1 | 4/2004 | Hashimoto et al. |
| 2004/0093650 A1 | 5/2004 | Martins et al. |
| 2004/0172260 A1 | 9/2004 | Junger et al. |
| 2004/0181570 A1 | 9/2004 | Kaneko |
| 2004/0216339 A1 | 11/2004 | Garberg et al. |
| 2004/0225954 A1 | 11/2004 | Maloney |
| 2005/0043011 A1 | 2/2005 | Murray et al. |
| 2005/0060246 A1 | 3/2005 | Lastinger et al. |
| 2006/0059880 A1 | 3/2006 | Angott |
| 2006/0106490 A1 | 5/2006 | Howell et al. |
| 2007/0050082 A1 | 3/2007 | Yoshizaki |
| 2007/0182818 A1 | 8/2007 | Buehler |
| 2007/0235465 A1 | 10/2007 | Walker et al. |
| 2008/0004967 A1 | 1/2008 | Gillen |
| 2008/0086241 A1 | 4/2008 | Philipps et al. |
| 2008/0167817 A1 | 7/2008 | Hessler et al. |
| 2009/0111910 A1 | 4/2009 | Gimvang |
| 2009/0183478 A1 | 7/2009 | Bernini |
| 2009/0242308 A1 | 10/2009 | Kitte et al. |
| 2010/0006127 A1 | 1/2010 | Van den Berg |
| 2010/0036717 A1 | 2/2010 | Trest |
| 2010/0082447 A1 | 4/2010 | Lin et al. |
| 2010/0084426 A1 | 4/2010 | Devers et al. |
| 2010/0088175 A1 | 4/2010 | Lundquist |
| 2010/0100241 A1 | 4/2010 | Jarisch et al. |
| 2010/0219953 A1 | 9/2010 | Bloy |
| 2010/0228405 A1 | 9/2010 | Morgal et al. |
| 2010/0234991 A1 | 9/2010 | Zini et al. |
| 2010/0268380 A1 | 10/2010 | Waugh et al. |
| 2010/0301056 A1 | 12/2010 | Wolfe |
| 2011/0031381 A1 | 2/2011 | Tay et al. |
| 2011/0054689 A1 | 3/2011 | Nielsen et al. |
| 2011/0130134 A1 | 6/2011 | Van Rysselberghe |
| 2011/0135189 A1 | 6/2011 | Lee |
| 2011/0246328 A1 | 10/2011 | Dunwoody et al. |
| 2011/0313811 A1 | 12/2011 | Urban et al. |

(56) References Cited

U.S. PATENT DOCUMENTS

| | | |
|---|---|---|
| 2012/0059729 A1 | 3/2012 | Roa et al. |
| 2012/0078553 A1 | 3/2012 | Kuroda et al. |
| 2012/0116577 A1 | 5/2012 | Ottomanelli |
| 2012/0173747 A1 | 7/2012 | Roesch et al. |
| 2012/0185130 A1 | 7/2012 | Ekchian et al. |
| 2012/0239224 A1 | 9/2012 | McCabe et al. |
| 2013/0061044 A1 | 3/2013 | Pinkus et al. |
| 2013/0119681 A1 | 5/2013 | Mendis et al. |
| 2013/0210462 A1 | 8/2013 | Busch |
| 2013/0282472 A1 | 10/2013 | Penilla et al. |
| 2013/0282844 A1 | 10/2013 | Logan et al. |
| 2013/0307698 A1 | 11/2013 | Park et al. |
| 2013/0317680 A1 | 11/2013 | Yamamura et al. |
| 2014/0021232 A1 | 1/2014 | Lazarevich et al. |
| 2014/0021690 A1 | 1/2014 | Burd |
| 2014/0022051 A1 | 1/2014 | Levien et al. |
| 2014/0032033 A1 | 1/2014 | Einecke et al. |
| 2014/0080670 A1 | 3/2014 | Elder et al. |
| 2014/0081445 A1 | 3/2014 | Villamar |
| 2014/0087126 A1 | 3/2014 | Quaderer |
| 2014/0095350 A1 | 4/2014 | Carr et al. |
| 2014/0104379 A1 | 4/2014 | Glasgow |
| 2014/0136414 A1 | 5/2014 | Abhyanker |
| 2014/0209634 A1 | 7/2014 | Metropulos et al. |
| 2014/0254896 A1 | 9/2014 | Zhou et al. |
| 2014/0279668 A1 | 9/2014 | Lievens et al. |
| 2014/0316561 A1 | 10/2014 | Tkachenko et al. |
| 2014/0330456 A1 | 11/2014 | Lopez Morales et al. |
| 2014/0330739 A1 | 11/2014 | Falcone et al. |
| 2014/0344608 A1 | 11/2014 | Wang et al. |
| 2014/0350952 A1 | 11/2014 | Utech et al. |
| 2014/0358353 A1 | 12/2014 | Ibanez-Guzman et al. |
| 2014/0370167 A1 | 12/2014 | Garden |
| 2014/0380264 A1 | 12/2014 | Misra et al. |
| 2015/0000994 A1 | 1/2015 | McLundie |
| 2015/0006005 A1 | 1/2015 | Yu et al. |
| 2015/0120094 A1 | 4/2015 | Kimchi et al. |
| 2015/0120602 A1 | 4/2015 | Huffman |
| 2015/0134546 A1 | 5/2015 | Penilla et al. |
| 2015/0137492 A1 | 5/2015 | Rao et al. |
| 2015/0149015 A1 | 5/2015 | Nakano et al. |
| 2015/0154538 A1 | 6/2015 | Skaaksrud |
| 2015/0170099 A1 | 6/2015 | Beach-Drummond |
| 2015/0170550 A1 | 6/2015 | Jubro et al. |
| 2015/0198936 A1 | 7/2015 | McGee et al. |
| 2015/0202770 A1 | 7/2015 | Patron et al. |
| 2015/0235304 A1 | 8/2015 | Vincent |
| 2015/0242922 A1 | 8/2015 | Zamer |
| 2015/0302495 A1 | 10/2015 | Stuckman et al. |
| 2015/0317596 A1 | 11/2015 | Hejazi |
| 2015/0323932 A1 | 11/2015 | Paduano et al. |
| 2015/0336524 A1 | 11/2015 | Larner et al. |
| 2015/0348112 A1 | 12/2015 | Ramanujam |
| 2015/0356501 A1 | 12/2015 | Gorjestani |
| 2015/0367799 A1 | 12/2015 | Le et al. |
| 2016/0018224 A1 | 1/2016 | Isler et al. |
| 2016/0027307 A1 | 1/2016 | Abhyanker et al. |
| 2016/0033966 A1 | 2/2016 | Farris et al. |
| 2016/0062583 A1 | 3/2016 | Ricci |
| 2016/0071052 A1 | 3/2016 | Henry et al. |
| 2016/0098670 A1 | 4/2016 | Oz et al. |
| 2016/0098871 A1 | 4/2016 | Oz et al. |
| 2016/0129907 A1 | 5/2016 | Kim et al. |
| 2016/0187150 A1 | 6/2016 | Sherman et al. |
| 2016/0207495 A1 | 7/2016 | Le et al. |
| 2016/0239798 A1 | 8/2016 | Borley et al. |
| 2016/0247109 A1 | 8/2016 | Scicluna et al. |
| 2016/0264087 A1 | 9/2016 | Ohmura |
| 2016/0286627 A1 | 9/2016 | Chen |
| 2016/0300187 A1 | 10/2016 | Kashi et al. |
| 2016/0304281 A1 | 10/2016 | Elazary et al. |
| 2016/0328754 A1 | 11/2016 | Gold et al. |
| 2016/0334229 A1 | 11/2016 | Ross et al. |
| 2016/0334797 A1 | 11/2016 | Ross et al. |
| 2016/0350601 A1 | 12/2016 | Grauer et al. |
| 2016/0357187 A1 | 12/2016 | Ansari |
| 2016/0357188 A1 | 12/2016 | Ansari |
| 2016/0358477 A1 | 12/2016 | Ansari |
| 2016/0363991 A1 | 12/2016 | Schlecht et al. |
| 2017/0011449 A1 | 1/2017 | Mueller et al. |
| 2017/0011580 A1 | 1/2017 | Huang et al. |
| 2017/0046773 A1 | 2/2017 | Hendricks, II et al. |
| 2017/0057516 A1 | 3/2017 | Gordon et al. |
| 2017/0075355 A1 | 3/2017 | Micks et al. |
| 2017/0090480 A1 | 3/2017 | Ho et al. |
| 2017/0091856 A1 | 3/2017 | Canberk |
| 2017/0101055 A1 | 4/2017 | Alfaro Fonseca |
| 2017/0110017 A1 | 4/2017 | Kimchi et al. |
| 2017/0113641 A1 | 4/2017 | Thieberger et al. |
| 2017/0115125 A1 | 4/2017 | Outwater et al. |
| 2017/0123421 A1 | 5/2017 | Kentley et al. |
| 2017/0123429 A1 | 5/2017 | Levinson |
| 2017/0124511 A1 | 5/2017 | Mueller et al. |
| 2017/0124547 A1 | 5/2017 | Natarajan et al. |
| 2017/0124781 A1 | 5/2017 | Douillard et al. |
| 2017/0132565 A1 | 5/2017 | Beadles et al. |
| 2017/0132934 A1 | 5/2017 | Kentley et al. |
| 2017/0132960 A1 | 5/2017 | Kis-Benedek Pinero |
| 2017/0153714 A1 | 6/2017 | Gao et al. |
| 2017/0154371 A1 | 6/2017 | Harvey |
| 2017/0154483 A1 | 6/2017 | Cordiner et al. |
| 2017/0174343 A1 | 6/2017 | Erickson et al. |
| 2017/0192426 A1 | 7/2017 | Rust |
| 2017/0193434 A1 | 7/2017 | Shah et al. |
| 2017/0197626 A1 | 7/2017 | Jammoussi et al. |
| 2017/0213165 A1 | 7/2017 | Stauffer et al. |
| 2017/0227962 A1 | 8/2017 | Cesarano et al. |
| 2017/0236092 A1 | 8/2017 | High et al. |
| 2017/0248964 A1 | 8/2017 | Kentley et al. |
| 2017/0255198 A1 | 9/2017 | Rodriguez |
| 2017/0261977 A1 | 9/2017 | High et al. |
| 2017/0262790 A1 | 9/2017 | Khasis |
| 2017/0282859 A1 | 10/2017 | Grimm et al. |
| 2017/0286892 A1 | 10/2017 | Studnicka |
| 2017/0313421 A1 | 11/2017 | Gil |
| 2017/0313514 A1 | 11/2017 | Lert, Jr. et al. |
| 2017/0323253 A1 | 11/2017 | Enssle et al. |
| 2018/0024554 A1 | 1/2018 | Brady et al. |
| 2018/0025635 A1 | 1/2018 | Cheaz et al. |
| 2018/0033235 A1 | 2/2018 | Dotterweich et al. |
| 2018/0033308 A1 | 2/2018 | Litkouhi et al. |
| 2018/0050698 A1 | 2/2018 | Polisson et al. |
| 2018/0053147 A1 | 2/2018 | Zhang et al. |
| 2018/0053369 A1 | 2/2018 | High et al. |
| 2018/0053423 A1 | 2/2018 | Dacosta et al. |
| 2018/0058739 A1 | 3/2018 | Zou |
| 2018/0058864 A1 | 3/2018 | Lection et al. |
| 2018/0061162 A1 | 3/2018 | High et al. |
| 2018/0068253 A1 | 3/2018 | Simms et al. |
| 2018/0082343 A1 | 3/2018 | Gordon et al. |
| 2018/0096270 A1 | 4/2018 | High et al. |
| 2018/0099602 A1 | 4/2018 | Salter et al. |
| 2018/0101818 A1 | 4/2018 | Simms et al. |
| 2018/0114076 A1 | 4/2018 | Miller et al. |
| 2018/0118462 A1 | 5/2018 | Zevenbergen |
| 2018/0134200 A1 | 5/2018 | Wilkinson et al. |
| 2018/0137454 A1 | 5/2018 | Kulkarni et al. |
| 2018/0144300 A1 | 5/2018 | Wiechers |
| 2018/0144302 A1 | 5/2018 | Murray et al. |
| 2018/0157984 A1 | 6/2018 | O'Herlihy et al. |
| 2018/0158018 A1 | 6/2018 | Luckay et al. |
| 2018/0158020 A1 | 6/2018 | Khasis |
| 2018/0158153 A1 | 6/2018 | Ekin |
| 2018/0164828 A1 | 6/2018 | Dumitras |
| 2018/0165638 A1 | 6/2018 | Wilkinson et al. |
| 2018/0165728 A1 | 6/2018 | McDonald et al. |
| 2018/0189716 A1 | 7/2018 | Crone |
| 2018/0189725 A1 | 7/2018 | Mattingly et al. |
| 2018/0194411 A1 | 7/2018 | Liivik et al. |
| 2018/0196416 A1 | 7/2018 | Iagnemma |
| 2018/0196417 A1 | 7/2018 | Iagnemma |
| 2018/0196438 A1 | 7/2018 | Newlin et al. |
| 2018/0197223 A1 | 7/2018 | Grossman |
| 2018/0211541 A1 | 7/2018 | Rakah et al. |

(56) References Cited

U.S. PATENT DOCUMENTS

| | | |
|---|---|---|
| 2018/0218470 A1 | 8/2018 | Belwafa et al. |
| 2018/0232839 A1 | 8/2018 | Heinla et al. |
| 2018/0246526 A1 | 8/2018 | Wilkinson et al. |
| 2018/0253108 A1 | 9/2018 | Heinla et al. |
| 2018/0260778 A1 | 9/2018 | Mazetti et al. |
| 2018/0260780 A1 | 9/2018 | Mazetti |
| 2018/0282014 A1 | 10/2018 | Atchley et al. |
| 2018/0285852 A1 | 10/2018 | Matsui et al. |
| 2018/0300676 A1 | 10/2018 | Peterson |
| 2018/0311820 A1 | 11/2018 | Fritz et al. |
| 2018/0321679 A1 | 11/2018 | Nixon |
| 2018/0325333 A1 | 11/2018 | Murphy et al. |
| 2018/0330313 A1 | 11/2018 | Clarke et al. |
| 2018/0336605 A1 | 11/2018 | Volta |
| 2018/0341895 A1 | 11/2018 | Kislovskiy et al. |
| 2018/0349834 A1 | 12/2018 | Heinla et al. |
| 2018/0349872 A1 | 12/2018 | Ahmed et al. |
| 2018/0354411 A1 | 12/2018 | Friedland et al. |
| 2018/0356823 A1 | 12/2018 | Cooper |
| 2018/0373246 A1 | 12/2018 | Laughlin et al. |
| 2018/0374002 A1 | 12/2018 | Li |
| 2019/0001919 A1 | 1/2019 | Farooq et al. |
| 2019/0011911 A1 | 1/2019 | Kubo et al. |
| 2019/0023236 A1 | 1/2019 | Webb |
| 2019/0033856 A1 | 1/2019 | Ferguson et al. |
| 2019/0033868 A1 | 1/2019 | Ferguson et al. |
| 2019/0043001 A1* | 2/2019 | Woulfe ............... G01C 21/3438 |
| 2019/0047460 A1 | 2/2019 | Goldberg et al. |
| 2019/0049988 A1 | 2/2019 | Meij |
| 2019/0050952 A1 | 2/2019 | Goldberg et al. |
| 2019/0056751 A1 | 2/2019 | Ferguson et al. |
| 2019/0061939 A1* | 2/2019 | Anand ................. G08G 5/0069 |
| 2019/0064847 A1 | 2/2019 | Ferguson et al. |
| 2019/0108472 A1* | 4/2019 | Sweeney .............. B64C 39/024 |
| 2019/0112119 A1 | 4/2019 | Alexander et al. |
| 2019/0164113 A1 | 5/2019 | Fosgard |
| 2019/0220000 A1* | 7/2019 | Ibe ......................... G06Q 10/04 |
| 2019/0220032 A1* | 7/2019 | Skorinko ............. G05D 1/0088 |
| 2019/0270204 A1 | 9/2019 | Kawamura et al. |
| 2019/0283648 A1 | 9/2019 | Skaaksrud et al. |
| 2019/0287063 A1* | 9/2019 | Skaaksrud ........... G05D 1/0276 |
| 2019/0318306 A1 | 10/2019 | Mere |
| 2019/0347614 A1 | 11/2019 | Khasis |
| 2019/0369641 A1 | 12/2019 | Gillett |
| 2019/0378085 A1* | 12/2019 | Sipes ................. G06Q 10/0833 |
| 2020/0050858 A1 | 2/2020 | Jung et al. |
| 2020/0174494 A1 | 6/2020 | Lessels |

FOREIGN PATENT DOCUMENTS

| | | | |
|---|---|---|---|
| EP | 1989980 | A1 | 11/2008 |
| EP | 2759990 | A1 | 7/2014 |
| JP | H036407 | A | 1/1991 |
| JP | H06189610 | A | 7/1994 |
| JP | 2001256576 | A | 9/2001 |
| JP | 2006177843 | A | 7/2006 |
| WO | 2008005660 | A2 | 1/2008 |
| WO | 2008062128 | A1 | 5/2008 |
| WO | 2013025803 | A1 | 2/2013 |
| WO | 2015061008 | A1 | 4/2015 |
| WO | 2015160782 | A1 | 10/2015 |
| WO | 2016027178 | A1 | 2/2016 |
| WO | 2016183525 | A1 | 11/2016 |
| WO | 2017014544 | A1 | 1/2017 |
| WO | 2017064202 | A1 | 4/2017 |
| WO | 2017072679 | A1 | 5/2017 |
| WO | 2017085314 | A1 | 5/2017 |
| WO | 2019018695 | A1 | 1/2019 |
| WO | 2019023518 | A1 | 1/2019 |
| WO | 2019023519 | A1 | 1/2019 |
| WO | 2019023521 | A1 | 1/2019 |
| WO | 2019023522 | A1 | 1/2019 |
| WO | 2019023615 | A1 | 1/2019 |
| WO | 2019023686 | A1 | 1/2019 |

OTHER PUBLICATIONS

Westaway, Luke "Meet the robot built to deliver your shopping. Starship Technologies' 'local delivery robot' is semi-autonomous, covered in cameras and ready to bring food to your door," https://www.cnet.com/news/meet-the-robot-thats-built-to-deliver-your-shopping/, 4 pages (Feb. 24, 2016).

Wu, Zhirong, et al. "3D shapenets: A deep representation for volumetric shapes," Proceedings of the IEEE Conference on Computer Vision and Pattern Recognition, pp. 1912-1920 (2015).

Xiang, Yu, et al. "Data-driven 3D voxel patterns for object category recognition," Proceedings of the IEEE Conference on Computer Vision and Pattern Recognition, pp. 1903-1911 (2015).

Yu, Shang-Lin, et al. "Vehicle detection and localization on birds eye view elevation images using convolutional neural network," 2017 IEEE International Symposium on Safety, Security and Rescue Robotics (SSRR) INSPEC Accession No. 17315970, pp. 102-109 (2017).

American National Standard for Safe Use of Lasers, SI ZI136.1-2000 (§ 4.5.1.5; 4.5.1.3-4 and p. 5), 19 pages (2000).

AN/TPS-43 Radar System Westinghouse, Westinghouse (pp. 3, 4, 6, 9 & 14), 14 pages (2007).

Food and Drugs Rule—Performance Standards for Light-Emitting Products, 21 C.F.R. § 1040.10, 19 pages (2005).

"How does Starship robotic delivery work," GeekSpeek: Youtube, https://www.youtube/com/watch?v=SIGvM1z7YPc [retrieved on Oct. 19, 2018] whole video, 1 page (Jan. 9, 2016).

Chen, Xiaozhi, et al. "3D object proposals for accurate object class detection," Advances in Neural Information Processing Systems (NIPS), pp. 424-432 (2015).

Chen, Xiaozhi, et al. "Monocular 3D object detection for autonomous driving," Proceedings of the IEEE Conference on Computer Vision and Pattern Recognition, pp. 2147-2156 (2016).

Chen, Xiaozhi, et al. "Multi-view 3D object detection network for autonomous driving," IEEE Conference on Computer Vision and Pattern Recognition (CVPR), pp. 1907-1915 (2017).

Curtis, Sophie "Skype founders invent self-driving robot that can deliver groceries for £1," https://www.telegraph.co.uk/technology/news/11962566/Skype-founders-invent-self-driving-robot-that-can-deliver-groceries-for-1.html, 3 pages (Nov. 2, 2015).

Deng, Zhuo, et al. "Amodal detection of 3D objects: Inferring 3D bounding boxes from 2D ones in RGB-depth images," Conference on Computer Vision and Pattern Recognition (CVPR), INSPEC Accession No. 17355643, 9 pages (Jul. 21-26, 2017).

Engelcke, Martin, et al. "Vote3deep: Fast object detection in 3D point clouds using efficient convolutional neural networks," 2017 IEEE International Conference on Robotics and Automation (ICRA), pp. 1355-1361 (2017).

Fox, Clifton, In: Active Electro-Optical Systems (The Infrared & Electro-Optical Systems Handbook, vol. 6), ISBN 0-8194-1072-1, 326 pages (1993).

Geiger, Andreas, et al. "Vision meets robotics: The KITTI dataset," The International Journal of Robotics Research 32(11):1231-7 (2013).

Girshick, Ross, et al. "Rich feature hierarchies for accurate object detection and semantic segmentation," Proceedings of the IEEE Conference on Computer Vision and Pattern Recognition, pp. 580-587 (2014).

"Autonomous Vehicle Deliveries, Biometric Authentication Receiver," Google Search, retrieved from Internet May 26, 2020, 2 pages (May 26, 2020).

"Smart Robot Delivery," Google Search, retrieved from Internet Jun. 7, 2020, 2 pages (Jun. 7, 2020).

Gustavson, Robert, et al. "Diode laser radar for low-cost weapon guidance," Proc. SPIE 1633, Laser Radar VII: Advanced Technology for Applications, OE/LASE '92, Los Angeles, CA, pp. 21-32 (1992).

Harris, Mark "'Our Streets are made for people': San Francisco mulls ban on delivery robots," https://www.theguardian.com/sustainable-business/2017/may/31/delivery-robots-drones-san-francisco-public-safety-job-loss-fears-marble [retrieved on Oct. 19, 2018], 5 pages (May 31, 2017).

(56) References Cited

OTHER PUBLICATIONS

Kawata, Hirohiko, et al. "Development of ultra-small lightweight optical range sensor systems," 2005 IEEE/RSJ International Conference on Intelligent Robots and Systems. INSPEC Accession No. 8750287, pp. 1078-1083 (Aug. 2-6, 2005).
Kilpela, Ari, et al. "Precise pulsed time-of-flight laser range finder for industrial distance measurements," Review of Scientific Instruments 72:2197-202 (Apr. 2001).
Lahoud, Jean, et al. "2D-driven 3D object detection in RGB-D images," Proceedings of the IEEE International Conference on Computer Vision, pp. 4622-4630 (2017).
Lanctot, Roger "Accelerating the Future: The Economic Impact of the Emerging Passenger Economy," Strategy Analytics 5, 30 pages (Jun. 2017).
Leonard, John, et al. "A Perception-Driven Autonomous Urban Vehicle," Massachusetts Institute of Technology, Journal of Field Robotics 25(1):728-74 (2008).
Liu, Wei, et al. "SSD: Single shot multibox detector," European Conference on Computer Vision, Springer, Cham., pp. 21-37 (2016).
Maturana, Daniel, et al. "Voxnet: A 3D convolutional neural network for real-time object recognition," 2015 IEEE/RSJ International Conference on Intelligent Robots and Systems (IROS), pp. 922-928 (Sep. 2015).
Mogg, Trevor "Domino's has built a self-driving pizza delivery robot," https://www.digitaltrends.com/cool-tech/dominos-pizza-delivery-robot, 12 pages (Mar. 18, 2016).
Mousavian, Arsalan, et al. "3D bounding box estimation using deep learning and geometry," Proceedings of the IEEE Conference on Computer Vision and Pattern Recognition (CVPR), pp. 7074-7082 (2017).
Muoio, Danielle "How to hail a self-driving Uber if you're in Pittsburgh," https://www.businessinsider.com/how-to-hail-a-driverless-uber-car-in-pittsburgh-2016-9, 5 pages (Sep. 14, 2016).
Navarro, Andre, et al. "A mobile robot vending machine for beaches based on consumers' preferences and multivariate methods," Procedia—Social and Behavioral Sciences 175:122-9 (2015).
Olson, Parmy "Self-Driving Robots Will Start Delivering Food for Just Eat and Others," https://www.forbes.com/sites/parmyolson/2016/07/05/self-driving-robots-food-delivery-just-eat/#60c56ca0280d, 3 pages (Jul. 5, 2016).
Peters, Adele "The Grocery Store of the Future is Mobile, Self-Driving, and Run by AI," https://www.fastcompany.com/40429419/this-tiny-grocery-store-is-mobile-self-driving-and-run-by-ai, 6 pages (Jun. 13, 2017).
Pettitt, Jeniece "Forget delivery drones, meet your new delivery robot," https://www.cnbc.com/2015/11/02/forget-delivery-drones-meet-your-new-delivery-robot.html, 5 pages (Nov. 2, 2015).
Qi, Charles, et al. "Frustum PointNets for 3D Object Detection from RGB-D Data, " Proceedings of the IEEE Conference on Computer Vision and Pattern Recognition (CVPR), pp. 918-927 (Apr. 2018).
Qi, Charles, et al. "Frustum PointNets for 3D Object Detection from RGB-D Data," https://arxiv.org/abs/1711.08488v1, 15 pages (Nov. 22, 2017).
Qi, Charles, et al. "Pointnet: Deep learning on point sets for 3D classification and segmentation," Proceedings of the IEEE Conference on Computer Vision and Pattern Recognition (CVPR), pp. 652-660 (2017).
Qi, Charles, et al. "Pointnet++: Deep hierarchical feature learning on point sets in a metric space," Advances in Neural Information Processing Systems, 14 pages (2017).
Qi, Charles, et al. "Volumetric and multi-view CNNs for object classification on 3D data," Proceedings of the IEEE Conference on Computer Vision and Pattern Recognition (CVPR), pp. 5648-5656 (2016).
Ratkov, Anthony, et al. "Robotic Vending Machines," www.anthonyratkkov.com/robotics/robotic vending machines, 2 pages (2010).
Ren, Jimmy, et al. "Accurate single stage detector using recurrent rolling convolution," Proceedings of the the IEEE Conference on Computer Vision and Pattern Recognition (CVPR), pp. 5420-5428 (2017).
Ren, Shaoqing, et al. "Faster R-CNN: Towards real-time object detection with region proposal networks," Advances in Neural Information Processing Systems, pp. 91-99 (2015).
Richmond, Richard, et al. "Polarimetric Imaging Laser Radar (PILAR) Program," Air Force Research Lab, Advanced Sensory Payloads for UAV. Meeting Proceedings RTO-MP-SET-092, Paper 19. Neuilly-sur-seine, France: RTO, pp. 19-1 to 19-14 (May 1, 2005).
Riegler, Gernot, et al. "Octnet: Learning deep 3D representations at high resolutions," Proceedings on the IEEE Conference on Computer Vision and Pattern Recognition (CVPR), pp. 3577-3586 (2017).
Robarts, Stu "Delivering the Future: Autonomous Courier Bots Take to the Streets," New Atlas, https://newatlas.com/starship-autonomous-delivery-robots-pilot/44277/, 8 pages (Jul. 11, 2016).
Skolnik, Merrill, et al. In: Introduction to Radar Systems Handbook, McGraw-Hill Book Company, 2nd Ed., 590 pages (1980).
Skolnik, Merrill, et al. In: Radar Handbook, McGraw-Hill Book Company, 2nd Ed., (1.18, 20.6 & 20.7-8), 846 pages (1990).
Song, Shuran, et al. Deep sliding shapes for amodal 3D object detection in RGB-D images, Proceedings of the IEEE Conference on Computer Vision and Pattern Recognition, pp. 808-816 (2016).
Song, Shuran, et al. "Sliding shapes for 3D object detection in depth images," European Conference on Computer Vision, Springer, Cham., pp. 634-651 (2014).
Song, Shuran, et al. "Sun RGB-D: A RGB-D scene understanding benchmark suite," Proceedings of the IEEE Conference on Computer Vision and Pattern Recognition, pp. 567-576 (2015).
Su, Hang, et al. "Multi-view convolutional neural networks for 3D shape recognition," Proceedings of the IEEE Conference on Computer Vision and Pattern Recognition, pp. 945-953 (2015).
Thompson, Rich "Creativity is critical at the last mile," Area Development Site and Facility Planning 51(4):16-17, 20-21 (2016).
Wang, Peng-Shuai, et al. "O-CNN: Octree-based convolutional neural networks for 3D shape analysis," ACM Transactions on Graphics (TOG) 36(4):1-11 (2017).

* cited by examiner

US 11,907,887 B2

METHODS AND APPARATUS FOR UNATTENDED DELIVERIES

CROSS-REFERENCE TO RELATED APPLICATION

This application claims the benefit of priority under 35 U.S.C. § 119 to U.S. Provisional Patent Application No. 62/993,551, filed Mar. 23, 2020, entitled "METHODS AND APPARATUS FOR UNATTENDED DELIVERIES," which is incorporated herein by reference in its entirety.

TECHNICAL FIELD

The disclosure relates to providing a vehicle with systems which allow the vehicle to deliver goods to unattended locations. More particularly, the disclosure relates to allowing an autonomous vehicle to securely deliver goods to, and to securely retrieve returned goods from, unattended customer locations.

BACKGROUND

The use of autonomous, or driverless, vehicles to deliver goods to customers is increasing, and will transformatively reduce delivery costs to customers while simultaneously bringing flexibility to the lives of customers by allowing customers to spend less time shopping for goods and more time engaged in other activities. For example, when a customer is able to have groceries delivered via an autonomous vehicle, the customer may be able spend time, i.e., time that would otherwise be spent procuring groceries, working, or engaging in other productive activities.

An autonomous delivery vehicle may efficiently transport goods to a customer site. However, once the delivery vehicle reaches the customer site, someone such as the customer, generally must meet the delivery vehicle to retrieve the goods. The need for human intervention to retrieve the goods may limit the transformative nature of autonomous delivery solutions.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
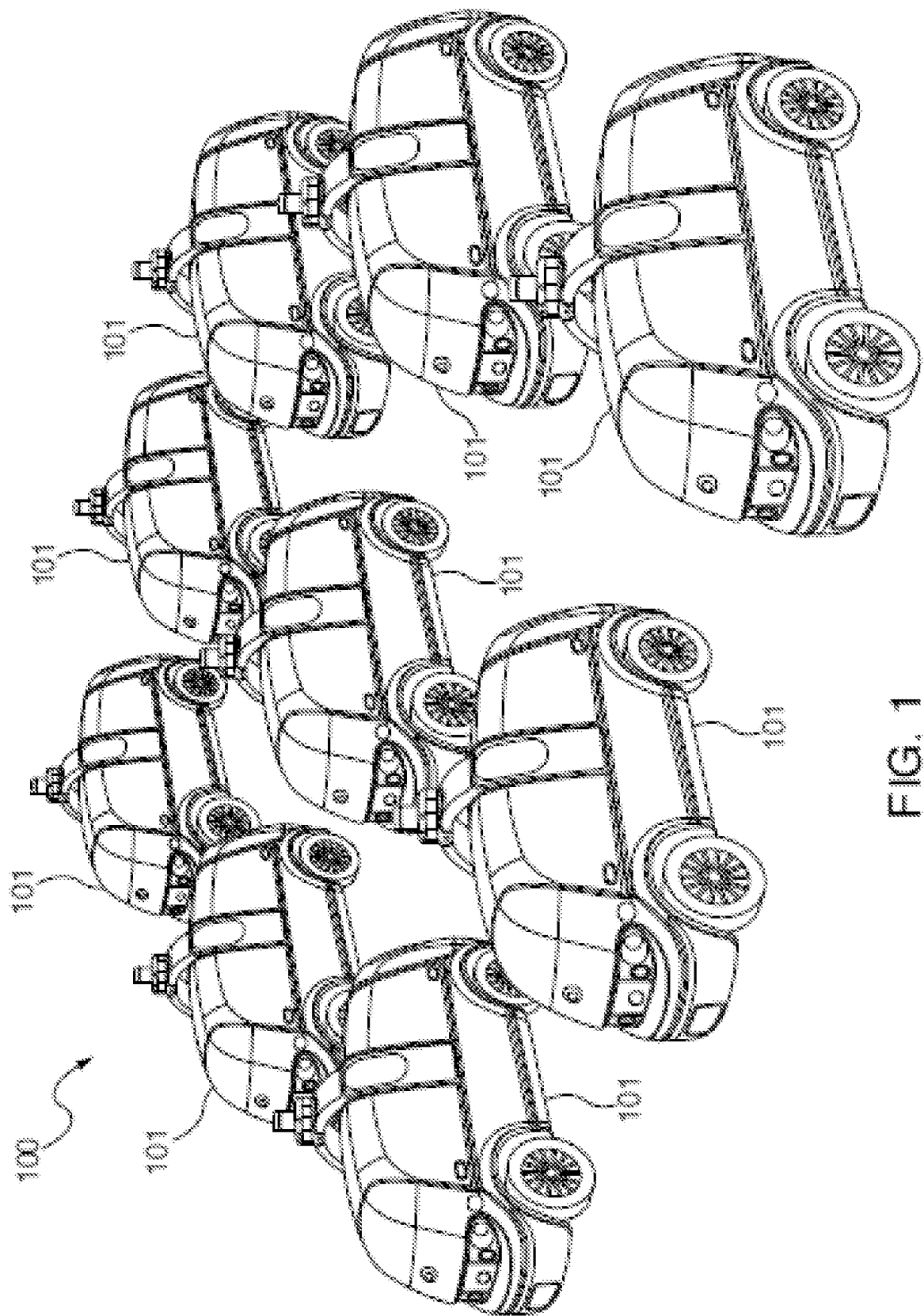
FIG. 1 is a diagrammatic representation of an autonomous vehicle fleet in accordance with an embodiment.

In one aspect, an autonomous delivery vehicle may be provided with a physical mechanism that is arranged to substantially unload goods without human intervention. The physical mechanism may facilitate the transfer of goods from the autonomous vehicle to a receiving device, as for example a smart mobile locker or a smart mailbox. The physical mechanism may generally include one or more components that unload of an item from a compartment of the vehicle.

According to another aspect, a method includes propelling a vehicle to a location, the vehicle including a propulsion system configured to propel the vehicle and at least one compartment, the at least one compartment configured to contain at least one delivery item and at least one transfer mechanism, the transfer mechanism arranged to be activated to cause the delivery item to be purged, released, or dislodged from the at least one compartment. The method also includes determining when the vehicle is authorized to deliver the delivery item at the location, aligning the vehicle with respect to a target at the location, opening a door to the at least one compartment, and activating the transfer mechanism after opening the door. Activating the transfer mechanism includes causing the transfer mechanism to purge the delivery item from the at least one compartment such that the delivery item is obtained by the target. The target is arranged to receive the delivery item when the delivery item is purged from the at least one compartment.

According to still another aspect, a method includes autonomously aligning a vehicle with respect to a target, the vehicle including at least one compartment and a propulsion system configured to propel the vehicle, the at least one compartment configured to contain at least one delivery item and at least one transfer mechanism, the transfer mechanism arranged to be activated to cause the delivery item to be transferred out of the at least one compartment, the target being arranged to receive the delivery item when the delivery item is transferred out of the at least one compartment, wherein autonomously aligning the vehicle with respect to the target includes adjusting a position of the vehicle to align with the target along at least one axis. The method also includes opening the least one compartment, and activating the transfer mechanism after opening the at least one compartment and after autonomously aligning the vehicle with respect to the target. Activating the transfer mechanism includes causing the transfer mechanism to transfer the delivery item from the at least one compartment such that the delivery item is transferred from the compartment to the target.

According to yet another aspect, a vehicle includes a propulsion system and at least one compartment. The propulsion system configured to enable the vehicle to drive. The at least one compartment is configured to contain at least one delivery item and at least one transfer mechanism. The transfer mechanism is arranged to be activated to cause the delivery item to be purged from the at least one compartment, and includes a transfer surface, a transfer surface actuator, a linear force mechanism, and a linear force actuator. The delivery item is arranged to be purged from the at least one compartment using the transfer mechanism.

DESCRIPTION

Autonomous vehicles may generally transport people and goods without the need for human drivers. The use of autonomous delivery vehicles, in particular, may provide people with the ability to spend less time running errands and procuring goods, and more time on more fulfilling activities.

By providing an autonomous delivery vehicle with a mechanism which allows the autonomous delivery vehicle to remove goods from onboard the vehicle such that the goods may effectively be delivered to a customer location, the need for a person to be present to receive the goods may be substantially eliminated. In one embodiment an autonomous delivery vehicle capable of unloading goods from onboard the vehicle is arranged to transfer the goods from the vehicle to a receiving apparatus at a customer site. The receiving apparatus, which may be a mobile or stationary, may be arranged to interface with the autonomous delivery vehicle such that goods may be transferred between the autonomous delivery vehicle and the receiving apparatus substantially without human intervention. The receiving apparatus may be a smart device, or an apparatus that may be communicably connected to a wireless network such that the apparatus may essentially interact with the autonomous delivery vehicle either directly or indirectly.

A mechanism that allows an autonomous delivery vehicle to unload goods may include any number of components. For example, a mechanism may include a component that supports goods carried by a vehicle and facilitates removal of the goods, and another component that physically removes the goods from the vehicle. Such a mechanism may effectively allow goods to be unloaded or purged from a vehicle substantially autonomously, or without physical assistance or intervention from a human.

An autonomous delivery vehicle which is capable of performing unattended deliveries, or deliveries which do not involve physical assistance or intervention from a human, may be part of a fleet of vehicles that may be dispatched to deliver goods within a community. Referring initially to FIG. 1, an autonomous vehicle fleet will be described in accordance with an embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
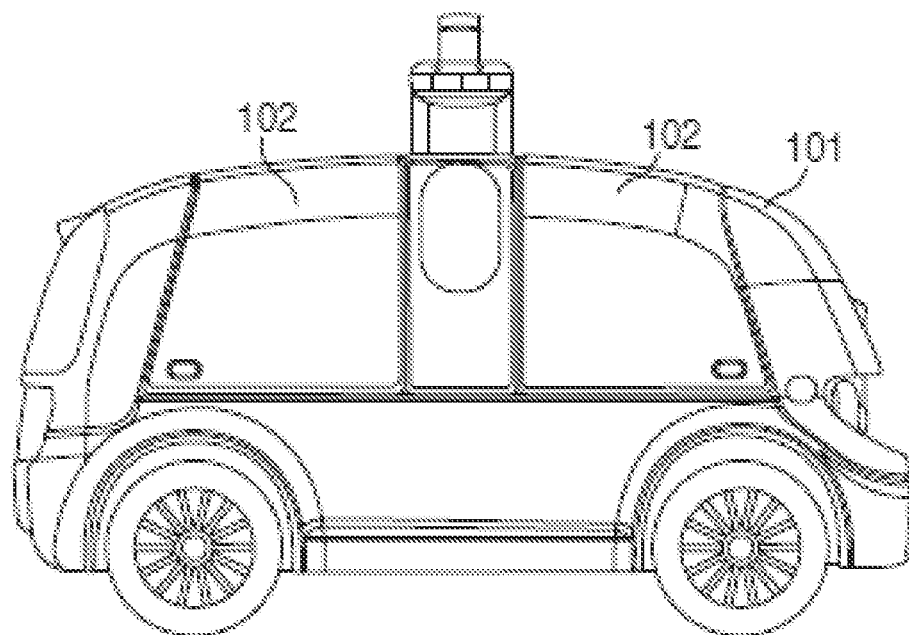
FIG. 2 is a diagrammatic representation of a side of an autonomous vehicle in accordance with an embodiment.

FIG. 2 is a diagrammatic representation of a side of an autonomous vehicle, e.g., one of autonomous vehicles 101 of FIG. 1, in accordance with an embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

Autonomous vehicle 101 includes a plurality of compartments 102. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

Figure 3:
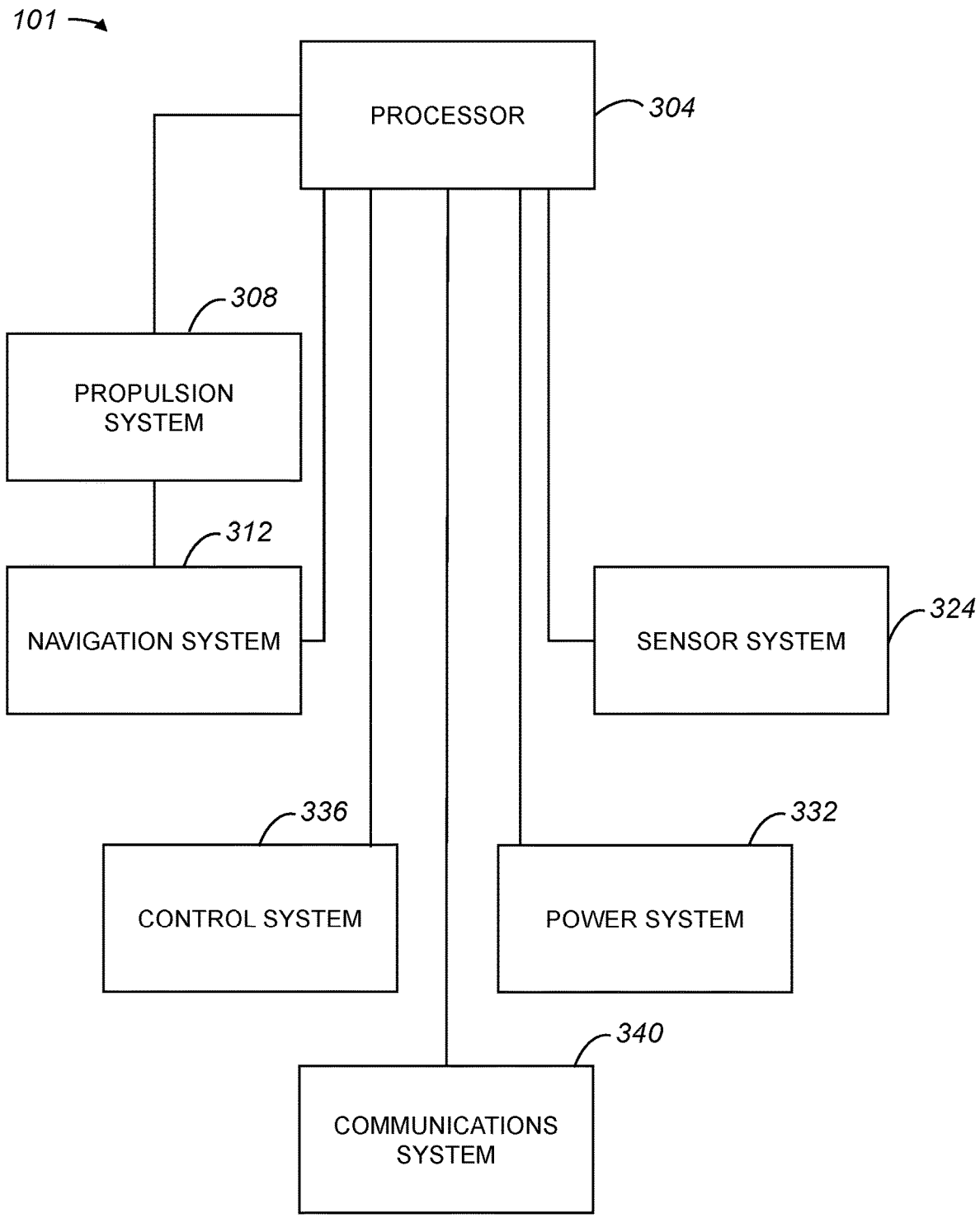
FIG. 3 is a block diagram representation of an autonomous vehicle in accordance with an embodiment.

FIG. 3 is a block diagram representation of an autonomous vehicle, e.g., autonomous vehicle 101 of FIG. 1, in accordance with an embodiment. An autonomous vehicle 101 includes a processor 304, a propulsion system 308, a navigation system 312, a sensor system 324, a power system 332, a control system 336, and a communications system 340. It should be appreciated that processor 304, propulsion system 308, navigation system 312, sensor system 324, power system 332, and communications system 340 are all coupled to a chassis or body of autonomous vehicle 101.

Processor 304 is arranged to send instructions to and to receive instructions from or for various components such as propulsion system 308, navigation system 312, sensor system 324, power system 332, and control system 336. Propulsion system 308, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 308 may be arranged to cause the engine, wheels, steering, and braking systems to cooperate to drive. In general, propulsion system 308 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Navigation system 312 may control propulsion system 308 to navigate autonomous vehicle 101 through paths and/or within unstructured open or closed environments. Navigation system 312 may include at least one of digital maps, street view photographs, and a global positioning system (GPS) point. Maps, for example, may be utilized in cooperation with sensors included in sensor system 324 to allow navigation system 312 to cause autonomous vehicle 101 to navigate through an environment.

Sensor system 324 includes any sensors, as for example LiDAR, radar, ultrasonic sensors, microphones, altimeters, and/or cameras. Sensor system 324 generally includes onboard sensors which allow autonomous vehicle 101 to safely navigate, and to ascertain when there are objects near autonomous vehicle 101. In one embodiment, sensor system 324 may include propulsion systems sensors that monitor drive mechanism performance, drive train performance, and/or power system levels.

Power system 332 is arranged to provide power to autonomous vehicle 101. Power may be provided as electrical power, gas power, or any other suitable power, e.g., solar power or battery power. In one embodiment, power system 332 may include a main power source, and an auxiliary power source that may serve to power various components of autonomous vehicle 101 and/or to generally provide power to autonomous vehicle 101 when the main power source does not have the capacity to provide sufficient power.

Communications system 340 allows autonomous vehicle 101 to communicate, as for example, wirelessly, with a fleet management system (not shown) that allows autonomous vehicle 101 to be controlled remotely. Communications system 340 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand.

In some embodiments, control system 336 may cooperate with processor 304 to determine where autonomous vehicle 101 may safely travel, and to determine the presence of objects in a vicinity around autonomous vehicle 101 based on data, e.g., results, from sensor system 324. In other words, control system 336 may cooperate with processor 304 to effectively determine what autonomous vehicle 101 may do within its immediate surroundings. Control system 336 in cooperation with processor 304 may essentially control power system 332 and navigation system 312 as part of driving or conveying autonomous vehicle 101. Additionally, control system 336 may cooperate with processor 304 and communications system 340 to provide data to or obtain data from other autonomous vehicles 101, a management server, a global positioning server (GPS), a personal computer, a teleoperations system, a smartphone, or any computing device via the communication module 340. In general, control system 336 may cooperate at least with processor 304, propulsion system 308, navigation system 312, sensor system 324, and power system 332 to allow vehicle 101 to operate autonomously. That is, autonomous vehicle 101 is able to operate autonomously through the use of an autonomy system that effectively includes, at least in part, functionality provided by propulsion system 308, navigation system 312, sensor system 324, power system 332, and control system 336.

As will be appreciated by those skilled in the art, when autonomous vehicle 101 operates autonomously, vehicle 101 may generally operate, e.g., drive, under the control of an autonomy system. That is, when autonomous vehicle 101 is in an autonomous mode, autonomous vehicle 101 is able to generally operate without a driver or a remote operator controlling autonomous vehicle. In one embodiment, autonomous vehicle 101 may operate in a semi-autonomous mode or a fully autonomous mode. When autonomous vehicle 101 operates in a semi-autonomous mode, autonomous vehicle 101 may operate autonomously at times and may operate under the control of a driver or a remote operator at other times. When autonomous vehicle 101 operates in a fully autonomous mode, autonomous vehicle 101 typically operates substantially only under the control of an autonomy system. It should be appreciated that when autonomous vehicle 101 is not configured for any driver to be onboard, when autonomous vehicle 101 operates in a semiautonomous mode, autonomous vehicle 101 is typically either operated via remote control or a via a teleoperations system by a human.

As mentioned above, an autonomous vehicle may be configured to perform unattended deliveries, or to deliver goods to a customer location when there is no person at the customer location to receive the goods, e.g., to remove the goods from the autonomous vehicle. Rather than being received by a person at the customer location, the delivered goods may be received by a receiving apparatus that is arranged to at least temporarily store the delivered goods until someone at the customer location is able to remove the delivered goods from the receiving apparatus. The receiving apparatus may be any suitable apparatus onto or into which goods may be placed. It should be appreciated that a receiving apparatus may also be any suitable surface such as a ground surface.

To facilitate the transfer of goods from an autonomous vehicle to a receiver apparatus, the autonomous vehicle and/or the receiver apparatus may include a transfer mechanism. When a transfer mechanism is present on the autonomous vehicle, the transfer mechanism may be arranged to physically unload or purge goods from the autonomous vehicle. When a transfer mechanism is present on the receiver apparatus, the transfer mechanism may be arranged to physically remove goods from the autonomous vehicle and/or to physically load goods onto the receiver apparatus. It should be appreciated that transfer mechanisms may additionally, or alternatively, be arranged to physically remove goods from the receiver apparatus and to physically load the goods onto the delivery vehicle. In one embodiment, a receiver apparatus may be an autonomous vehicle.

A transfer mechanism may be any suitable mechanism that is capable of causing an item to be removed from a vehicle or apparatus and provided to another vehicle or apparatus, e.g., removed from a delivery vehicle and provided to a receiver apparatus. In one embodiment, the item may be contained in a portable locker, lock box, and/or compartment module that is configured to be removed from the vehicle or apparatus and provided to another vehicle or apparatus. A transfer mechanism may generally be a mechanism with an actuating arrangement including, but not limited to including, a mobile robot, a fixed robot with up to approximately six degrees of freedom, a linear actuator, and/or a push actuator. In some instances, a transfer mechanism may take advantage of gravity to facilitate the removal of an item from a delivery vehicle and/or the insertion of an item into a receiver apparatus. A transfer mechanism may include, but is not limited to including, a conveyer belt, a ramp, a pivoting platform, a removable tray, a spring-loaded platform or catapult, a lever system, a linear force mechanism such as a push plate, a claw crane, a suction crane, an air-actuated removal system, a telescoping tube, and/or robotic devices such as a continuous track vehicle, a humanoid robot, or a drone.

In general, when a delivery vehicle reaches a delivery zone or, more generally, a hand-off location or a delivery location within the delivery zone, the delivery vehicle verifies that a receiver apparatus at the delivery location has authorization to receive a delivery. When the receiver apparatus is authenticated, the delivery vehicle may initiate an unloading sequence in which the delivery vehicle opens a compartment, activates a transfer mechanism, and unloads at least one item from the delivery vehicle and onto or into the receiver apparatus. It should be appreciated that the delivery vehicle may also ensure that conditions are amenable to initiating the unloading sequence, e.g., the delivery vehicle may use onboard sensors such as cameras and motion detectors to detect threats and to ascertain whether it is safe to initiate the unloading sequence. In one embodiment, a delivery vehicle may detect weather conditions to ascertain whether it is prudent to initiate the unloading sequence. When it is determined that an unloading sequence is not to be initiated, a delivery vehicle may communicate with a customer to request instructions on whether to unload a delivery.

Typically, when a receiver apparatus initiates a loading sequence in response to the arrival of a delivery vehicle at a delivery location, the receiver apparatus verifies that the delivery vehicle is an expected delivery vehicle. Once the receiver apparatus authenticates the delivery vehicle, the receiver apparatus may ascertain whether it is safe to receive a delivery through the use of onboard sensors. In one embodiment, the receiver apparatus may obtain information from sensors on the delivery vehicle and use that information to assess whether it is safe to initiate the loading sequence.

Figure 4A:
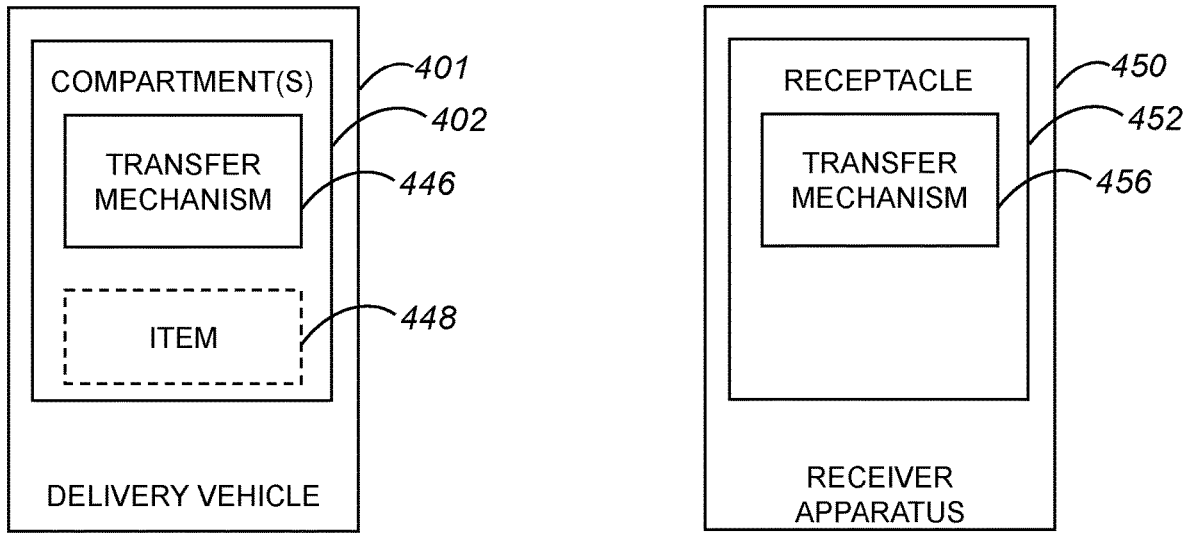
FIG. 4A is a block diagram representation of a delivery vehicle and a receiver apparatus at a time t1 when an item to be delivered is positioned aboard the delivery vehicle in accordance with an embodiment.
Figure 4B:
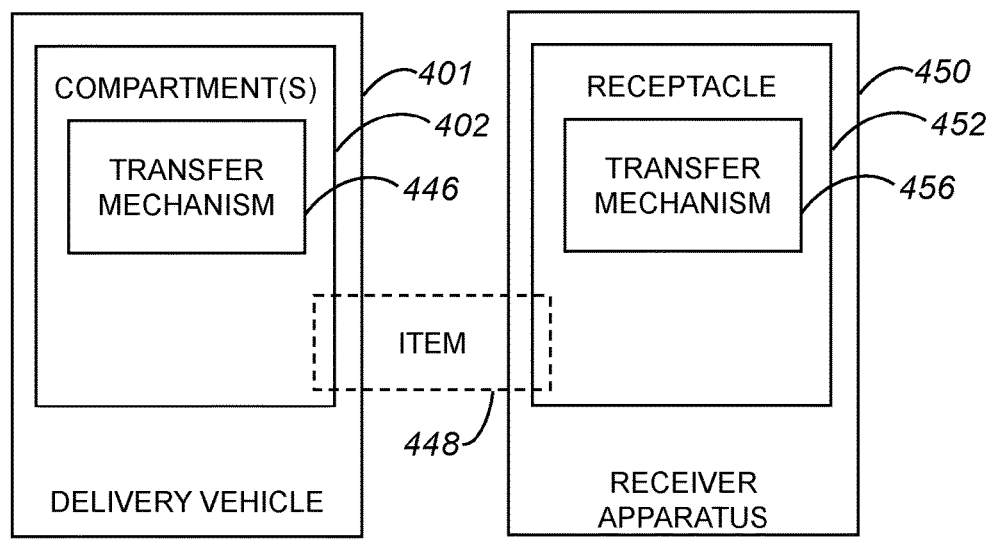
FIG. 4B is a block diagram representation of a delivery vehicle and a receiver apparatus, e.g., delivery vehicle 401 and receiver apparatus 450 of FIG. 4A, at a time t2, when an item, e.g., item 448 of FIG. 4A, is transferred from the delivery vehicle to the receiver apparatus in accordance with an embodiment.
Figure 4C:
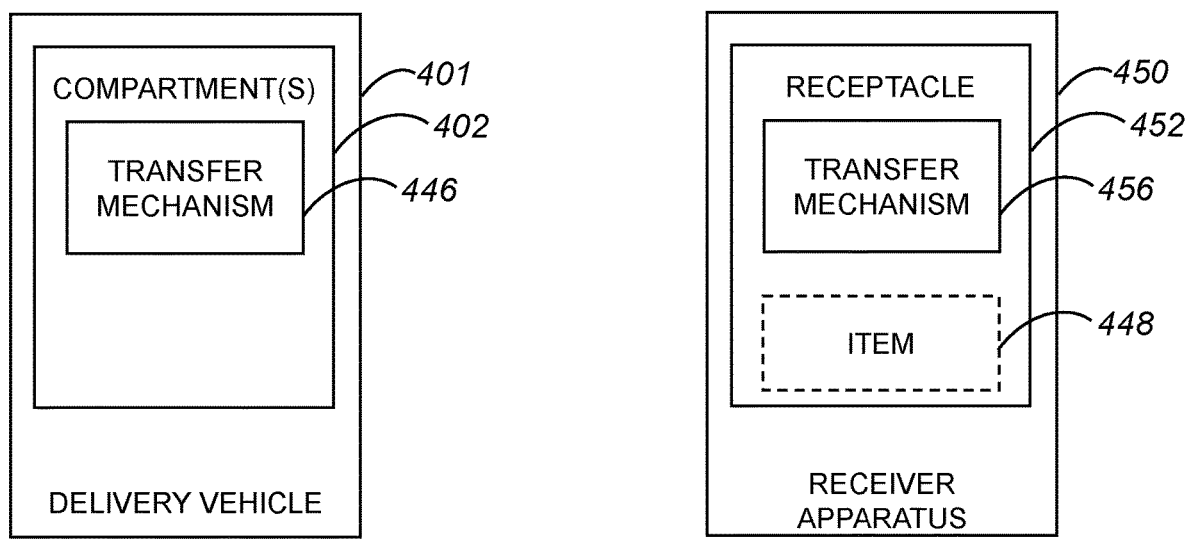
FIG. 4C is a block diagram representation of a delivery vehicle and a receiver apparatus, e.g., delivery vehicle 401 and receiver apparatus 450 of FIG. 4A, at a time t3, when an item, e.g., item 448 of FIG. 4A, is positioned in the receiver apparatus in accordance with an embodiment.

With reference to FIGS. 4A-C, the unattended delivery of an item will be described in accordance with an embodiment. FIG. 4A is a block diagram representation of a delivery vehicle and a receiver apparatus at a time t1 when an item to be delivered is positioned aboard the delivery vehicle in accordance with an embodiment. A delivery vehicle 401, which may be an autonomous vehicle similar to autonomous vehicle 101 as described above, includes at least one compartment 402. The compartment 402 includes a transfer mechanism 446 that is arranged to facilitate the transfer of an item 448 contained in compartment 402 to a receiver apparatus 450.

Receiver apparatus 450 is generally an apparatus that is arranged to receive the delivery of item 448 at a customer location or site. Receiver apparatus 450 may be, but is not limited to being, a mobile apparatus, e.g., a smart locker, that is arranged to propel, e.g., to drive, itself to drop-off location or a substantially stationary apparatus, e.g., a smart mailbox, that is positioned at a drop-off location. In the described embodiment, receiver apparatus 450 includes a receptacle 452 that contains a transfer mechanism 456. The drop-off location or, more generally, the hand-off location may be a specific point or area at a customer location or site. Transfer mechanism 456 is arranged to cooperate with transfer mechanism 446 to complete a transfer of item 448 from delivery vehicle 401 to receiver apparatus 450.

Receptacle 452 may be arranged to be locked, e.g., may include a door or cover that may be locked, until a transfer sequence to transfer item 448 is initiated. When a transfer sequence is initiated, receptacle 452 may be unlocked. Once item 448 is transferred into receptacle 452, receptacle may be re-locked. Receptacle 452 may be accessed through a top or a side of receiver apparatus 450.

It should be appreciated that while delivery vehicle 401 includes transfer mechanism 446 and receiver apparatus 450 includes transfer mechanism 456, in some embodiments, apparatus 450 may not include transfer mechanism 456 and in other embodiments, delivery vehicle 401 may not include transfer mechanism 446. That is, the unattended delivery of item 448 is not limited to being accomplished by an overall system in which delivery vehicle 401 includes transfer mechanism 446 and receiver apparatus 450 includes transfer mechanism 456.

FIG. 4B is a block diagram representation of delivery vehicle 401 and a receiver apparatus 450 at a time t2, when item 448 is transferred from compartment 402 to receptacle 452 in accordance with an embodiment. At time t2, delivery vehicle 401 and receiver apparatus 450 are in proximity to each other, e.g., are positioned such that a transfer of item 448 from compartment 402 and receptacle 450 may commence. Transfer mechanism 446 may be arranged to actively cause item 448 to be unloaded from compartment 446 such that item 448 may be received by receptacle 452. In one embodiment, transfer mechanism 456 may cooperate with transfer mechanism 446 to cause item, 448 to be removed from compartment 402 and loaded into receptacle 452.

At a time t3, as shown in FIG. 4C, item 448 is loaded into receptacle 452. In other words, at time t3, item 448 has been successfully unloaded from compartment 402 and into receptacle 452 using transfer mechanism 445 and transfer mechanism 456. In one embodiment, in order to verify a successfully unloading from compartment 402 into receptacle 452, either delivery vehicle 401 or receiver apparatus 450 may take a picture or a video.

Item 448 may be packaged in a variety of different ways, or may effectively be unpackaged, e.g., item 448 may be loose. When item 448 is packaged, item 448 may be packaged in a locker or locked box with other items (not shown), or item may be packaged substantially alone in a locker or locked box. It should be appreciated that when item 448 is packaged, the entire package containing item 448 may be removed from compartment 402 and loaded into receptacle 452. Packaging item 448 in a locker or a locked box, for example, may increase the security with which item 448 may be transferred from compartment 402 to receptacle 452.

Figure 5:
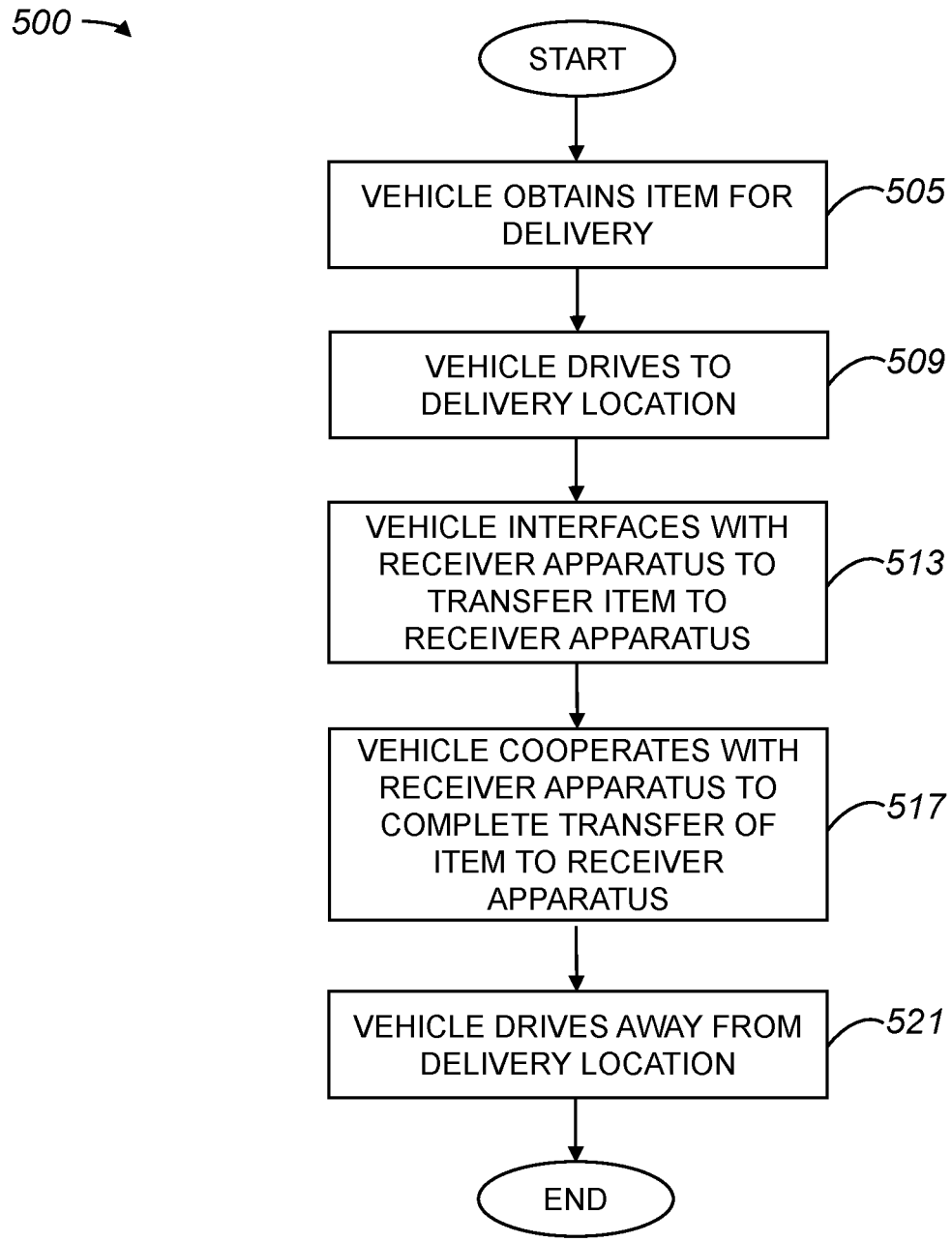
FIG. 5 is a process flow diagram which illustrates a method of a vehicle delivering an item to a receiver apparatus in accordance with an embodiment.

Referring next to FIG. 5, a method of a vehicle delivering an item to a receiver apparatus will be described in accordance with an embodiment. A method 500 of delivering an item to a receiver apparatus begins at a step 505 in which a vehicle, e.g., and autonomous vehicle that operates fully autonomously or semi-autonomously, obtains an item for delivery. The item may be any suitable good including, but not limited to including, food items and household items. The vehicle may generally obtain the item for delivery in response to an order, e.g., an online order or a telephone order, from a customer. The item may be obtained at any suitable origin location such as a retail store, restaurant, or a warehouse.

In a step 509, the vehicle drives, e.g., autonomously, from an origin location to a delivery location or a customer location. Once the vehicle arrives at the delivery location, the vehicle interfaces with a receiver apparatus in step 513 to transfer the item from the vehicle to the receiver apparatus. The vehicle and the receiver apparatus may interface with each other after the vehicle and the receiver apparatus are effectively authenticated such that a compartment door on the vehicle and a receptacle door on the receiver apparatus may be opened. In one embodiment, when the vehicle interfaces with the receiver apparatus, the vehicle and the receiver apparatus are positioned such that a compartment on the vehicle and a receptacle on the receiver apparatus are aligned to allow the item to be transferred. The relative positioning between the vehicle and the receiver may be such that either or both the vehicle and the receiver adjust positioning such that the compartment and the receptacle are effectively aligned. Sensor fiducials, as for example sensor fiducials in a receptacle on the receiver apparatus, may be used to facilitate the alignment of the compartment and the receptacle. Such sensor fiducials may be used by a sensor on the vehicle, e.g., a camera on the vehicle, to align the compartment with respect to the receptacle. When the vehicle interfaces with the receiver apparatus, the vehicle may communicate with the receiver apparatus.

From step 513, process flow proceeds to a step 517 in which the vehicle cooperates with the receiver apparatus to complete a transfer of the item to the receiver apparatus. In one embodiment, a transfer mechanism on the vehicle causes the item to be unloaded from the vehicle and loaded onto the receiver apparatus. Sensor fiducials may be used to allow fine alignment by the vehicle as the item is loaded onto the receiver apparatus. After the item is transferred to the receiver apparatus, the compartment door on the vehicle and the receptacle door on the receiver apparatus may be closed, and the vehicle drives away from the delivery location in a step 521. Upon the vehicle driving away from the delivery location, the method of a vehicle delivering an item to a receiver apparatus is completed.

Figure 6:
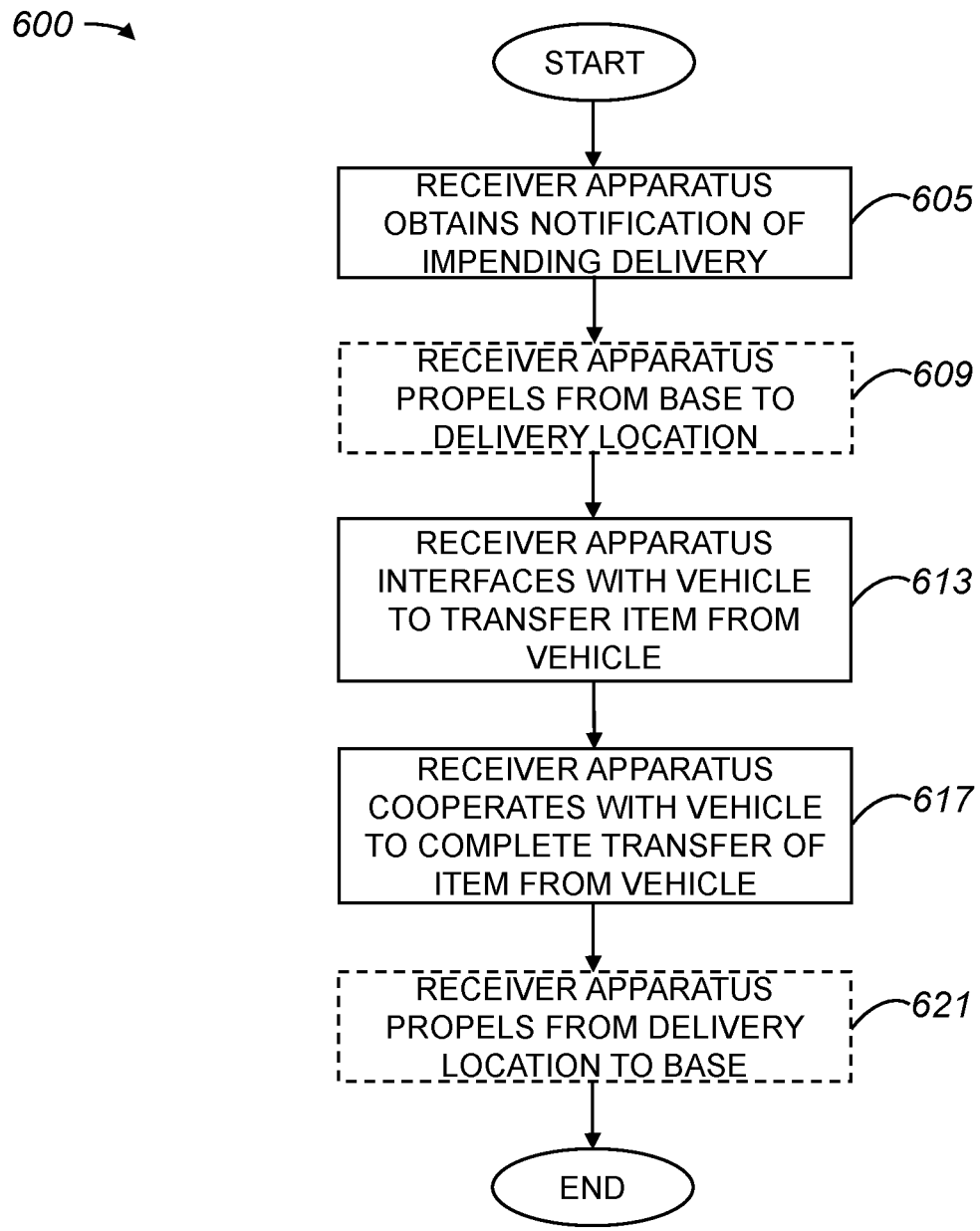
FIG. 6 is a process flow diagram which illustrates a method of a receiver apparatus obtaining a delivered item from a vehicle in accordance with an embodiment.

FIG. 6 is a process flow diagram which illustrates a method of a receiver apparatus obtaining a delivered item from a vehicle in accordance with an embodiment. A method 600 of obtaining a delivered item from a vehicle begins at a step 605 in which a receiver apparatus obtains notification of an impending delivery of an item. The notification may be obtained from a fleet management system that coordinates deliveries, or from a vehicle that is to deliver the item.

In the described embodiment, the receiver apparatus optionally propels itself from a base to a delivery location in a step 609. The receiver apparatus may propel itself from a base or a dock, as for example a charging dock, to a delivery or drop-off location when the receiver apparatus is mobile. It should be appreciated that when the receiver apparatus is stationary, then the receiver apparatus does not propel to the delivery location as the receiver apparatus is already located at the delivery location.

The receiver apparatus interfaces with the delivery vehicle in a step 613 to transfer the item from the vehicle to the receiver apparatus. Interfacing may include, but is not limited to including, aligning or otherwise adjusting the positioning of the vehicle with respect to the receiver apparatus such that the item may be readily removed from the vehicle and loaded onto the receiver apparatus using a transfer mechanism, e.g., a transfer mechanism in a compartment of the vehicle. To facilitate the positioning of the vehicle with respect to the receiver apparatus, sensors on the vehicle and sensor fiducials on the receiver apparatus may be used. In general, to enable the interfacing to occur, any door or compartment cover on the receiver receptacle may be actuated to open. Similarly, a door to a compartment on the delivery vehicle may be actuated to open.

In a step 617, the receiver apparatus cooperates with the vehicle to complete the transfer of the item from the vehicle to the receiver apparatus. The cooperation between the receiver apparatus and the vehicle may include, but is not limited to including, a transfer mechanism unloading the item from the vehicle and into the receiver apparatus. Completing the transfer of the item may generally include a compartment door on the vehicle closing, and a receptacle door on the receiver apparatus closing.

From step 617, process flow proceeds to an optional step 621 in which the receiver apparatus propels from the delivery location back to the base. It should be appreciated that when the receiver apparatus is stationary as for example when the receiver apparatus is a stationary mailbox, the receiver apparatus remains located at the delivery location. The base may be inside a garage, e.g., a garage that may be opened and closed by the receiver apparatus. In one embodiment, the base may be physically secure such that once the vehicle returns to the base, the vehicle is locked to the base. Once the transfer of the item is completed, and the receiver apparatus optionally propels to the base, the method of obtaining an item from a delivery vehicle is completed.

In addition to being used for unattended deliveries, an autonomous vehicle may be used for unattended returns. That is, an autonomous vehicle may be dispatched to pick up return items from a return, or pick-up, location. Such a return item may be placed in a receiver apparatus, e.g., the same receiver apparatus to which deliveries may be loaded, that interface with an autonomous vehicle to complete an unattended return of the item.

Figure 7:
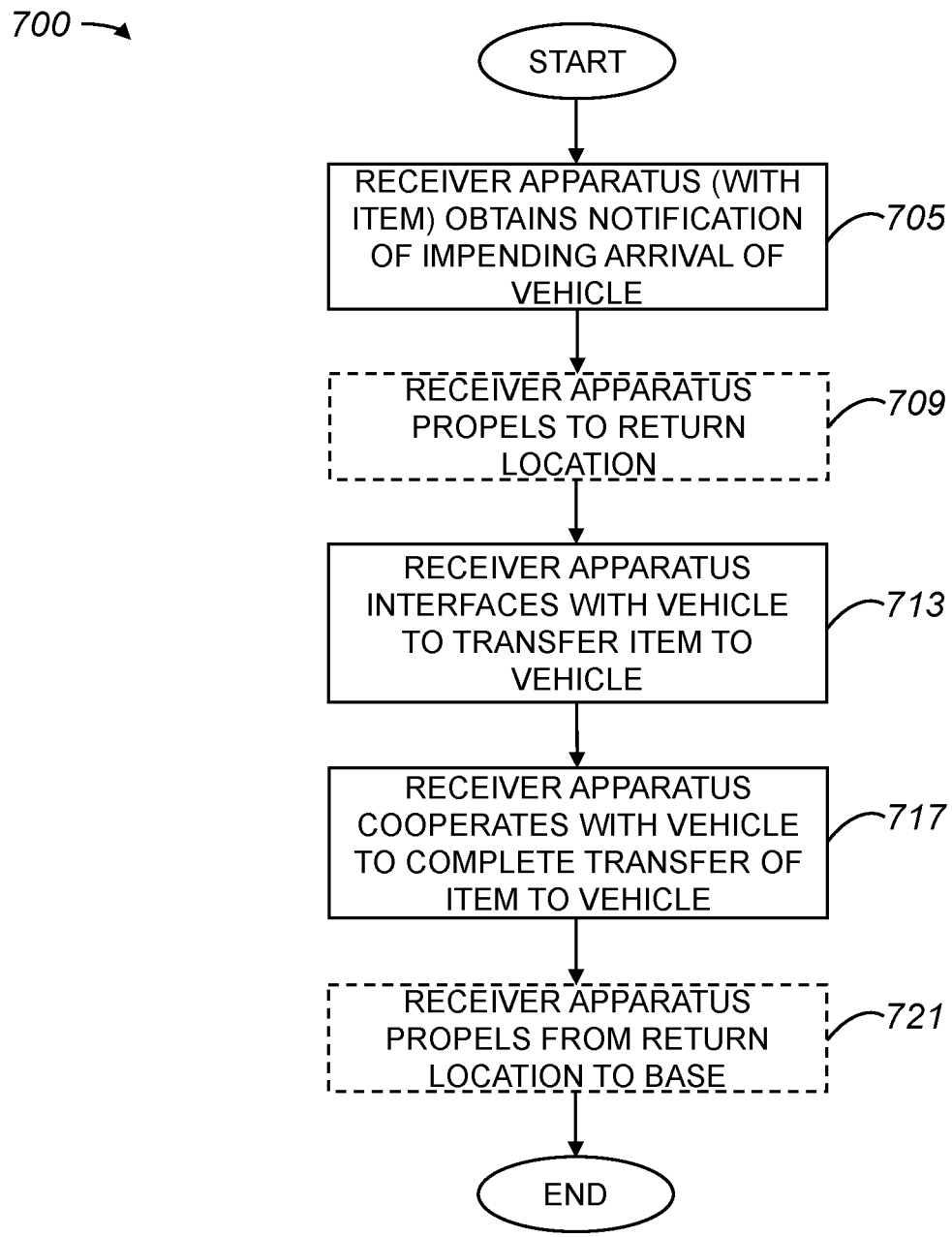
FIG. 7 is a process flow diagram which illustrates a method of a receiver apparatus returning an item to a vehicle in accordance with an embodiment.

Referring next to FIG. 7. a method of a receiver apparatus returning an item to a vehicle to complete an unattended return will be described in accordance with an embodiment. A method 700 of returning an item begins at a step 705 in which a receiver apparatus, on which an item to be returned is loaded, obtains a notification of the impending arrival of a vehicle, i.e., the vehicle that is to pick-up the item. The notification may be obtained from a fleet management system that dispatches vehicles within a community, or substantially directly from the vehicle.

In an optional step 709, the receiver apparatus propels or drives itself from a base to a return location, or a location at which the receiver apparatus is to meet up with the vehicle. It should be appreciated that in an embodiment in which the receiver apparatus is not mobile, e.g., when the receiver apparatus is a substantially stationary mailbox, the receiver apparatus does not propel to the return location.

In a step 713, the receiver apparatus interfaces with the vehicle to transfer the item from the receiver apparatus to the vehicle. Interfacing may include, but is not limited to including, opening compartment and receptacle doors, aligning a compartment and a receptacle, and/or physically positioning the vehicle and the receiver apparatus relative to each other. Once the receiver apparatus interfaces with the vehicle, the receiver apparatus cooperates with the vehicle to complete the transfer of the item to the vehicle in a step 717. In one embodiment, a receptacle on the receiver apparatus includes a transfer mechanism that unloads the item from the receiver apparatus and loads the item into a compartment on the vehicle. In another embodiment, a compartment on the vehicle includes a transfer mechanism that effectively pulls or otherwise removes the item from a receptacle on the receiver apparatus and loads the item into the compartment. Completing the transfer may include securing or otherwise securing a compartment door and/or a receptacle door.

When the receiver apparatus is a mobile apparatus, the receiver apparatus propels from the return location back to the base in an optional step 721. After the item is transferred to the vehicle, and the receiver apparatus optionally propels to the base, the method of returning an item is completed.

Figure 8:
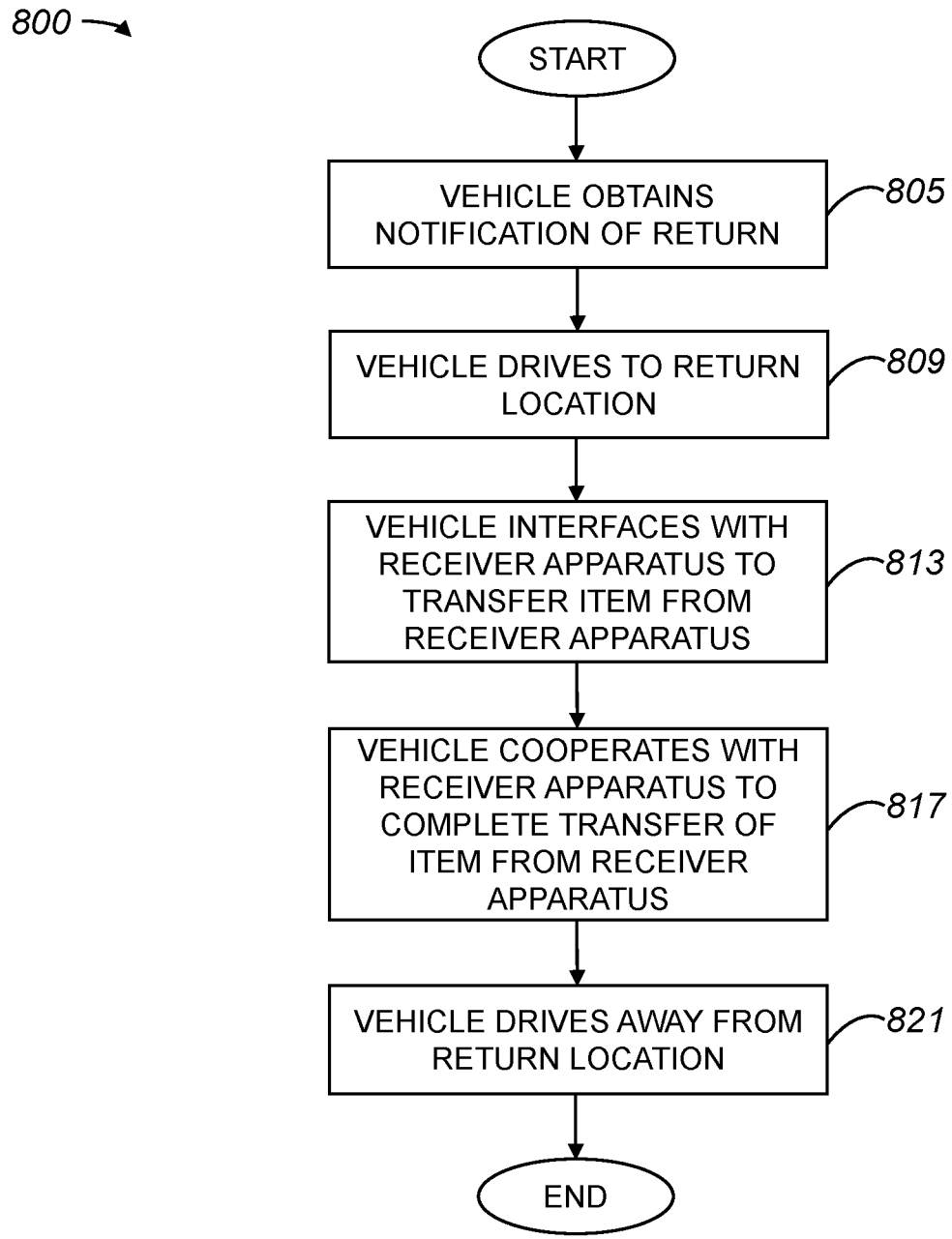
FIG. 8 is a process flow diagram which illustrates a method of a vehicle obtaining a returned item in accordance with an embodiment.

FIG. 8 is a process flow diagram which illustrates a method of a vehicle obtaining a returned item in accordance with an embodiment. A method 800 of obtaining a returned item begins at a step 805 in which a vehicle obtains a notification of a return. In one embodiment, the vehicle may obtain a notification from a fleet management system that assigns deliveries and pick-ups to vehicles included in a fleet.

In a step 809, the vehicle drives to a return location. The return location is generally a hand-off location at which the vehicle is to pick-up a returned item. Once the vehicle arrives at the return location, the vehicle interfaces with a receiver apparatus to transfer a return item from the receiver apparatus to the vehicle in a step 813. Interfacing typically include unlocking or otherwise opening a compartment door on the vehicle, and unlocking or otherwise opening a receptacle door on the receiver apparatus.

The vehicle cooperates with the receiver apparatus in a step 817 to complete a transfer of the item from the receiver apparatus to the vehicle. In one embodiment the vehicle may effectively remove the item from a receptacle of the receiver apparatus. In another embodiment, the receiver apparatus may effectively expel the item from a receptacle. Completing the transfer may include securing the compartment door on the vehicle, and security the receptacle door on the receiver apparatus.

After the transfer of the item is completed, the vehicle drives away from the return location in a step 821. The method of obtaining a returned item is completed once the vehicle obtains the item and drives away.

An unattended delivery may be supported through the use of at least one of a vehicle and a receiver apparatus that includes a transfer mechanism that actively facilitates the delivery of an item. Such a transfer mechanism may create a force or a motion that allows an item to be moved. When the transfer mechanism is located on a vehicle that is to be unloaded, the transfer mechanism causes an item to be pushed off or out of the vehicle. On the other hand, when the transfer mechanism is located on a receiver apparatus that is to be loaded, the transfer mechanism may cause an item to be pulled off of or out of a vehicle.

Figure 9A:
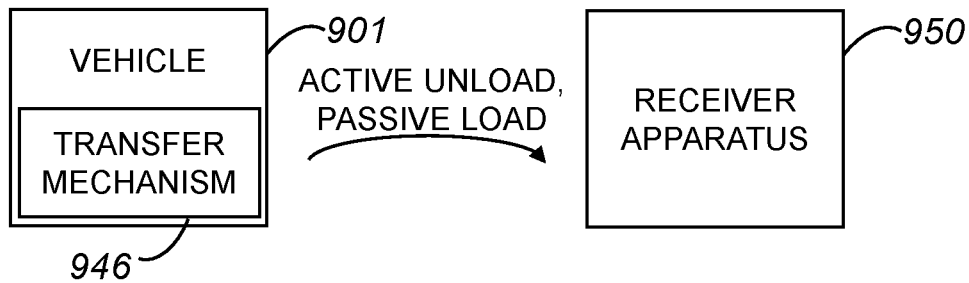
FIG. 9A is a diagrammatic representation of a vehicle that actively unloads an item that is passively received by a receiver apparatus in accordance with an embodiment.

FIG. 9A is a diagrammatic representation of a vehicle that actively unloads an item that is passively received by a receiver apparatus in accordance with an embodiment. A vehicle 901, which may be an autonomous delivery vehicle, includes a transfer mechanism 946. Vehicle 901 is arranged to use transfer mechanism 946 to actively unload an item (not shown) from vehicle 901 and onto or into receiver apparatus 950. The item (not shown) that is actively unloaded from vehicle 901 is passively loaded onto or into receiver apparatus 950, as receiver apparatus 950 does not provide any force or motion that essentially aids in loading the item. In one embodiment, when an item (not shown) is actively unloaded, forces are applied by vehicle 901 to cause the unloading, whereas when the item is passively loaded, substantially no forces are applied by receiver apparatus 950 to cause the loading. In lieu of applying forces, as for example using a linear actuator or a push actuator, vehicle 901 may allow gravity forces to cause an item (not shown) to effectively drop or otherwise descend from vehicle 901 into or onto receiver apparatus 950. That is, vehicle 901 may effectively take advantage of the effects of gravity to facilitate the removal of an item (not shown) from vehicle 901.

Figure 9B:
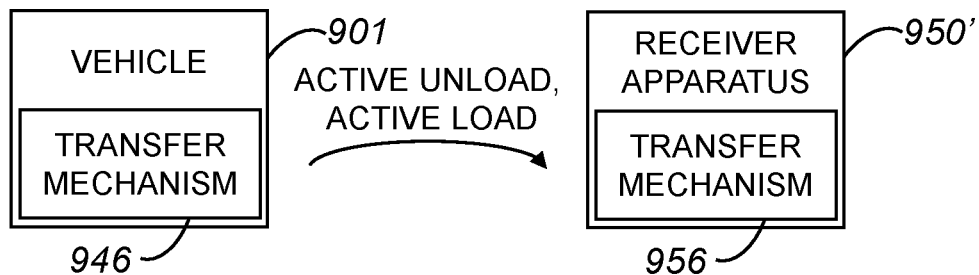
FIG. 9B is a diagrammatic representation of a vehicle, e.g., vehicle 901 of FIG. 9A, that actively unloads an item that is actively received by a receiver apparatus in accordance with an embodiment.

FIG. 9B is a diagrammatic representation of a vehicle, e.g., vehicle 901 of FIG. 9A, that actively unloads an item that is actively received by a receiver apparatus in accordance with an embodiment. Vehicle 901 uses transfer mechanism 946 to actively unload an item (not shown) from vehicle 901. A transfer mechanism 956 of a receiver apparatus 950' is configured to actively load the item (not shown) into receiver apparatus 950'. In general, transfer mechanism 946 and transfer mechanism 956 both actively support the transfer of an item from vehicle 901 to receiver apparatus 950'.

Figure 9C:
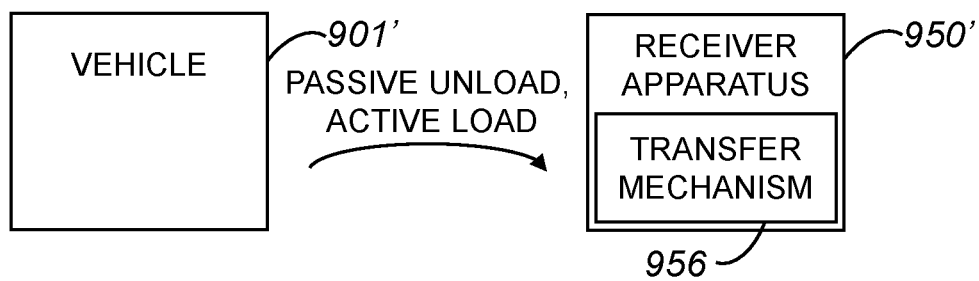
FIG. 9C is a diagrammatic representation of a vehicle that passively unloads an item that is actively received by a receiver apparatus, e.g., receiver apparatus 950' of FIG. 9B, in accordance with an embodiment.

FIG. 9C is a diagrammatic representation of a vehicle that passively unloads an item that is actively received by a receiver apparatus, e.g., receiver apparatus 950' of FIG. 9B, in accordance with an embodiment. A vehicle 901' is configured to passively participate in the unloading of an item (not shown), e.g., an item contained in a compartment of vehicle 901'. Transfer mechanism 956 of receiver apparatus 950' is arranged to actively load an item (not shown) by actively participating in the removal of the item from a compartment of vehicle 901'. In one embodiment, transfer mechanism 956 may substantially reach into a compartment of vehicle 901' to facilitate the removal of an item (not shown).

Figure 10A:
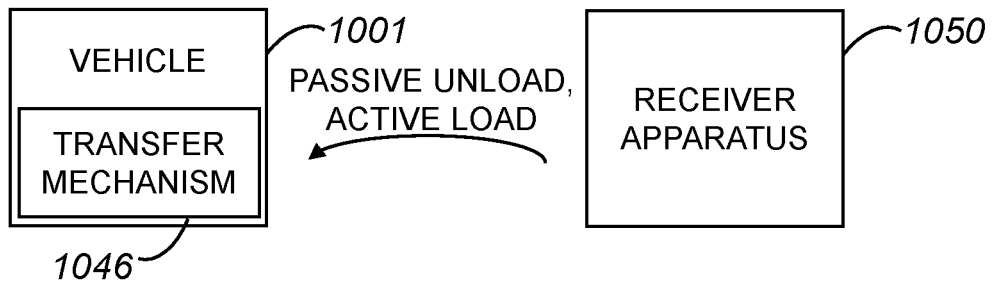
FIG. 10A is a diagrammatic representation of a receiver apparatus that passively unloads a return item that is actively received by a receiver apparatus in accordance with an embodiment.

An unattended return may be supported through the use of at least one of a vehicle and a receiver apparatus that includes a transfer mechanism that actively facilitates the return of an item. FIG. 10A is a diagrammatic representation of a receiver apparatus that passively unloads a return item that is actively received by a receiver apparatus in accordance with an embodiment. A receiver apparatus 1050 is arranged to be passively unloaded. That is, an item (not shown) carried by receiver apparatus 1050 may be passively unloaded from the point-of-view of receiver apparatus 1050. In order to facilitate the unloading of an item (not shown) from receiver apparatus 1050 and onto or into vehicle 101, vehicle 1001 includes a transfer mechanism 1046. Transfer mechanism 1046 is configured to actively load an item (not shown) onto vehicle 1001. In the described embodiment, transfer mechanism 1046 may effectively reach onto or into receiver apparatus 1050 to obtain an item (not shown) carried on receiver apparatus 1050.

Figure 10B:
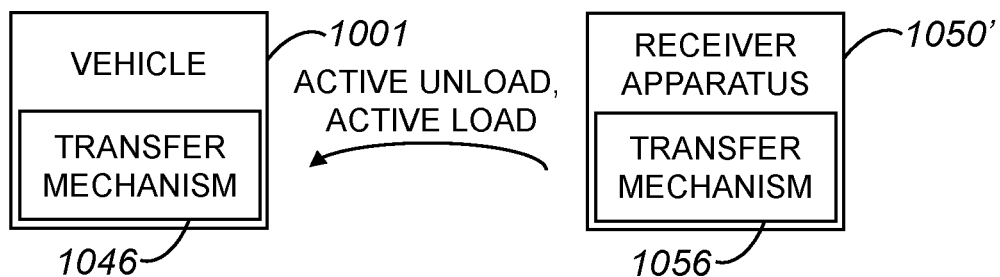
FIG. 10B is a diagrammatic representation of a receiver apparatus that actively unloads a return item to a vehicle, e.g., vehicle 1001 of FIG. 10A, that actively receives the return item in accordance with an embodiment.

FIG. 10B is a diagrammatic representation of a receiver apparatus that actively unloads a return item to a vehicle, e.g., vehicle 1001 of FIG. 10A, that actively receives the return item in accordance with an embodiment. A receiver apparatus 1050' includes a transfer mechanism 1056 that is configured to actively unload an item (not shown) carried by receiver apparatus 1050' Transfer mechanism 1046 of vehicle 1001 is configured to actively load an item (not shown) unloaded from receiver apparatus 1050' onto vehicle 1001.

Figure 10C:
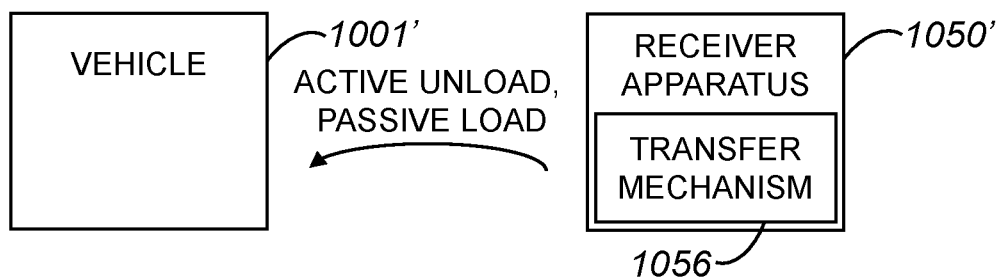
FIG. 10C is a diagrammatic representation of a receiver apparatus, e.g., receiver apparatus 1050' of FIG. 10B, that actively unloads a return item that is passively received by a vehicle in accordance with an embodiment.

FIG. 10C is a diagrammatic representation of a receiver apparatus, e.g., receiver apparatus 1050' of FIG. 10B, that actively unloads a return item that is passively received by a vehicle in accordance with an embodiment. Receiver apparatus 1050' is arranged to utilize transfer mechanism 1056 to actively unload an item (not shown) from receiver apparatus 1050'. In the described embodiment, a vehicle 1001' does not include a transfer mechanism. As such, vehicle 1001' is configured to passively load an item (not shown) onto or into vehicle 1001' once the item is actively uploaded from receiver apparatus 1050' using transfer mechanism 1056.

When a delivery vehicle includes a transfer mechanism, the transfer mechanism may generally be located or positioned in a compartment of the delivery vehicle. It should be appreciated that a compartment of a delivery vehicle may generally be configured to hold items, e.g., items to be delivered. With respect to FIGS. 11A and 11B, the placement of a transfer mechanism within a compartment of a delivery vehicle will be described.

Figure 11A:
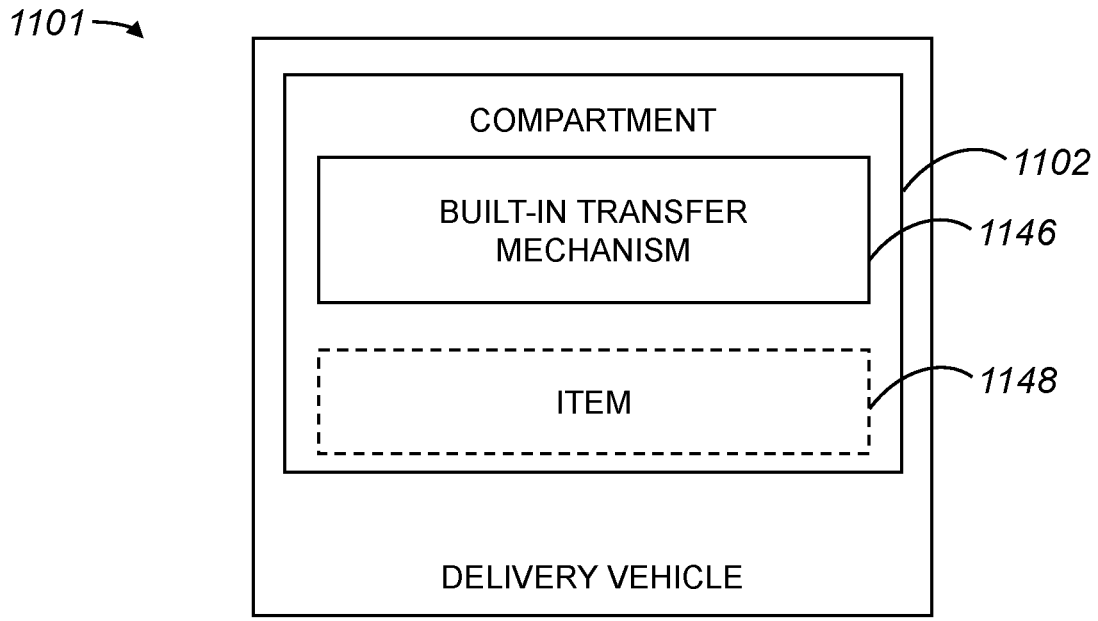
FIG. 11A is a block diagram representation of a vehicle with a compartment that includes a built-in transfer mechanism and is arranged to carry or contain an item in accordance with an embodiment.

FIG. 11A is a block diagram representation of a vehicle with a compartment that includes a built-in transfer mechanism and is arranged to carry or contain an item in accordance with an embodiment. A delivery vehicle 1101, which may be an autonomous delivery vehicle such as vehicle 101 described above with respect to FIG. 3, includes a compartment 1102. Compartment 1102 includes a built-in transfer mechanism 1146. Built-in transfer mechanism 1146 is substantially fixed within compartment 1102, and is arranged to provide forces and/or motion that allows an item 1148 carried within compartment 1102 to be unloaded from compartment 1102. Built-in transfer mechanism 1146 may include, but is not limited to including, a fixed robot or robot arm, a mechanism that is actuated by linear actuator, and/or a mechanism that is actuated by a push actuator.

Figure 11B:
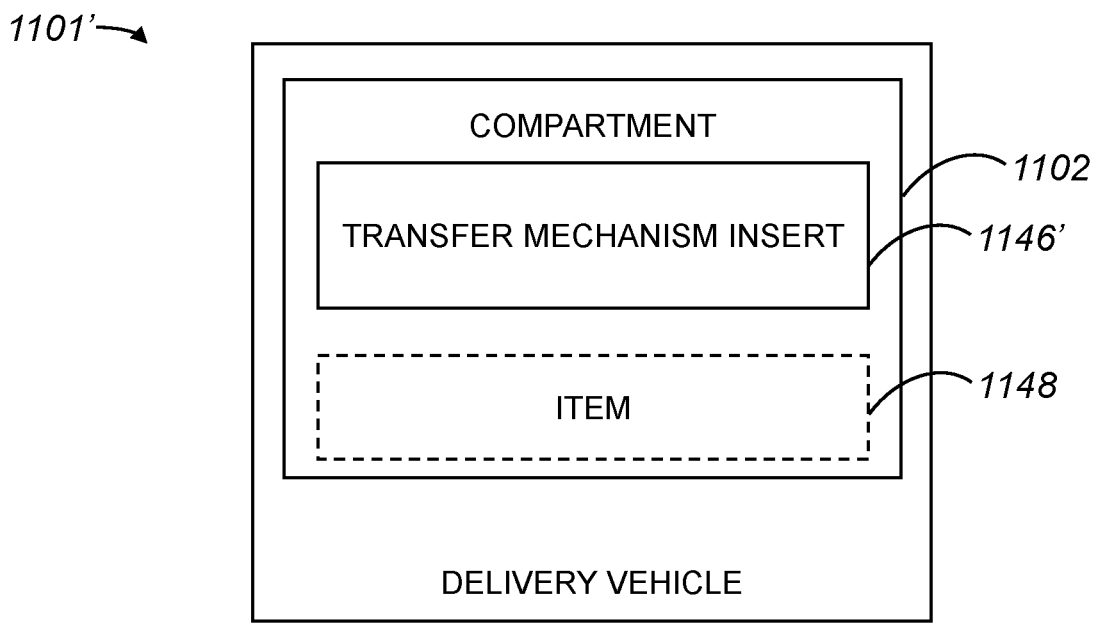
FIG. 11B is a block diagram representation of a vehicle with a compartment that includes a transfer mechanism insert and is arranged to carry an item in accordance with an embodiment.

To provide flexibility in selecting a type of transfer mechanism to use to deliver a particular item, a transfer mechanism in a vehicle may be arranged to be readily replaced. For example, instead of utilizing substantially fixed built-in transfer mechanism 1146, a transfer mechanism that is configured as an insert may be used such that the insert may be readily swapped into and out of a vehicle. FIG. 11B is a block diagram representation of a vehicle with a compartment that includes a transfer mechanism insert and is arranged to carry an item in accordance with an embodiment. A delivery vehicle 1101' includes compartment 1102. Compartment 1102 includes a built-transfer mechanism insert 1146'. Transfer mechanism insert 1146' is removably affixed within compartment 1102, and is arranged to provide forces and/or motion that allows item 1148 carried within compartment 1102 to be unloaded from compartment 1102.

Transfer mechanism insert 1146' may include connections, e.g., mechanical connections and electrical connections, that may be removably coupled with connections within compartment 1102 to allow transfer mechanism insert 1146' to operate. In one embodiment, transfer mechanism insert 1146' may also include a data connection that allows transfer mechanism insert 1146' to receive information from and provide information to vehicle 1101'. In one embodiment, when compartment 1102 is configured to receive modular inserts arranged to hold item 1148, transfer mechanism insert 1146' may be one of the modular inserts.

Figure 12A:
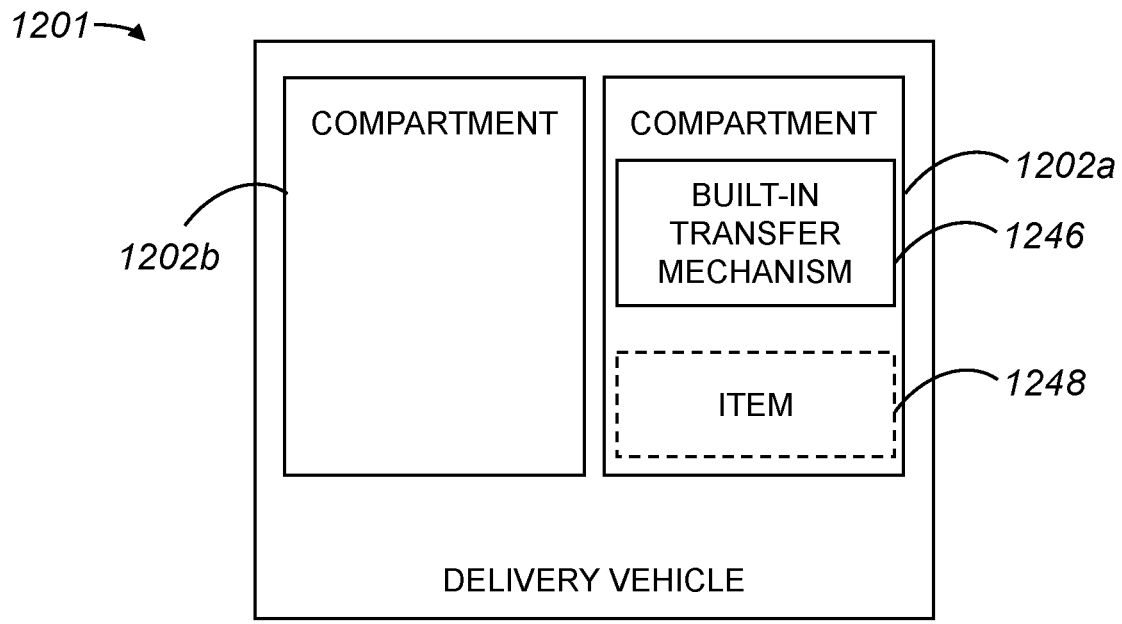
FIG. 12A is a block diagram representation of a vehicle with a plurality of compartments including a first compartment that includes a built-in transfer mechanism and is arranged to carry an item in accordance with an embodiment.

Many delivery vehicles include more than one compartment that may carry items. With respect to FIGS. 12A-C, the positioning of a transfer mechanism within one compartment of multiple compartments of a vehicle will be described. FIG. 12A is a block diagram representation of a vehicle with a plurality of compartments including a first compartment that includes a built-in transfer mechanism and is arranged to carry an item in accordance with an embodiment. A delivery vehicle 1201, which may be an autonomous vehicle, includes compartments 1202a, 1202b. In the embodiment as shown, a first compartment 1202a includes a built-in transfer mechanism 1246 and carries an item 1248 that is arranged to be unloaded from compartment 1202a using built-in transfer mechanism 1246. In one embodiment, built-in transfer mechanism 1246 may be configured to load item 1248 into compartment 1202, in addition to being configured to unload item 1248 from compartment 1202.

Figure 12B:
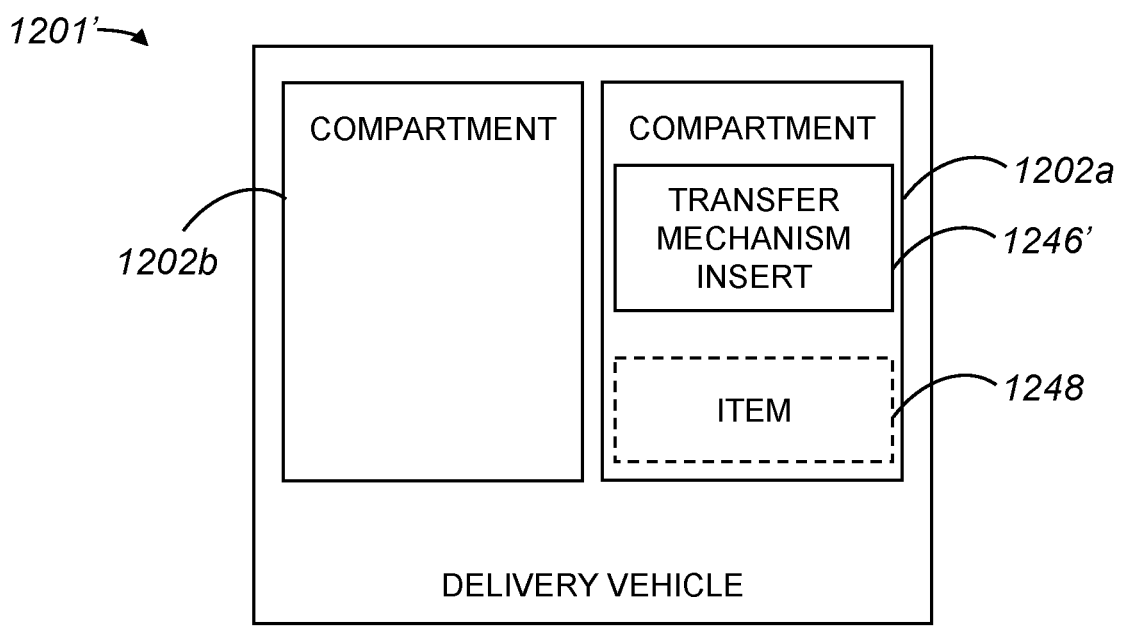
FIG. 12B is a block diagram representation of a vehicle with a plurality of compartments that includes a first compartment that includes a transfer mechanism insert and is arranged to carry an item in accordance with an embodiment.

FIG. 12B is a block diagram representation of a vehicle with a plurality of compartments that includes a first compartment that includes a transfer mechanism insert and is arranged to carry an item in accordance with an embodiment. A delivery vehicle 1201' includes compartments 1202a, 1202b. As shown, first compartment 1202a includes a transfer mechanism insert 1246' and carries item 1248. Transfer mechanism insert 1246' is arranged to be relatively rapidly swapped into and out of compartment 102a. In addition to including a transfer mechanism, transfer mechanism insert 1246' includes connectors which allow transfer mechanism insert 1246' to be physically connected to vehicle 1201', to obtain power from vehicle 1201', and to exchange data with vehicle 1201'. Transfer mechanism insert 1246' is configured to unload item 1248 from compartment 1202a.

In one embodiment, a transfer mechanism may be positioned in one compartment of a vehicle while an item to be delivered may be positioned in a different compartment of the vehicle. In such an embodiment, when compartments are opened, the transfer mechanism in one compartment may be used to unload the item contained in another compartment. For example, if the transfer mechanism is a robotic arm, the robotic arm may reach from a first compartment into a second compartment to pick up an item positioned in the second compartment.

Figure 12C:
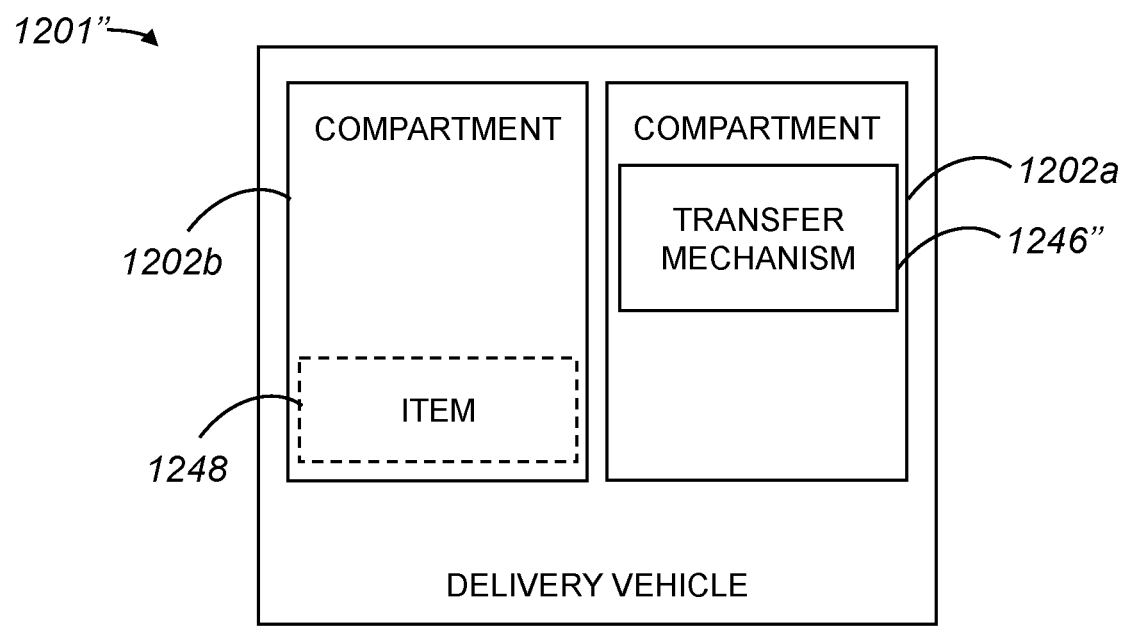
FIG. 12C is a block diagram representation of a vehicle with a plurality of compartments that includes a first compartment that includes a transfer mechanism and a second compartment arranged to carry an item in accordance with an embodiment.

FIG. 12C is a block diagram representation of a vehicle with a plurality of compartments that includes a first compartment that includes a transfer mechanism and a second compartment arranged to carry an item in accordance with an embodiment. A vehicle 1201" includes compartments 1202a, 1202b. First compartment 1202a is arranged to contain a transfer mechanism 1246". Transfer mechanism 1246" may either be built into compartment 1202a, or configured as an insert that is readily removable. Second compartment 1202b is arranged to contain item 1248 which may be unloaded from second compartment 1202b using transfer mechanism 1246".

Figure 13:
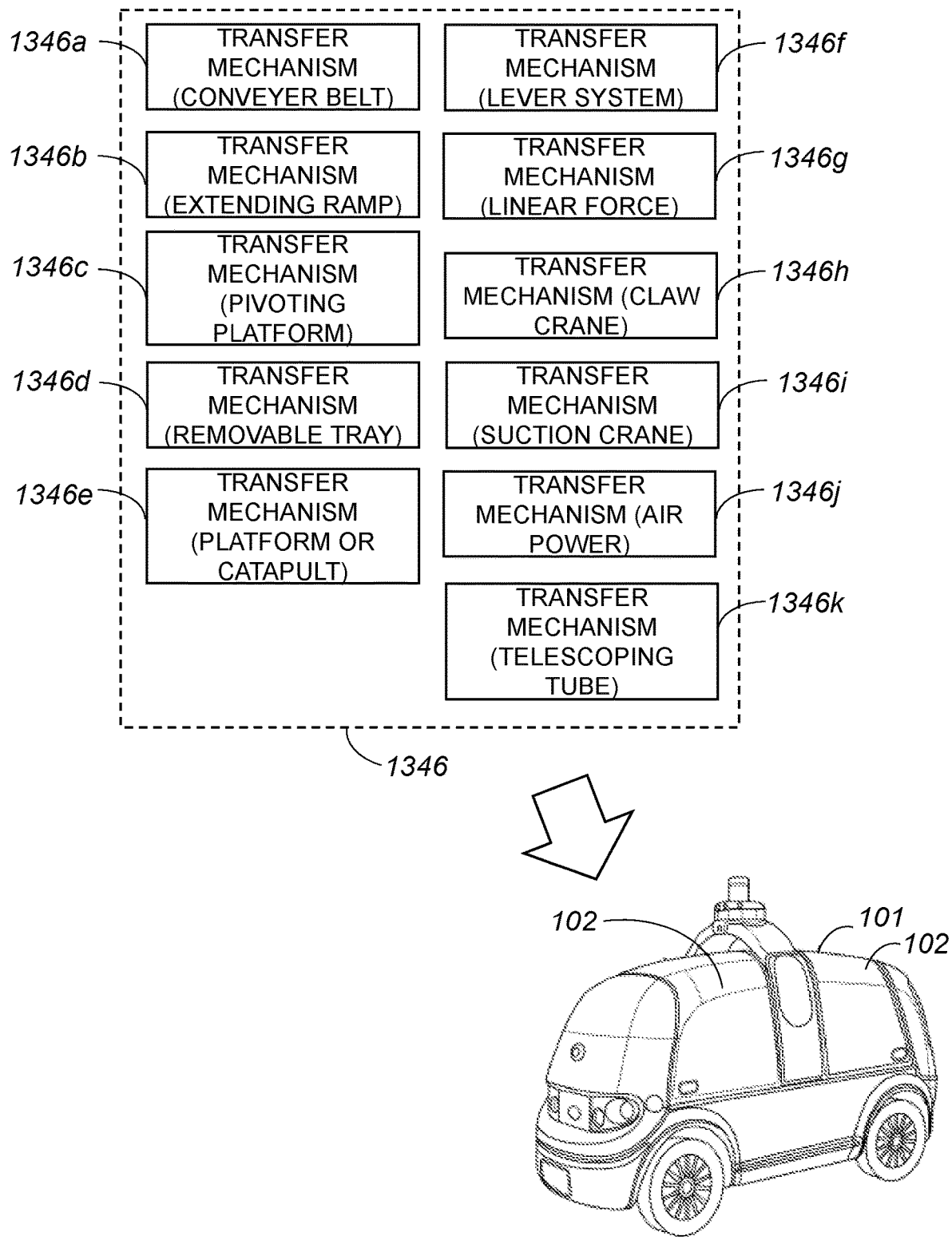
FIG. 13 is a diagrammatic representation of a vehicle that is arranged to include a transfer mechanism suitable for use in unloading an item from a compartment in accordance with an embodiment.

FIG. 13 is a diagrammatic representation of a vehicle that is arranged to include a transfer mechanism suitable for use in unloading an item from a compartment in accordance with an embodiment. Vehicle 101 includes compartments 102. At least one compartment 102 may include a transfer mechanism 1346. Transfer mechanism 1346 may be fixed within a compartment 102, or may be an insert that is arranged to be relatively easy to swap in and out of compartment 102. In other words, transfer mechanism 1346 may be substantially built into compartment 102, or transfer mechanism 1346 may be configured as a module or an insert that may be readily switched with other modules or inserts.

Transfer mechanism 1346 may include any mechanism that is suitable for use in unloading or otherwise removing an item from one of compartments 102. Suitable transfer mechanisms 1346 may include, but are not limited to including, a conveyer belt mechanism 1346*a*, an extending ramp mechanism 1346*b*, a pivoting platform mechanism 1346*c*, a removable tray mechanism 1346*d*, a platform or catapult mechanism 1346*e*, a lever system mechanism 1346*f*, a linear force mechanism 1346*g*, a claw crane mechanism 1346*h*, a suction crane mechanism 1346*i*, an air power arrangement mechanism 1346*j*, and a telescoping tube mechanism 1346*k*.

Conveyer belt mechanism 1346*a* may be substantially fixed to a bottom surface of a compartment 102, or may be part of an insert that is arranged to be removably coupled to a surface of compartment 102. Conveyer belt mechanism 1346*a* may be arranged to utilize pulleys, drums, rollers, and/or motors to allow the belt to effectively move an item that is positioned on conveyer belt mechanism 1346*a* linearly, as for example from a back of compartment 102 to a front of compartment 102. Conveyer belt mechanism 1346*a* may include a conveyer belt that is arranged to rotate approximately 360 degrees, and may wrap around a surface such as a platform surface. In one embodiment, conveyer belt mechanism 1346*a* may drop down or otherwise be deployed from compartment 102 to deliver an item, and may retracted into compartment 102 once the item is delivered, e.g., when conveyer belt mechanism 1346*a* detects that a conveyer belt it is no longer supporting weight. It should be understood that in some embodiments, conveyer belt mechanism 1346*a* may be arranged to rotate until an item effectively drops off an end of a conveyer belt, e.g., into a receptacle such as a locker, a mailbox, or a bin.

Extending ramp mechanism 1346*b* may be substantially fixed to a surface of compartment 102, or may be part of an insert that is arranged to be removably coupled to a surface of compartment 102. Extending ramp mechanism 1346*a* may be configured to include a single, substantially flat surface, or as multiple surfaces, e.g., as rails. When extending ramp mechanism 1346*b* is undeployed or unactivated, extending ramp mechanism 1346*b* may be such that an extending ramp fits within compartment 102. When extending ramp mechanism 1346*b* is deployed or activated, an extending ramp may extend from compartment 102 down to a ground surface, or a surface on which vehicle 101 is positioned. Alternatively, extending ramp mechanism 1346*b* may be deployed such that an extending ramp extends from compartment 102 to a surface or receptacle of a receiver apparatus that is arranged to receive an item from vehicle 101. In one embodiment, extending ramp mechanism 1346*b* may be arranged to change the slope and/or relative height of an extending ramp, depending upon how much of an incline is desired. In another embodiment, extending ramp mechanism 1346*b* may be similar to an automated wheelchair ramp that may be used in a passenger vehicle. Extending ramp mechanism 1346*b* is arranged such that an extending ramp may be retracted into compartment 102 once a delivery is completed.

Pivoting platform mechanism 1346*c* may include a platform surface that is arranged to pivot about a point, e.g., a center point, and may be substantially fixed to a surface of compartment 102, or may be part of an insert that is arranged to be removably coupled to a surface of compartment 102. Pivoting platform mechanism 1346*c* may include a platform surface that is arranged to be raised, or moved up and down in a vertical direction, using an actuator such as a linear motor or a step motor. In one embodiment, pivoting platform mechanism 1346*c* may store a pivoting platform in a substantially flat position, and may be arranged to cause the pivoting platform to pivot or tilt at an angle, as for example an angle of up to approximately sixty degrees, when pivoting platform mechanism 1346*c* is activated to unload an item stored thereon. The pivoting or tilting of pivoting platform mechanism 1346*c* encourages an item stored thereon to effectively slide off of a platform surface. That is, pivoting platform mechanism 1346*c* may include a platform surface that pivots about a point such that the platform surface may be angled or sloped, as for example to enable an item to substantially slide down the platform surface and out of compartment 102. Pivoting platform mechanism 1346*c* may alternatively, or additionally, be configured to cause a platform surface to vibrate or to shake to facilitate the movement of an item off of the platform surface. In one embodiment, pivoting platform mechanism 1346*c* may include a counterweight or a lever system that maintains balance with respect to vehicle 101, when pivoting platform mechanism 1346*c* is activated.

Removable tray mechanism 1346*d* includes a removable tray, or a tray surface, that may extend out of compartment 102 when the removable tray is in a deployed position. Removable tray mechanism 1364*d* may be substantially fixed to a surface of compartment 102, or may be part of an insert that is arranged to be removably coupled to a surface of compartment 102. In one embodiment, the removable tray may extend out of compartment 102 and effectively deposited onto a delivery surface or into a delivery receptacle. As the removable tray holds an item to be delivered, depositing the removable tray onto a delivery surface or into a delivery receptacle also deposits the item onto the delivery surface r into the delivery receptacle.

Platform or catapult mechanism 1364*e* may include a platform on which an item may be placed. Platform or catapult mechanism 1364*d* may be substantially fixed to a surface of compartment 102, or may be part of an insert that is arranged to be removably coupled to a surface of compartment 102. A platform may be spring-loaded such that the platform or catapult mechanism 1364*e* includes the platform and at least one spring. The spring, which may be any suitable spring such as a coiled spring or a constant force spring, is arranged to be activated when vehicle 101 is ready to transfer an item held on the platform. In one embodiment, when a door on compartment 102 is opened and an item stored on the platform is ready to be transferred, the spring may be activated or otherwise released such that the item is effectively ejected from compartment 102.

Lever system mechanism 1346*f* may either be substantially fixed to a surface of compartment 102, or may be included as a part of an insert that is arranged to be removably coupled to a surface of compartment 102. Lever system mechanism 1346*f* may include a lever and a counterweight which are arranged such that when a lever is moved, e.g., rotated or pivoted with respect to a fulcrum, the counterweight may serve to balance the movement of the lever to enable vehicle 101 to remain substantially stable. An item may be stored on the lever, and the lever may be extended out of compartment 102 such that the item is unloaded from compartment 102 when vehicle 101 is ready to deliver the item.

Linear force mechanism 1346*g* may include a surface that is configured to effectively push an item out of compartment 102 to complete a delivery of the item, and may be substantially fixed to a surface of compartment 102, or may be included as a part of an insert that is arranged to be removably coupled to a surface of compartment 102. The surface included in linear force mechanism 1346*g* may be a face of a plate that is arranged to apply a force or a pressure to the item to cause the item to move. Linear force mechanism 1346g may include an actuator such as a linear motor that allows the plate to push the item. In one embodiment, the plate may be contoured to facilitate the movement of the item. By way of example, the plate may be shaped as a shovel to allow the item to essentially be scooped out of compartment 102. In one embodiment, linear force mechanism 1346g may be configured to substantially grab onto an item and to retract such that the item may be moved deeper into compartment 102, as for example when the item is obtained by vehicle 101.

Claw crane mechanism 1346h may be substantially fixed to a surface of compartment 102, or may be part of an insert that is arranged to be removably coupled to a surface of compartment 102. Claw crane mechanism 1346h generally includes a crane component and a claw component attached to the crane component. When the crane component is activated or deployed, the crane component may be arranged to bend, pivot, move linearly, and/or rotate such that the claw component may be positioned to grab an item stored in component 102. In one embodiment, the crane component may be a robotic arm. The claw component may be arranged to grip an item while the crane component manipulates the claw component to move the item onto or into a receiver apparatus. As will be appreciated by those skilled in the art, once the item is in a desired position, the claw component may release the item and the crane mechanism may return to an undeployed state.

Suction crane mechanism 1346i may be substantially fixed to a surface of compartment 102, or may be part of an insert that is arranged to be removably coupled to a surface of compartment 102. Suction crane mechanism 1346i generally includes a crane component and a suction component attached to the crane component. When the crane component is activated or deployed, the crane component may be arranged to bend, pivot, move linearly, and/or rotate such that the suction component may be positioned to grip an item stored in component 102. The crane component, which may be a robotic arm, may be arranged to apply a vacuum, or a negative pressure, such that the suction component may use suction to grip the item. The suction component may be arranged to grip an item while the crane component manipulates the suction component to move the item onto or into a receiver apparatus. As will be appreciated by those skilled in the art, once the item is in a desired position, the suction component may release the item by applying a positive pressure, i.e., by substantially eliminating the vacuum, and the crane mechanism may return to an undeployed state.

Air power mechanism 1346j may be substantially fixed to a surface of compartment 102, or may be part of an insert that is arranged to be removably coupled to a surface of compartment 102. In general, air power mechanism 1346j is configured to provide a gust of air that effectively blow an item out of compartment 102 when vehicle 101 is ready to hand-off the item, e.g., to a receiver apparatus. Air power mechanism 1346j may include an air compressor which enables a gust of air to be generated.

Telescoping tube mechanism 1346k may be substantially fixed to a surface of compartment 102, or may be part of an insert that is arranged to be removably coupled to a surface of compartment 102. Telescoping tube mechanism 1346k may generally include a telescoping tube and an actuator that is arranged to cause the telescoping tube to be deployed and to be retracted. The telescoping tube may be arranged such that an item may slide or otherwise move through the telescoping tube from compartment 102 to receiver apparatus. In one embodiment, telescoping tube mechanism 1346k may include a telescoping tube that is supported by rails or slides. In such an embodiment, the telescoping tube may be substantially powered to expand along rails or slides through the use of an actuator, e.g., a linear actuator.

One or more transfer mechanisms 1346a-k may generally be used to effectuate a delivery or a return. That is, multiple transfer mechanisms 1346a-k may be used in cooperation with each other to accomplish a delivery or a return. For example, conveyer belt mechanism 1346a may be used in conjunction with an extending ramp mechanism 1346b. Alternatively, pivoting platform mechanism 1346c may be used in conjunction with linear force mechanism 1346g. When more than one transfer mechanism 1346a-k is included on vehicle 101, as for example in one or more compartments 102, transfer mechanisms 1346a-k may be built-in, or may be included in one or more inserts.

Figure 14:
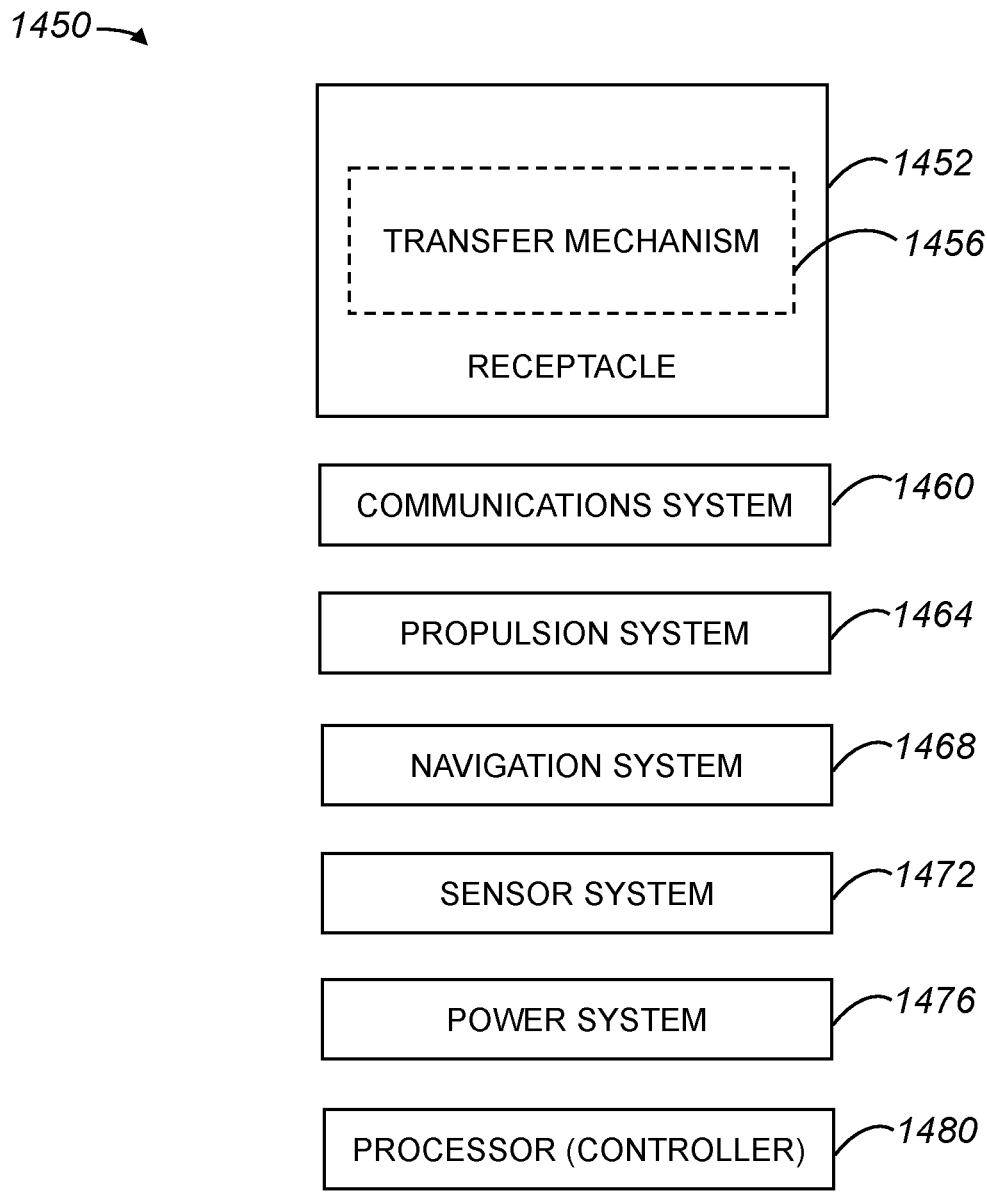
FIG. 14 is a block diagram representation of a receiver apparatus arranged to receive or otherwise retrieve an item from a delivery vehicle in accordance with an embodiment.

A receiver apparatus which is arranged to accept a delivery from a vehicle and/or to provide a return item to a vehicle may be mobile or non-mobile, i.e., substantially stationary. FIG. 14 is a block diagram representation of a receiver apparatus arranged to receive or otherwise retrieve an item from a delivery vehicle in accordance with an embodiment. A receiver apparatus 1450 is, in the one embodiment, a mobile receiver apparatus. Receiver apparatus 1450 includes a receptacle or compartment 1452 that is arranged to hold an item, e.g., a delivered item or an item to be returned. Receptacle 1452 may include an optional transfer mechanism 1456. Transfer mechanism 1456 may be included when receiver apparatus 1450 is arranged to actively load and/or actively unload an item from receptacle 1452. Examples of transfer mechanism 1456 will be discussed below with reference to FIGS. 15 and 17.

Receiver apparatus 1450 also includes a communications system 1460, a propulsion system 1464, a navigation system 1468, a sensor system 1472, a power system 1476, and a processor 1480. Communications system 1460 is configured to allow receiver apparatus 1450 to communicate, e.g., wirelessly, on a network. For example, communications system 1460 may be configured to allow receiver apparatus 1450 to communicate with a fleet management system and/or a customer on a mesh network, a cellular network, a 3G/4G/5G network, and/or a satellite network. In general, communications system 1460 may include a transmitter and a receiver.

Propulsion system 1464 is configured to allow receiver apparatus 1450 to propel itself. That is, propulsion system 1464 may be a conveyance system that is generally arranged to allow receiver apparatus 1450 to drive, translate, or generally move. Propulsion system 308 may be arranged to cause components (not shown) of receiver apparatus 1450 such as a propulsion engine, wheels, steering, and braking systems to cooperate to propel receiver apparatus 1450.

Navigation system 1468 is arranged to cooperate with propulsion system 1464 to cause receiver apparatus 1450 to be propelled to a hand-off location, or a location at which receiver apparatus 1450 is to either receive a delivered item from a vehicle or provide a return item to a vehicle. Navigation system 1468 may utilize sensors in sensor system 1472 to facilitate the navigation of receiver apparatus 1450 from a base location, or a default location at which receiver apparatus 1450 resides, to a hand-off location, and vice versa.

Power system 1476 is arranged to provide power to receiver apparatus 1450. Power may be provided as any suitable type of power. In one embodiment, power system 1476 is powered by electricity, and a battery included in power system 1476 may be charged when receiver apparatus 1450 is docked at a base location.

Processor 1480 is generally arranged to send instructions to and to receive instructions from or for components of receiver apparatus 1450. That is, processor 1480 is arranged to send instructions to and to receive instructions from communications system 1460, propulsion system 1464, navigation system 1468, sensor system 1472, and power system 1476. In one embodiment, processor 1480 may send instructions to and receive instructions from receptacle 1452 which allow for a door or cover on receptacle 1452 to be opened and closed, and also allows for transfer mechanism 1456 to be activated and deactivated. In one embodiment, processor 1480 may include a controller which cooperates with processor 1480 to provide control signals, as for example control signals which activate transfer mechanism 1456.

It should be appreciated that if receiver apparatus 1450 is a substantially stationary apparatus, receiver apparatus 1450 may be configured such that receiver apparatus does not include propulsion system 1464 and/or navigation system 1468. That is, when receiver apparatus 1450 is not arranged to be mobile, propulsion system 1464 and navigation system 1468 may be substantially eliminated from receiver apparatus 1450.

Figure 15:
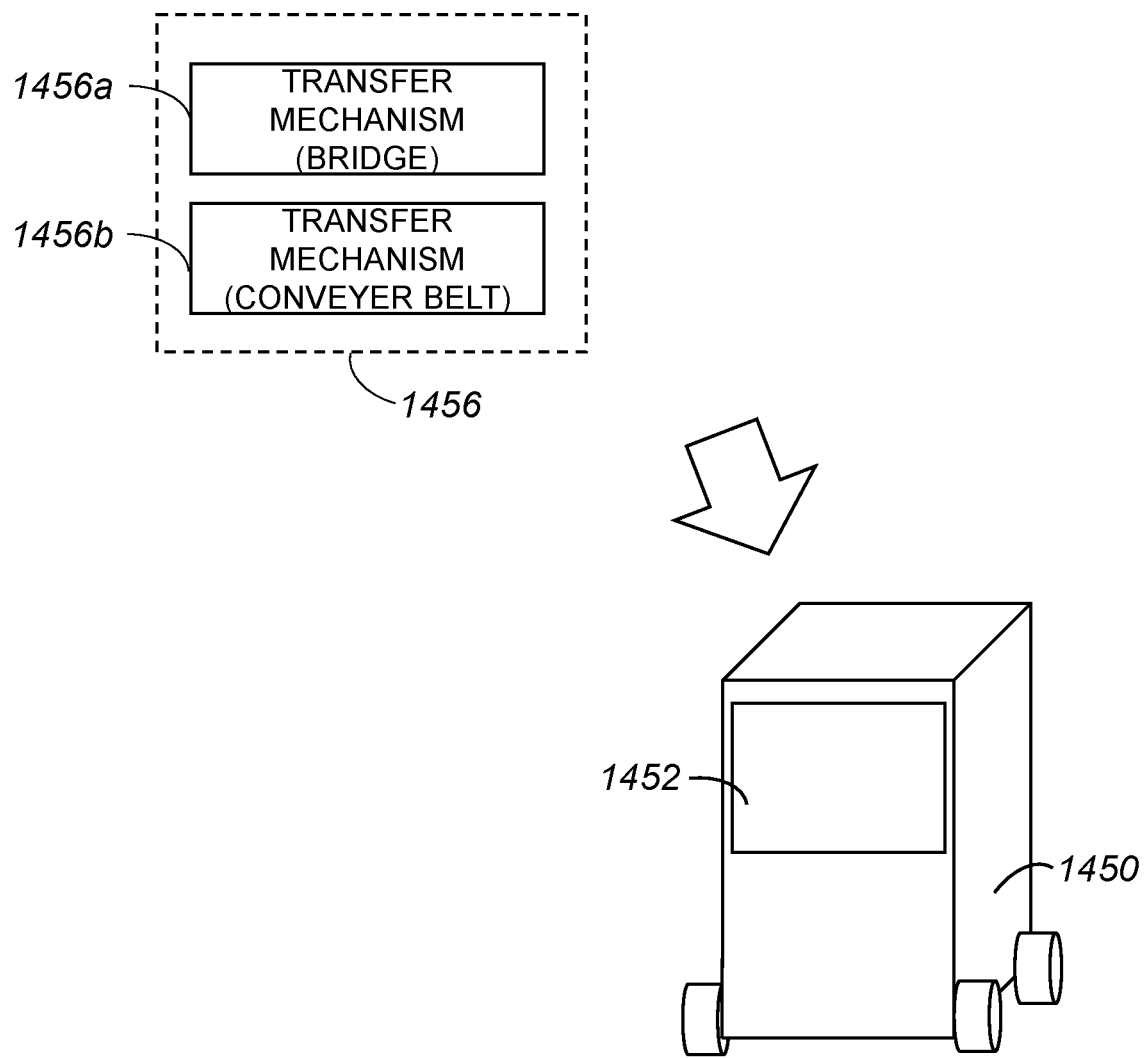
FIG. 15 is a diagrammatic representation of a receiver apparatus that is arranged to include a transfer mechanism suitable for use in receiving an item from a compartment of a vehicle in accordance with an embodiment.

As discussed above, e.g., with respect to FIGS. 8A-C and FIGS. 9A-C, a receiver apparatus may be arranged to actively obtain an item from a vehicle and/or to actively provide an item to the vehicle. When a receiver apparatus is configured to actively load and/or unload an item, the receiver apparatus may include a transfer mechanism. FIG. 15 is a diagrammatic representation of receiver apparatus 1450 that is arranged to include transfer mechanism 1456 which is suitable for use in actively receiving an item or removing an item in accordance with an embodiment. Receiver apparatus 1450 includes receptacle or compartment 1452, in which transfer mechanism 1456 may be located. It should be appreciated that while transfer mechanism 1456 is generally described as being located in receptacle 1452, transfer mechanism 1456 may instead be located elsewhere on receiver apparatus 1450.

Transfer mechanism 1456 may be any suitable mechanism that may actively, or dynamically, involved in a transfer process. For example, transfer mechanism 1456 may be a bridge 1456*a* or a conveyer belt 1456*b*. Bridge 1456*a* may be a cantilever or similar mechanism that may be extended from receiver apparatus 1450 to a vehicle such that the vehicle may cause an item to be moved onto bridge 1456*a*. In one embodiment, once an item is moved onto bridge 1456*a*, bridge 1456*a* may be retracted such that the item is effectively moved into receptacle 1452. Conveyer belt 1456*b* may be included in receptacle 1452, and may be activated to facilitate the movement of an item into receptacle 1452 once the item is placed onto conveyer belt 1456*b*. In one embodiment, conveyer belt 1456*b* may be arranged to be extended out of receptacle 1452 to receive an item from a vehicle, activated and substantially simultaneously retracted to cause the item to move into receptacle 1452.

It should be appreciated transfer mechanism 1456 may be locked with, or otherwise coupled to, a transfer mechanism of a vehicle to facilitate the transfer of an item. By way of example, bridge 1456*a* may be locked with a platform of a vehicle to allow an item to move from the platform and onto bridge 1456*a*.

Figure 16:
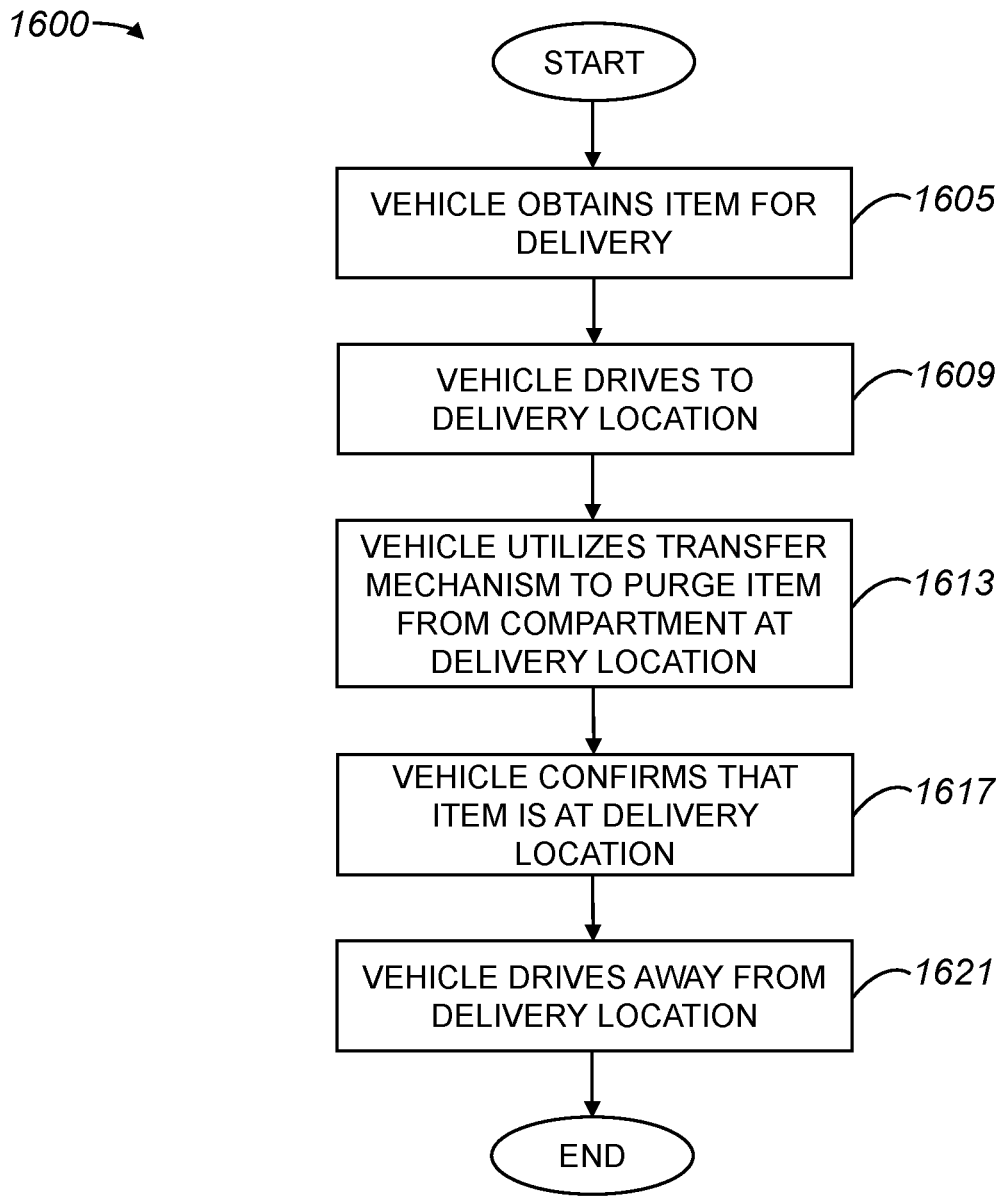
FIG. 16 is a process flow diagram which illustrates a method of a vehicle delivering an item to a delivery location, e.g., a delivery location without a receiver apparatus, in accordance with an embodiment.

An unattended delivery may occur at a location without a receiver apparatus. For example, a customer may not have access to a receiver apparatus, and may expect an unattended delivery to deposit delivered items on a driveway, sidewalk, a doorstep, or at curbside. Alternatively, a drive-thru arrangement may be used such that an unattended delivery is expected to be dropped off at a drive-thru window. Referring next to FIG. 16, a method of executing an unattended delivery to a delivery location without a receiver apparatus will be described in accordance with an embodiment. A method 1600 of performing an unattended delivery to a location with no available receiver apparatus begins at a step 1605 in which a delivery vehicle, as for example an autonomous delivery vehicle, obtains an item to be delivered to a customer location. In one embodiment, the item is loaded in a compartment on the delivery vehicle. It should be appreciated that the item may be loose, or the item may be packaged, as for example packaged in a locker that is loaded in a compartment on the delivery vehicle.

The vehicle drives, in a step 1609, to a delivery location. Once the vehicle arrives at the delivery location, the vehicle utilizes an onboard transfer mechanism to effectively purge or unload the item from the compartment in a step 1613. Purging the item from the compartment may include, but is not limited to including, opening a compartment door, and activating a transfer mechanism to deposit the item on a surface at the delivery location. For example, when the transfer mechanism includes a telescoping tube or an extending ramp, forces may be applied to the item to encourage the item to slide through the telescoping tube or the extending ramp and onto a surface at the delivery location.

After the item is purged from the compartment, the vehicle confirms that the item is at the delivery location at a step 1617. Confirming the successful delivery of the item generally involves notifying the customer of the presence of the item at the delivery location and may include, but is not limited to including, taking a still photo or a video that shows the presence of the item at the delivery location and providing the photo or video to the customer. It should be appreciated that confirming the successful delivery of the item generally includes sending a message such as an email message or a text message to the customer. Such a message may be sent to the customer by a fleet management system, for example, after the vehicle signals to the fleet management system that the delivery of the item has been completed. Communications between a vehicle and a fleet management system may occur wirelessly using networks such as a mesh network, a cellular network, and/or a satellite network.

Upon confirming that the item is at the delivery location, process flow process to a step 1621 in which the vehicle drives away from the delivery location. The vehicle generally deactivates the transfer mechanism and closes the compartment door before driving away from the delivery location. The method of performing an unattended delivery at a location without an available receiver apparatus is completed once the vehicle drives away from the location.

Figure 17:
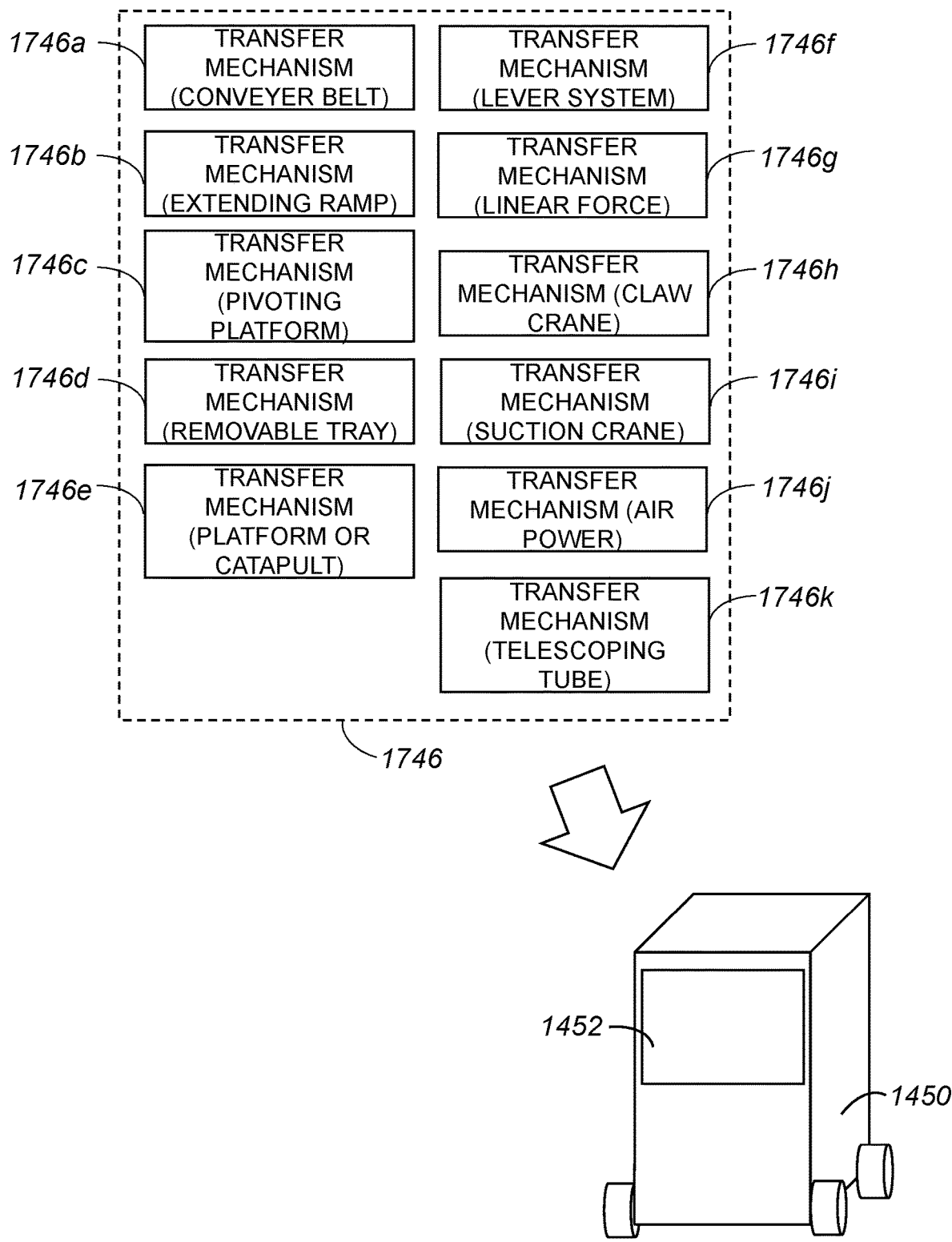
FIG. 17 is a diagrammatic representation of a receiver apparatus that includes a transfer mechanism suitable for use in transferring a return item from the receiver apparatus to a delivery vehicle in accordance with an embodiment.

As mentioned above, a receiver apparatus may include a transfer mechanism. In one embodiment, a receiver apparatus may include a transfer mechanism that is suitable for unloading an item from the receiver apparatus and depositing the item into a vehicle. For example, when a receiver apparatus is used in an unattended return process, the receiver apparatus may move an item loaded onto the receiver apparatus onto or into an autonomous delivery vehicle. Alternatively, the receiver apparatus may use an onboard transfer mechanism to actively facilitate a removal of an item from an autonomous delivery vehicle. FIG. 17 is a diagrammatic representation of a receiver apparatus that includes a transfer mechanism suitable for use in transferring a return item from the receiver apparatus to a delivery vehicle in accordance with an embodiment. Receiver apparatus 1450 includes receptacle or a compartment 1452 that is arranged to hold an item. In the described embodiment, receptacle 1452 is arranged to hold a return item, or an item that is to be provided to a delivery vehicle for return to an establishment.

Receiver apparatus 1450 may be a mobile locker such as a smart mobile locker that is arranged to be commanded to propel itself from a base to a hand-off location, and back to the base. Alternatively, receiver apparatus 1450 may be a stationary locker or mailbox such as a smart locker or smart mailbox that is substantially permanently located at a hand-off location.

A transfer mechanism 1746 may generally be located on or in receiver apparatus 1450, as for example within receptacle 1452. In general, transfer mechanism 1746 is configured to facilitate the active removal or purging of an item from receptacle 1452. The item may be substantially loose, or the item may be packaged in a locked box such as a small locker that is arranged to be loaded in receptacle 1452. Suitable transfer mechanisms 1746 include, but are not limited to including, a conveyer belt 1746a, an extending ramp 1746b, a pivoting platform 1746c, a removable tray 1746d, a platform or a catapult 1746e, a lever system 1746f, a linear force arrangement 1746g, a claw crane 1746h, a suction crane 1746i, an air power arrangement 1746j, and/or a telescoping tube 1746k.

In general, an overall framework or system that facilitates unattended deliveries includes a fleet management system or a dispatch center. The fleet management system may schedule and dispatch delivery vehicles to customer locations. The fleet management system may also communicate with customers and/or with receiver apparatuses in the possession of the customers. Alternatively, delivery vehicles may communicate substantially directly with customers and/or receiver apparatuses.

Figure 18A:
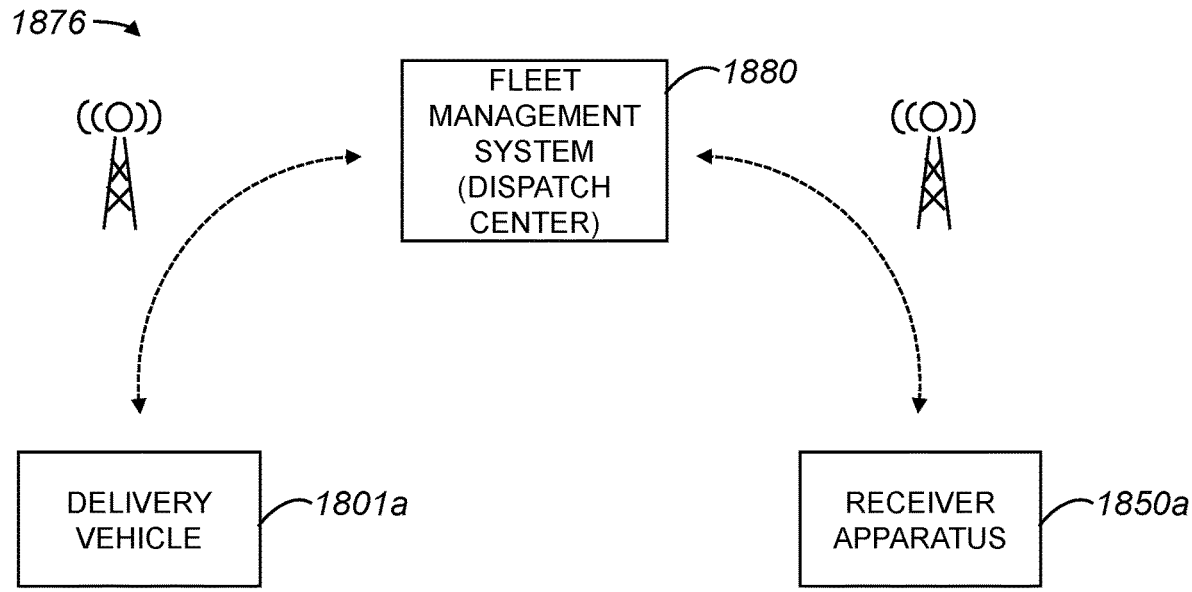
FIG. 18A is a diagrammatic representation of an overall system in which a delivery vehicle and a receiver apparatus communicate through a fleet management system in accordance with an embodiment.

FIG. 18A is a diagrammatic representation of an overall unattended delivery system in which a delivery vehicle, e.g., an autonomous delivery vehicle, and a receiver apparatus communicate through a fleet management system in accordance with an embodiment. A system 1876 includes a fleet management system 1880, at least one delivery vehicle 1801a, and at least one receiver apparatus 1850a. Fleet management system 1880 is generally configured to coordinate a fleet of vehicles including vehicle 1801a, and to communicate with fleet owners, fleet operators, customer vendors, service providers, etc. to substantially optimize the assignment and coordination of deliveries. In some embodiments, fleet management system 1880 may include, or at least be in communication with, a dispatch server or a central server.

Fleet management system 1880 may communicate with vehicle 1801a to determine when vehicle 1801a arrives at a customer hand-off location, e.g., a drop-off or pick-up location. In one embodiment, GPS signals may be used to pinpoint the location of vehicle 1801a such that fleet management system 1880 may initiate a hand-off sequence, or effectively initiate a hand-off process between vehicle 1801a and receiver apparatus 1850a. As part of the hand-off sequence, fleet management system 1880 may communicate with receiver apparatus 1850a to prepare receiver apparatus 1850a to receive an item delivered by vehicle 1801a. For example, when receiver apparatus 1850a is a mobile apparatus such as a smart mobile locker, fleet management system 1880 may communicate with receiver apparatus 1850a to cause receiver apparatus 1850a to propel itself to a drop-off or pick-up location, and/or to cause receiver apparatus 1850 to open a door on a receptacle. Communications may be accomplished in any suitable manner including, but not limited to including, network communications such as mesh network communications, cellular communications, 3G/4G/5G communications, and satellite communications.

Figure 18B:
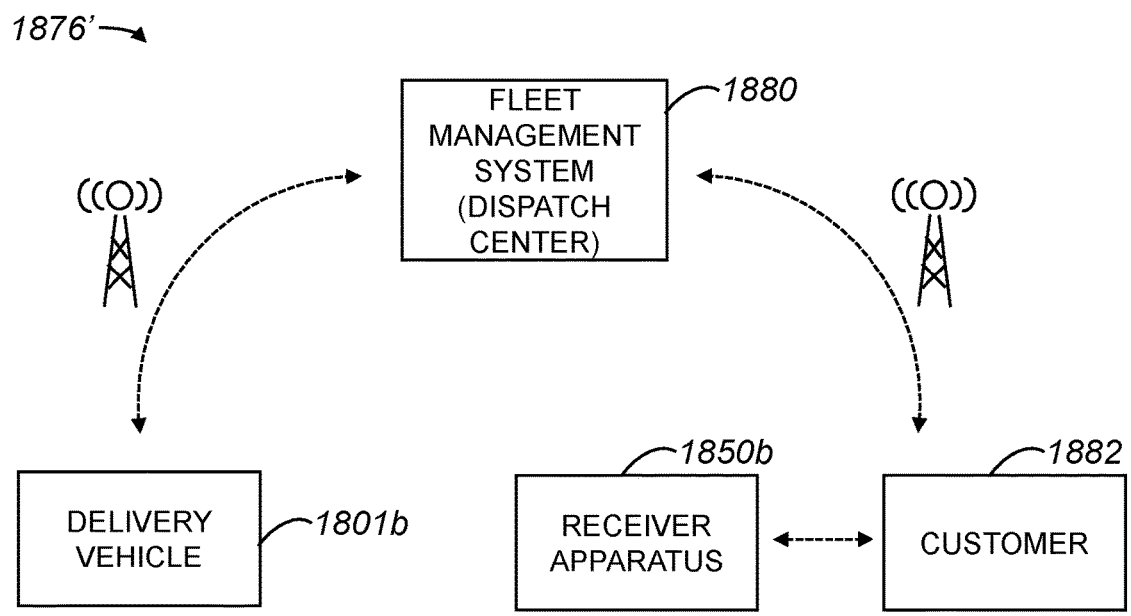
FIG. 18B is a diagrammatic representation of an overall system in which a delivery vehicle and a customer communicate through a fleet management system in accordance with an embodiment.

In lieu of communicating substantially directly with a receiver apparatus, a fleet management system may instead communicate with a customer who then communicates with the receiver apparatus. FIG. 18B is a diagrammatic representation of an overall system in which a delivery vehicle and a customer communicate through a fleet management system in accordance with an embodiment. An overall system 1876' includes fleet management system 1880, a delivery vehicle 1801b, a customer 1882, and a receiver apparatus 1850b. Fleet management system 1880 may communicate with vehicle 1801b to dispatch vehicle 1801b to a customer hand-off location, and to determine when delivery vehicle 1801b arrives at the customer hand-off location.

Fleet management system 1880 may communicate with customer 1882 to notify customer 1882 of the status of vehicle 1801b, and effectively provide customer 1882 with information relating to when customer 1882 should prepare receiver apparatus 1850b to interface with delivery vehicle 1801b. Fleet management system 1880 may communicate with customer 1882 using any suitable form of communication. By way of example, fleet management system 1880 may cause customer 1882 to receive a phone call, a text message, an email, or any other notification via network communications. A notification may include a picture of a delivery. In one embodiment, fleet management system 1880 may host an application that may be used to enable customer 1882 to obtain notifications or, more generally, information from fleet management system 1880.

Upon being provided with information relating to a status of vehicle 1801b, customer 1882 may cause receiver apparatus 1850b to propel to a customer hand-off location and/or to prepare to obtain an item from or provide an item to delivery vehicle 1801b, e.g., by effectively opening a receptacle such that the item may be deposited or otherwise placed therein. Customer 1882 may communicate with receiver apparatus 1850b using communications such as cellular communications, Wi-Fi network communications, radio frequency identification (RFID) communications, and/or Bluetooth communications. In one embodiment, customer 1882 may directly interface with receiver apparatus 1850b, as for example when receiver apparatus 1850b includes a keypad or a touchscreen that allows commands to be provided.

Figure 18C:
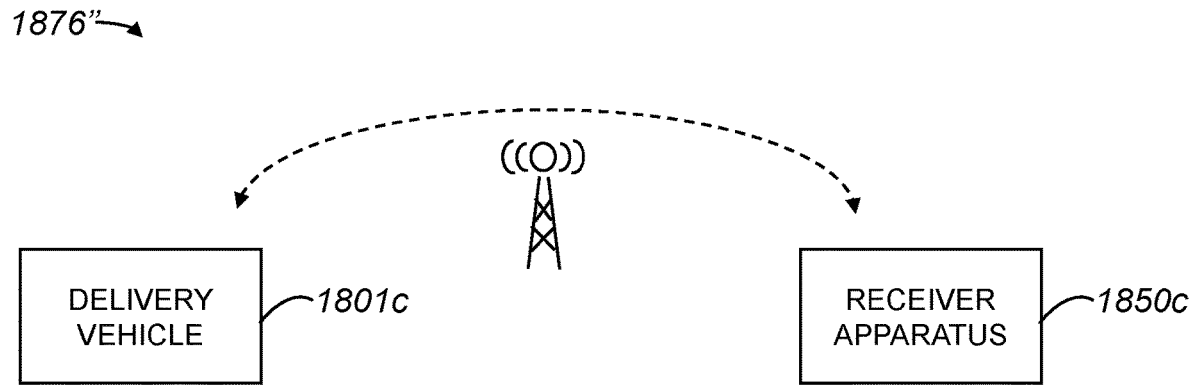
FIG. 18C is a diagrammatic representation of an overall system in which a delivery vehicle and a receiver apparatus communicate substantially directly in accordance with an embodiment.

In some instances, a delivery vehicle may be capable of communicating substantially directly with a receiver apparatus. By way of example, a delivery vehicle may communicate with a receiver apparatus via Wi-Fi or Bluetooth communications when the delivery vehicle is within a particular range of the receiver apparatus. FIG. 18C is a diagrammatic representation of an overall system in which a delivery vehicle and a receiver apparatus communicate substantially directly in accordance with an embodiment. An overall system 1876" includes a delivery vehicle 1801c and a receiver apparatus 1850c. As vehicle 1801c approaches a customer hand-off location, vehicle 1801c may determine that it is within a predetermined range of receiver apparatus 1850c. When vehicle 1801c is within the predetermined range of receiver apparatus 1850c, vehicle 1801c and receiver apparatus 1850c may communicate to effectively coordinate the exchange of an item between vehicle 180*ac* and receiver apparatus 1850*c*. In one embodiment, receiver apparatus 1850 may broadcast its location periodically via radio pings that may be received by vehicle 1801*c* as vehicle 1801*c* approaches the customer hand-off location. Through the use of such pings, vehicle 1801*c* may determine where receiver apparatus 1850*c* is located.

In one embodiment, vehicle 1801*c* and receiver apparatus 1850*c* may communicate even when vehicle 1801*c* is not within a predetermined range of receiver apparatus 1850*c*. For example, vehicle 1801*c* and receiver apparatus 1850*c* may communicate using cellular communications and/or satellite communications.

Figure 18D:
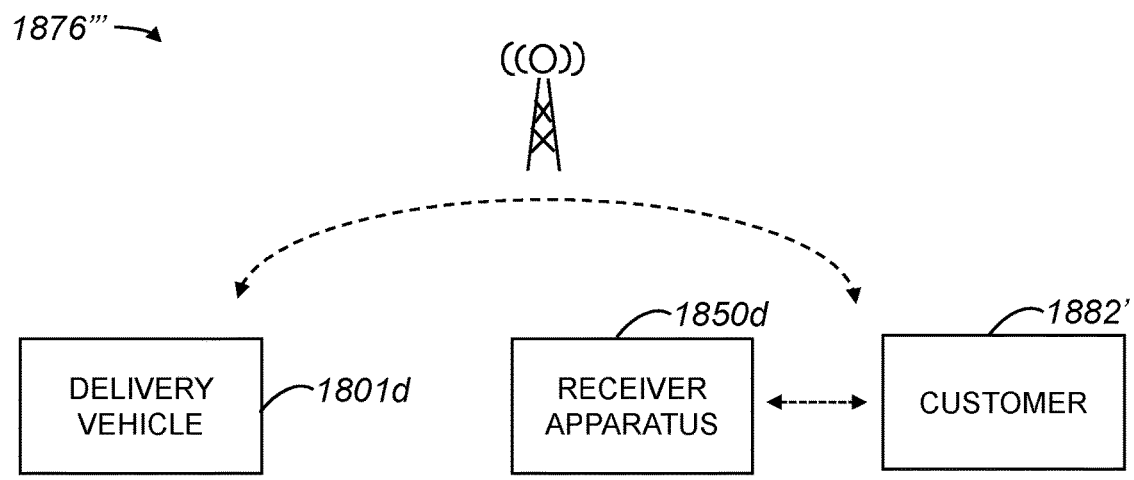
FIG. 18D is a diagrammatic representation of an overall system in which a delivery vehicle and a customer communicate substantially directly in accordance with an embodiment.

An unattended delivery system may include a delivery vehicle that communicates directly with a customer. With reference to FIG. 18D, an overall system in which a delivery vehicle and a customer communicate substantially directly will be described in accordance with an embodiment. An overall system 1876' includes a delivery vehicle 1801*d*, a customer 1882', and a receiver apparatus 1850*d*. Vehicle 1801*d* may communicate substantially directly with customer 1882' to notify customer 1882' when vehicle 1801*d* is scheduled to arrive at a customer hand-off location and/or has arrived at the customer hand-off location. Vehicle 1801*d* may communicate with customer 1882' over a network such as a cellular network in order to provide customer 1882' with status information. Customer 1882' may communicate with receiver apparatus 1850*d* to prepare receiver apparatus 1850*d* to interface with delivery vehicle 1801*d* at a customer hand-off location, e.g., to cause receiver apparatus 1850*d* to propel itself from a base to the customer hand-off location.

Figure 19A:
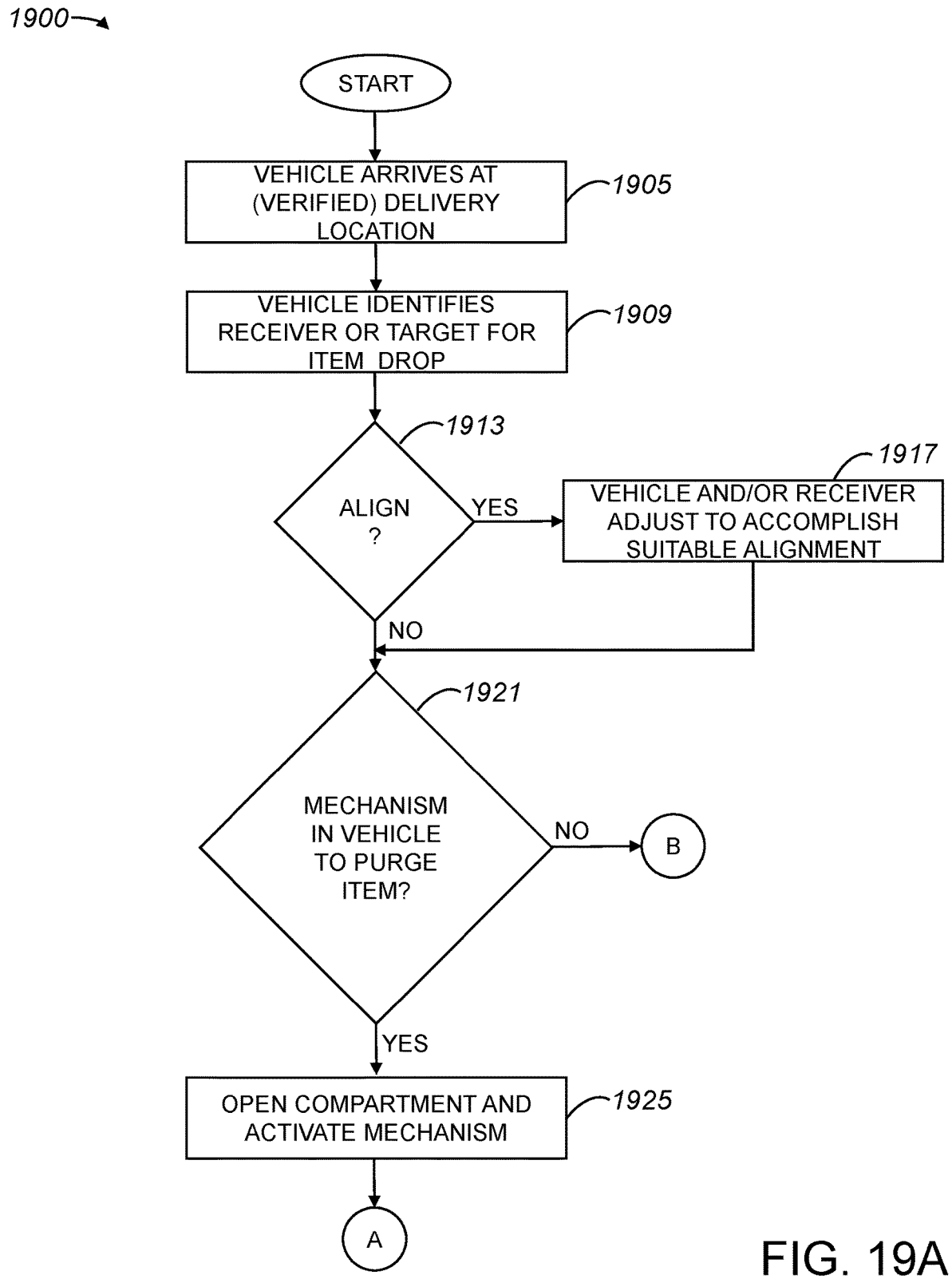
FIGS. 19A-C are a process flow diagram which illustrates a method of removing an item from an autonomous vehicle in accordance with an embodiment.
Figure 19B:
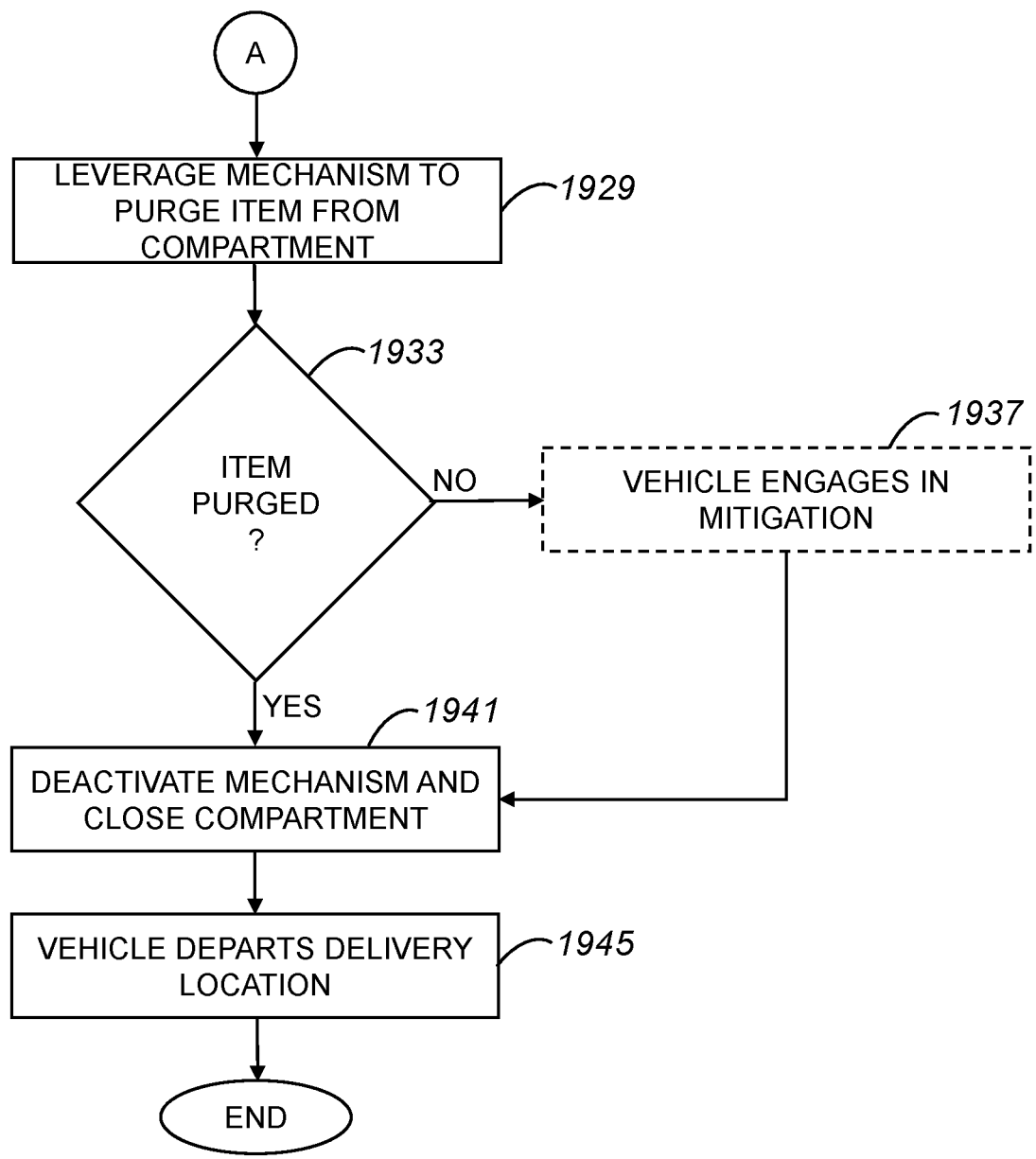
Figure 19C:
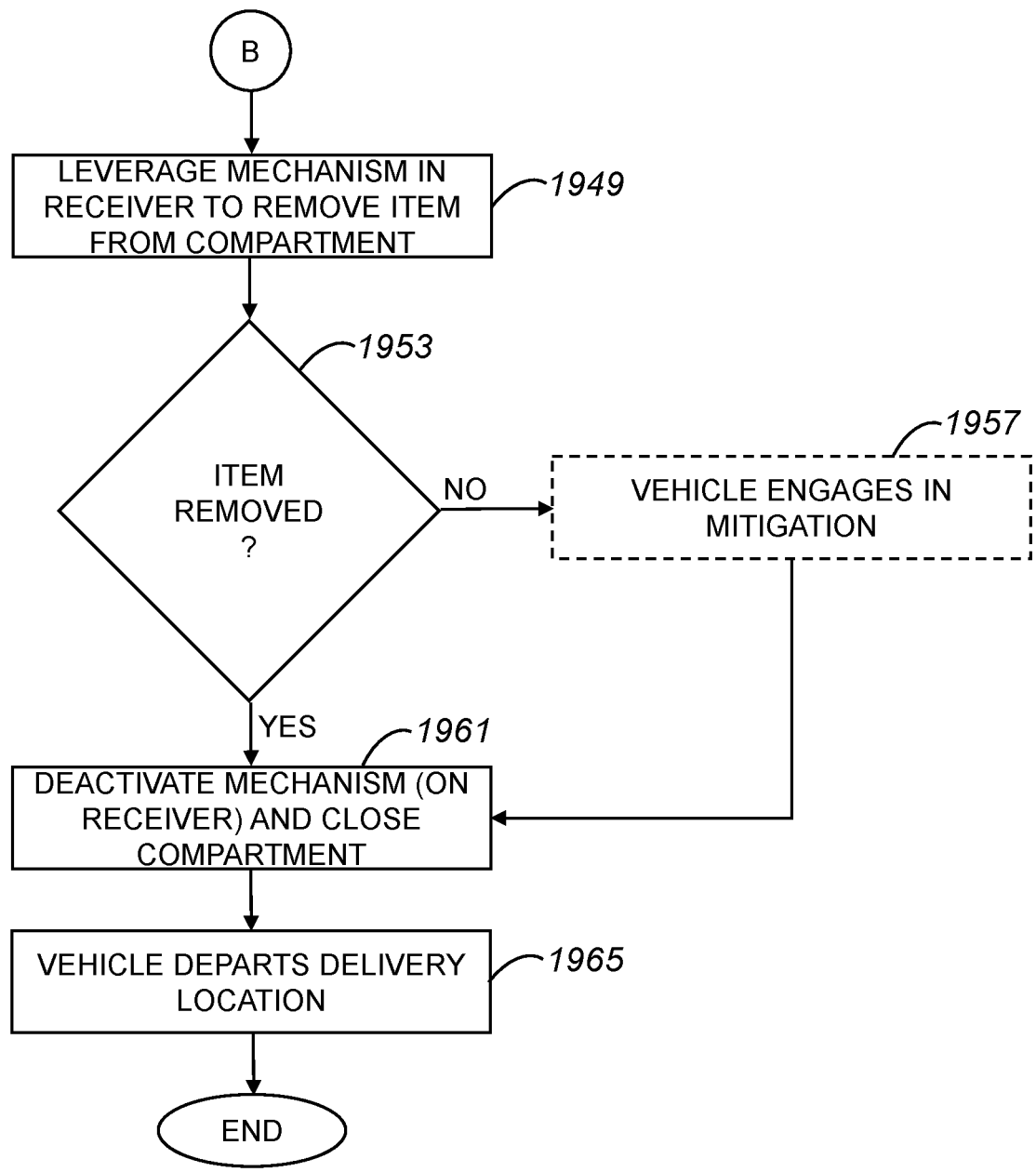

As mentioned above, a vehicle may include mechanisms arranged to facilitate the removal, or purge, of an item from the vehicle at a delivery location. The item may be removed and effectively deposited at a target area, as for example placed in a receiver at the delivery location. With reference to FIGS. 19A-C, a method of performing a delivery that utilizes at least one mechanism to facilitate the removal of an item from a vehicle will be described in accordance with an embodiment. A method 1900 of performing a delivery begins at a step 1905 in which a vehicle, e.g., an autonomous vehicle, arrives at a delivery location. Arrival at a delivery location may include but is not limited to including, verifying that the vehicle is at a desired location, authenticating the desired location and/or a customer associated with the desired location, and/or obtaining permission from a customer to complete an unattended delivery. Verification and authentication may occur through the use of network communications, and may either be substantially automatic or may be manual, e.g., may involve a customer performing one or more actions. In one embodiment, verification may include the vehicle communicating directly or indirectly with a customer associated with the delivery location to obtain permission from the customer to complete a delivery without the customer being physically present at the delivery location.

In a step 1909, the vehicle identifies a receiver or a target for an item drop. That is, the vehicle identifies a receiver that the vehicle is expected to interface with to complete a transfer of an item from the vehicle to the receiver, or the vehicle identifies a target area at the delivery location that the vehicle is expected to use as a spot at which to place or to otherwise deposit the item. The identification of a receiver or a target may be accomplished using any suitable method including, but not limited to including, information provided by sensors on the vehicle, information provided by sensors at the delivery location, geographical coordinates, pairing information shared between the vehicle and the receiver, etc.

Once the vehicle identifies a receiver or target, in a step 1913, it is determined whether the vehicle is to align or realign itself with respect to the receiver or target. In one embodiment, such a determination may be based on factors including, but not limited to including, whether the vehicle is within a threshold distance from the receiver or target and whether the vehicle is already sufficiently aligned with the receiver or target to successfully transfer the item from the vehicle to the receiver or target.

If the determination in step 1913 that further alignment is desirable, the indication is that the positioning of the vehicle and/or the receiver may need to be fine-tuned or otherwise adjusted to enable an item to be transferred. As such, in a step 1917, the vehicle and/or the receiver perform adjustments that are suitable for allowing an item to be transferred between the vehicle and receiver.

Adjustments made to a vehicle and/or a receiver may vary widely. For example, when the vehicle includes a compartment and the receiver includes a receptacle, the relative horizontal and vertical positioning of the compartment and the receptacle may need to be adjusted to enable the compartment to effectively line up with the receptacle. In general, fiducials or target marks may be used in cooperation with sensors on the vehicle and/or the receiver to facilitate adjusting the alignment of the vehicle relative to the receiver or target. It should be appreciated that the alignment may be such that the compartment and the receptacle are substantially even with each other, or the alignment may be such that the compartment and the receptacle are lined up such that an item may be encouraged to drop or tumble from the compartment and into the receptacle.

Adjustments made to a vehicle and a target, e.g., a physical spot at the delivery location at which the vehicle is to leave an item. Such adjustments may include, but are not limited to including, the vehicle positioning itself relative the target, the vehicle positioning itself based on fiducials or marks provide in the vicinity of the target, etc. In general, adjusting the vehicle relative to the target may include, but is not limited to including, positioning the vehicle to effectively drop the item at the target. The positioning of the vehicle may involve using data collected from sensors on the vehicle, and may be performed autonomously or under the control of a teleoperator.

Returning to step 1913, if it is determined in step 1913 that the vehicle is not to align itself, the implication may be that the vehicle and the receiver or target are suitably aligned with one another to facilitate an item transfer. As such, in a step 1921, a determination is made as to whether the vehicle has a mechanism configured to facilitate the purging of an item form the vehicle. In addition, after the vehicle and/or receiver adjust to accomplish a suitable alignment in step 1917, process flow also moves to step 1921.

If it is determined that the vehicle has a mechanism that is configured to purge an item from the vehicle, e.g., from a compartment in the vehicle, the indication is that such a mechanism may actively purge or remove the item. As process flow proceeds to a step 1925 in which a compartment on the vehicle may be opened, and the mechanism may be activated. The mechanism may be, in one embodiment, a ramp mechanism which includes a slope that an item may effectively slide down. Activating the ramp mechanism may include, but is not limited to including, transitioning a surface of the ramp mechanism from a substantially flat position to a substantially sloped position. Such a transition may be accomplished using any suitable mechanism, e.g., an actuator configured to effectively pivot a surface form a flat position to a sloped position. It should be appreciated that opening the compartment may include unlocking and opening a door on the compartment prior to activating the mechanism. A compartment may generally be opened substantially any time, and is not limited to being opened just prior to activating the mechanism. For example, a compartment may be opened when adjusting the relative positioning of a vehicle and a receiver.

Once the mechanism is activated, in a step 1929, the mechanism is leveraged to purge the item from the compartment. That is, the mechanism is used to move the item from the compartment and onto a receiver or target. In one embodiment, the mechanism may include a ramp which may be activated to create a sloped surface and a plate which may be activated to push an item down the ramp and out of the compartment. For example, an actuated plate may apply force substantially directly to an item on a sloped surface to substantially cause or to otherwise encourage the item to move down the sloped surface. In one embodiment, the sloped surface may include rails or guides which are configured to guide the item as the item moves down the sloped surface.

A determination is made in a step 1933 as to whether the item has been successfully purged from the compartment, e.g., has effectively been transferred from the compartment to a receiver. Such a determination may be made by obtaining sensor information from the compartment and/or the receiver which may indicate that the item is no longer within the compartment. The sensor information may include, but is not limited to including, information from a weight sensor which may indicate that an item is no longer detected in the compartment and/or information from a camera which may visually indicate that the item is no longer present in the compartment.

If the determination in step 1933 is that the item has been successfully purged from the vehicle, then in a step 1941, the mechanism is deactivated, and the compartment may be closed and secured. Once the compartment is closed, the vehicle may depart the delivery location in a step 1945, and the method of performing a delivery is completed.

Alternatively, if the determination in step 1933 is that the item has not been purged, the implication may be that there is an issue with the mechanism. That is, when the mechanism is unable to purge the item from the compartment, a problem with the mechanism may be indicated. As such, process flow proceeds to an optional step 1937 in which the vehicle engages in mitigation. When the vehicle engages in mitigation, the vehicle may communicate with a dispatcher, a teleoperator, and/or a customer. Mitigation may involve determining an alternate method for purging the item from the compartment and/or determining whether to abort or to otherwise cancel the delivery of the item. Once the vehicle optionally engages in mitigation, process flow moves to step 1941 in which the mechanism is deactivated, and the compartment is closed or otherwise secured.

Returning to step 1921 and a determination of whether the vehicle includes a mechanism that may be used to purge an item, if it is determined that the vehicle does not include such a mechanism, then process flow moves to a step 1949 in which a mechanism in a receiver may be leveraged to move the item from the vehicle, e.g., from a compartment on the vehicle. In one embodiment, a receiver may be a locker which includes a mechanism configured to pull an item out of a compartment.

In a step 1953, it is determined whether the item has been removed from the compartment. If it is determined that the item has been successfully removed, the indication is that the item is onboard the receiver. Accordingly, in a step 1961, the mechanism on the receiver is deactivated and the compartment on the vehicle is closed and/or otherwise secured. After the mechanism is deactivated and the compartment is closed, the vehicle departs the delivery location in a step 1965, and the method of performing a delivery is completed.

Alternatively, if it is determined in step 1953 that the item has not been removed, process flow proceeds to an optional step 1957 in which the vehicle engages in mitigation in an effort to address the inability to remove the item from the compartment. Once the vehicle has optionally engaged in mitigation, the mechanism on the receiver is deactivated and the compartment on the vehicle is closed.

Figure 20A:
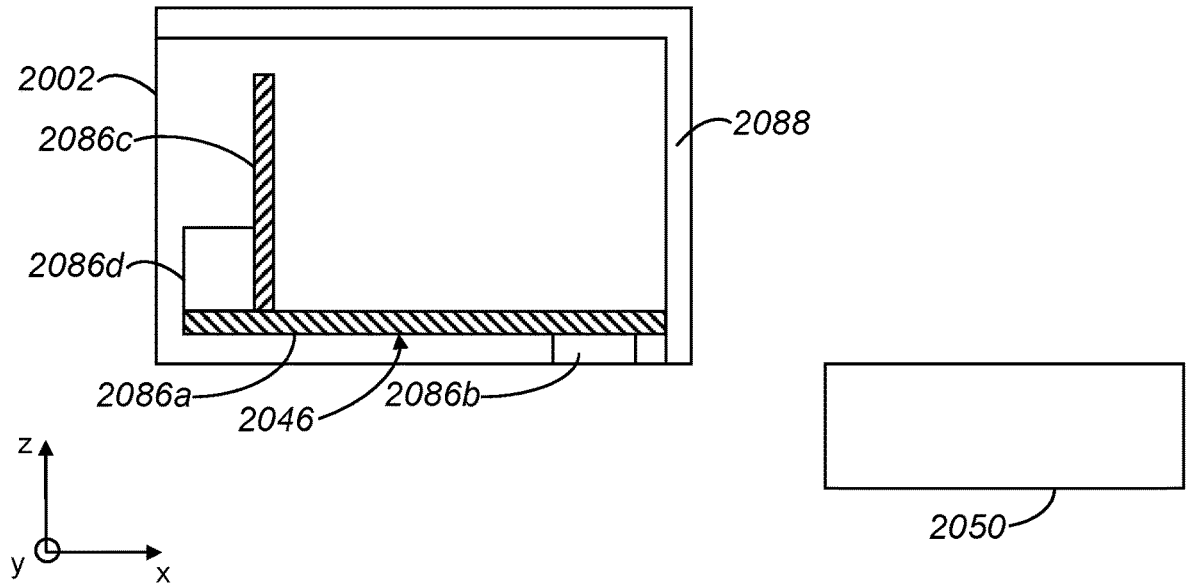
FIG. 20A is a diagrammatic representation of a compartment of a vehicle and a receiver at a time t1 in accordance with an embodiment.

With reference to FIGS. 20A-I, the transfer of an item from a compartment on a vehicle to a receiver or a target will be described. FIG. 20A is a diagrammatic representation of a compartment of a vehicle and a receiver at a time t1 in accordance with an embodiment. A compartment 2002, which may be located on or in an autonomous vehicle. At a time t1, a vehicle (not shown) that includes compartment 2002 may be substantially assigned to deliver an item (not shown) to a receiver or target 2050. Compartment 2002 includes a door 2088 that is configured to open and close to control access to contents (not shown), e.g., cargo, carried in compartment 2002. Receiver 2050 may be a device or an apparatus configured to receive, or to otherwise obtain, cargo (not shown) that is transported and delivered within compartment 2002. Alternatively, receiver 2050 may any suitable surface on which cargo may be placed, e.g., receiver 2050 may be a target surface such as the surface of a driveway or the surface of a sidewalk.

Compartment 2002 contains a transfer mechanism 2046, or a mechanism which is arranged to enable an item (not shown) contained within compartment 2002 to be purged or otherwise removed from compartment 2002. At time t1, transfer mechanism 2046 is undeployed and, hence, may be in a home or default orientation.

In the described embodiment, transfer mechanism 2046 includes a transfer surface 2086*a*, a transfer surface actuator 2086*b*, a linear force mechanism or push plate 2086*c*, and a linear force actuator 2086*d*. Transfer surface 2086*a*, which may be plate or a platform that may effectively move when a force is applied by transfer surface actuator 2086*b*, or when transfer surface actuator 2086*b* is activated. Transfer surface actuator 2086*b* may be an actuator that is configured to cause transfer surface 2086*a* to move, e.g., pivot about an axis such as a y-axis, such that transfer surface 2086*a* may have a slope. Linear force mechanism 2086*c* is arranged to apply a force to an item (not shown) when linear force actuator 2086*d* is activated. Linear force mechanism 2086*c* is arranged to push an item (not shown) along or down transfer surface 2086*a*. As will be appreciated by those skilled in the art, pushing an item (not shown) may include applying a force to the item using linear force mechanism 2086*c*.

Transfer mechanism 2046 may be integrally formed within compartment 2002. In one embodiment, transfer mechanism 2046 may be configured as an insert that may be placed into and/or removed from compartment 2002 as appropriate.

Figure 20B:
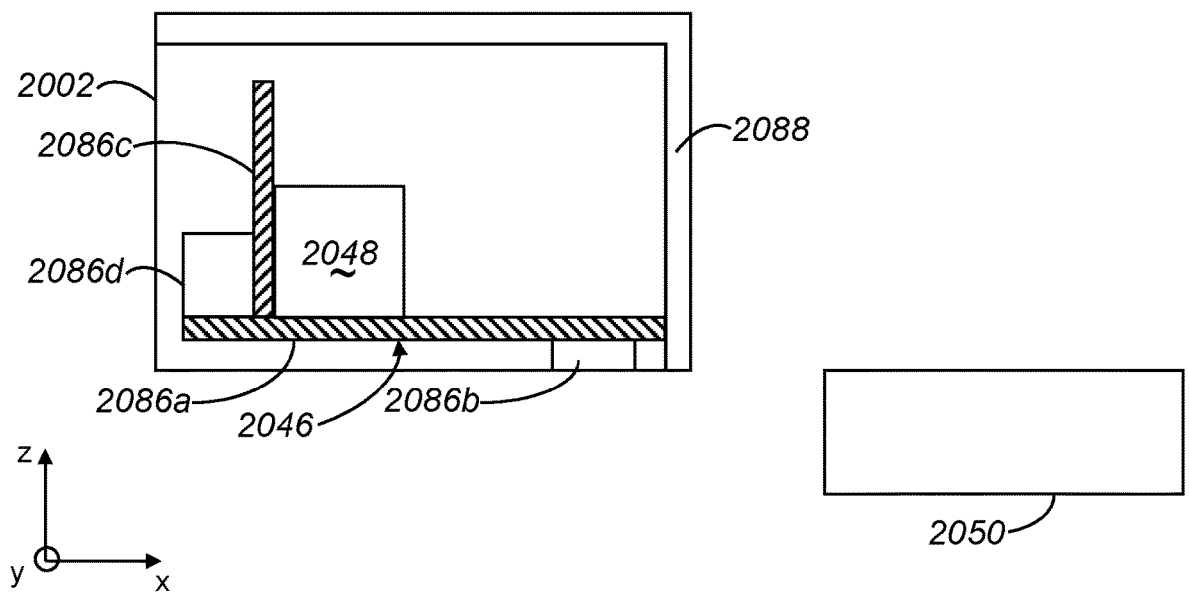
FIG. 20B is a diagrammatic representation of a compartment and a receiver, e.g., compartment 2002 and receiver 2050 of FIG. 20A, at a time t2 after an item is loaded into the compartment in accordance with an embodiment.

FIG. 20B is a diagrammatic representation of a compartment 2002 and receiver 2050 at a time t2 after an item is loaded into compartment 2002 in accordance with an embodiment. At a time t2, an item 2048 is contained in compartment 2002, and is situated on transfer surface 2086*a*, or otherwise rests upon transfer surface 2086*a*. It should be appreciated that item 2048 may be substantially secured to transfer surface 2086a, or, alternatively, item 2048 may effectively be loose within compartment 1202. Item 2048 may be substantially unpackaged, or may be packaged in a box, a bag, a locker, or a modular insert contained within compartment 2002.

Figure 20C:
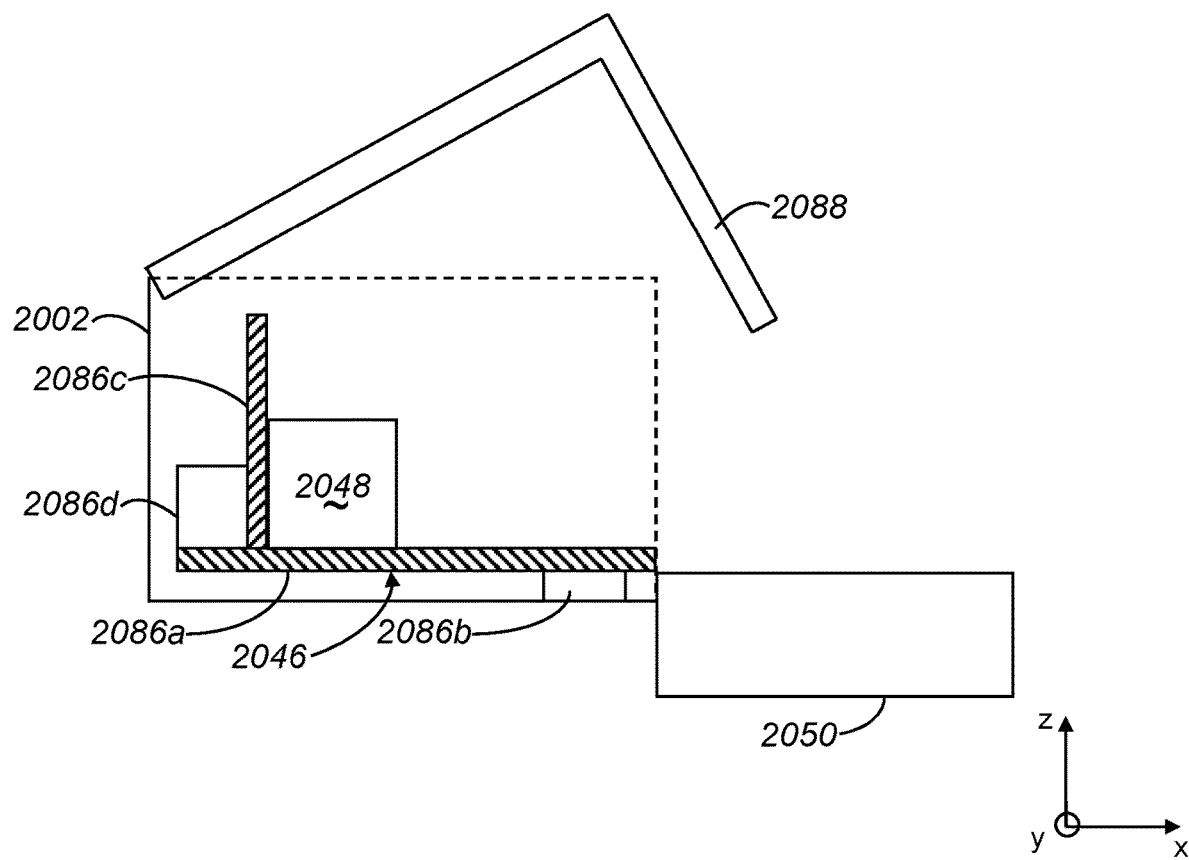
FIG. 20C is a diagrammatic representation of a compartment and a receiver, e.g., compartment 2002 and receiver 2050 of FIG. 20A, at a time t3 when the compartment and the receiver are prepared to transfer an item, e.g., item 2048 of FIG. 20B, in accordance with an embodiment.

In order for item 2048 to effectively transferred from compartment 2002 to receiver 2050, compartment 2002 and receiver 2050 may be moved relative to one another such that compartment 2002 and receiver 2050 are substantially aligned. FIG. 20C is a diagrammatic representation of compartment 2002 and receiver 2050 at a time t3 when the compartment and the receiver are prepared to begin the transfer of item 2048 in accordance with an embodiment. At a time t3, compartment 2002 and receiver 2050 have aligned, and compartment door 2088 is in an open position. In general, compartment door 2088 may not be opened until an authentication and/or verification process is performed to ascertain whether a vehicle (not shown) that includes compartment 2002 is in a correct delivery location and/or whether a customer has authorized a delivery of item 2048 to receiver 2050.

Aligning compartment 2002 and receiver 2050 with respect to each other may include adjusting the relative positions of compartment 2002 and receiver 2050 relative to one or more of an x-axis, a y-axis, and/or a z-axis. That is, compartment 2002 and receiver 2050 may be aligned such that a surface associated with compartment 2002 may be aligned with a surface of receiver 2050 relative to an x-axis, a y-axis, and/or a z-axis. As shown, compartment door 2088 is in an open position when compartment 2002 and receiver 2050 are aligned, and the transfer of item 2048 is initiated. It should be appreciated that compartment door 2008 may be opened prior to aligning compartment 2002 and receiver 2050, during an alignment process, or after compartment 2002 and receiver 2050 are substantially aligned.

To enable compartment 2002 and receiver 2050 to be aligned, various systems of a vehicle that includes compartment 2002 may be used. In one embodiment, when compartment 2002 is included on a vehicle such as vehicle 101 of FIG. 3, aligning compartment 2002 and receiver 2050 may leverage systems including, but not limited to including, sensor system 324, navigation system 312, propulsion system 308, and control system 336. For example, sensors in sensor system 324 may be used to determine a position of compartment 2002 relative to receiver 2050, and control system 336, propulsion system 308, and navigation system 312 may cooperate to adjust the position of compartment 2002 based on information provided by sensor system 324.

The factors used to determine when compartment 2002, or more generally when a vehicle that includes compartment 2002, is appropriately aligned with receiver 2050 may vary widely. For example, compartment 2002 and receiver 2050 may be considered to be aligned when a surface of receiver 2050 is arranged to be able to receive item 2048 when item 2048 is purged from compartment 2002. A surface of receiver 2050 may be arranged to be able to receive item 2048 when the surface of receiver 2050 is substantially in the same plane as transfer surface 2086a, or, alternatively, when the surface of receiver 2050 is below transfer surface 2086a such that item 2048 may safely drop from compartment 2050 onto the surface of receiver 2050. When surface of receiver 2050 and transfer surface 2086a are aligned, surface of receiver 2050 and transfer surface 2086a are effectively lined up with respect to at least one axis.

Figure 20D:
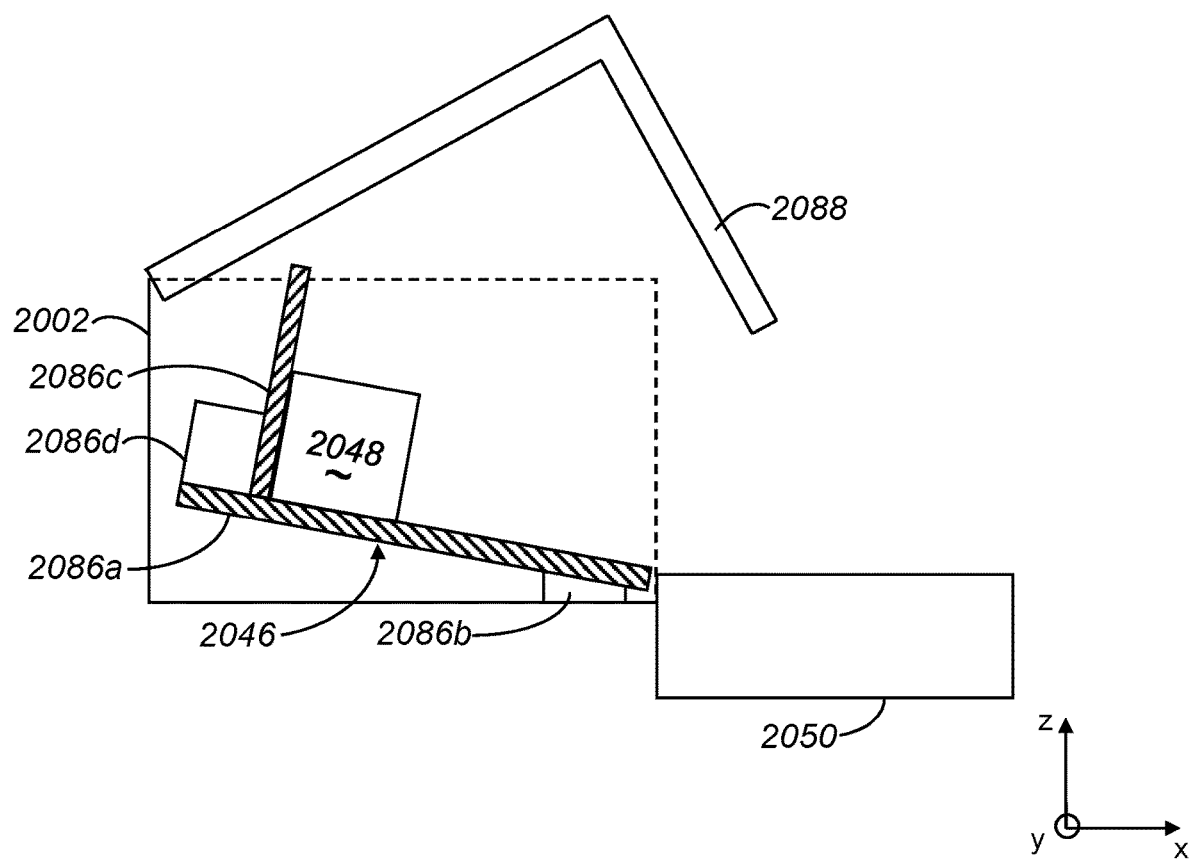
FIG. 20D is a diagrammatic representation of a compartment and a receiver, e.g., compartment 2002 and receiver 2050 of FIG. 20A, at a time t4 when the compartment and the receiver activate a transfer mechanism, e.g., transfer mechanism 2046 of FIG. 20A, initiate a process of transferring an item, e.g., item 2048 of FIG. 20B, in accordance with an embodiment.

Once compartment 2002 is aligned with receiver 2050, transfer mechanism 2046 may be activated to cause item 2048 to be purged from compartment 2002. Referring next to FIG. 20D, the transfer of item 2048 from compartment 2002 to receiver 2050 at a time t4 will be described in accordance with an embodiment. At a time t4, transfer actuator 2086b causes transfer surface 2086a to move, e.g., tilt or pivot, such that transfer surface 2086a is sloped or at an angle. The slope may vary widely, and transfer actuator 2086b may dynamically adjust the slope based on an amount of slope needed to substantially encourage item 2048 to move down transfer surface 2086a towards receiver 2050.

Figure 20E:
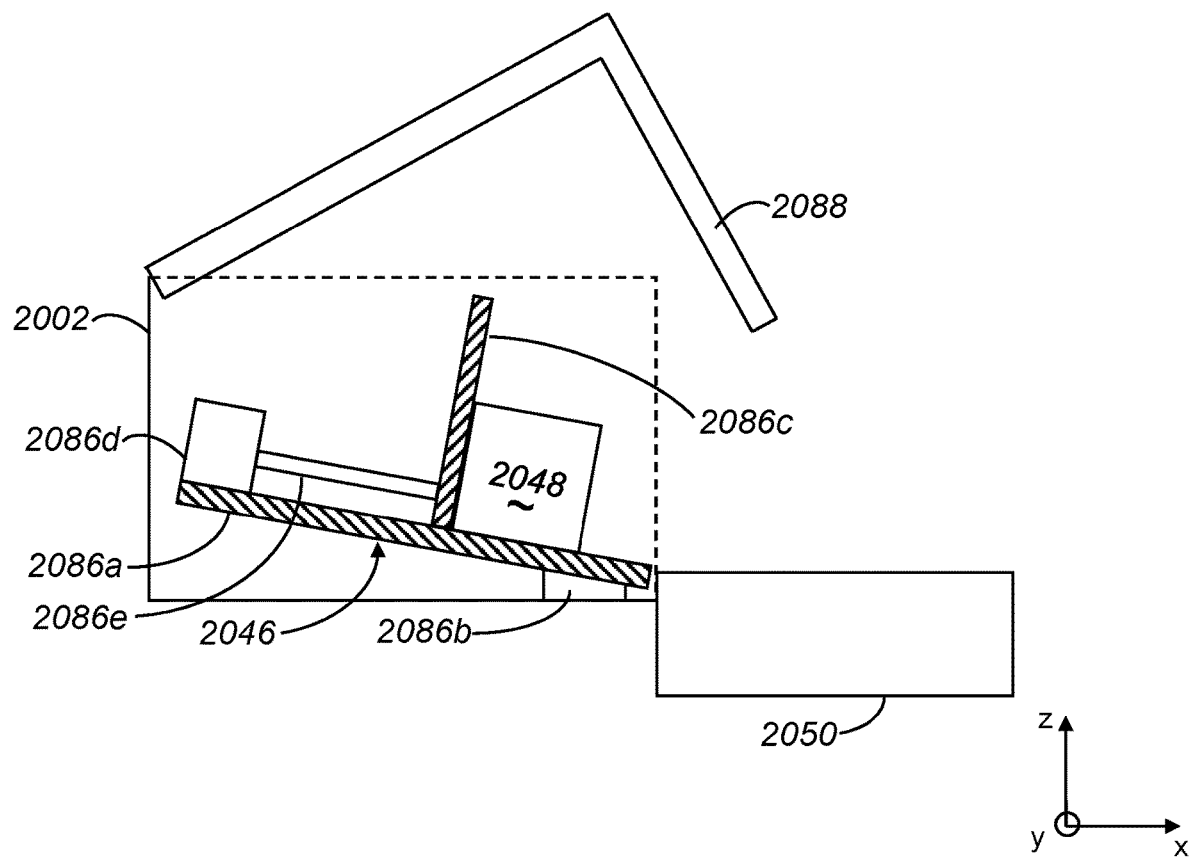
FIG. 20E is a diagrammatic representation of a compartment and a receiver, e.g., compartment 2002 and receiver 2050 of FIG. 20A, at a time t5 when the compartment and the receiver are in the process of transferring an item, e.g., item 2048 of FIG. 20B, in accordance with an embodiment.

At a time t5, as shown in FIG. 20E, item 2048 is in the process of being purged from compartment 2020, and transferred to receiver 2050. As item 2048 moves along sloped transfer surface 2086a, linear force actuator 2086d causes linear force mechanism 2086c to apply a force that substantially pushes item 2048 along transfer surface 2086a. In one embodiment, linear force actuator 2086b may deploy an arm 2086e which may extend and retract to enable linear force mechanism 2086c to apply a force to item 2048. Arm 2086e may be a telescoping arm. While arm 2086e is described, it should be appreciated that a mechanism used by linear force actuator 2086d to enable linear force mechanism 2086c to translate or to otherwise move is not limited to being arm 2086e.

Figure 20F:
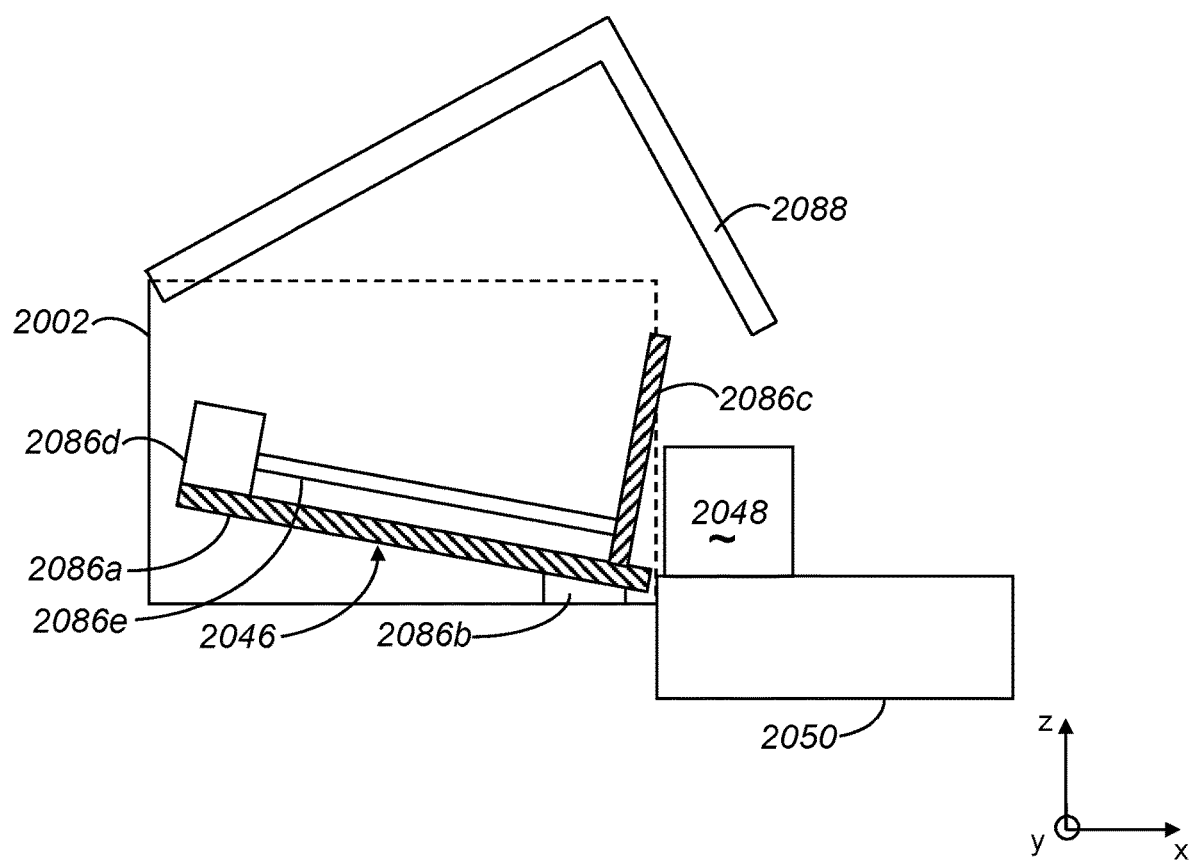
FIG. 20F is a diagrammatic representation of a compartment and a receiver, e.g., compartment 2002 and receiver 2050 of FIG. 20A, at a time t6 when an item, e.g., item 2048 of FIG. 20B, is received by the receiver in accordance with an embodiment.

As arm 2086e deploys, item 2048 moves along transfer surface 2086a until item 2048 effectively reaches receiver 2050. FIG. 20F is a diagrammatic representation of compartment 2002 and receiver 2050 at a time t6 when an item 2048 is received by receiver 2050 in accordance with an embodiment. At a time t6, item 2048 has effectively been pushed by linear force mechanism 2086c onto a surface of receiver 2050. In other words, item 2048 is effectively purged from compartment 2002. It should be appreciated that the surface of receiver 2050 may be a surface within a receptacle (not shown) of receiver 2050. In one embodiment, transfer mechanism 2046 may remain substantially within compartment 2002. In other embodiments, transfer mechanism 2046 may at least partially protrude from compartment 2002 while completing a purge of item 2048.

Figure 20G:
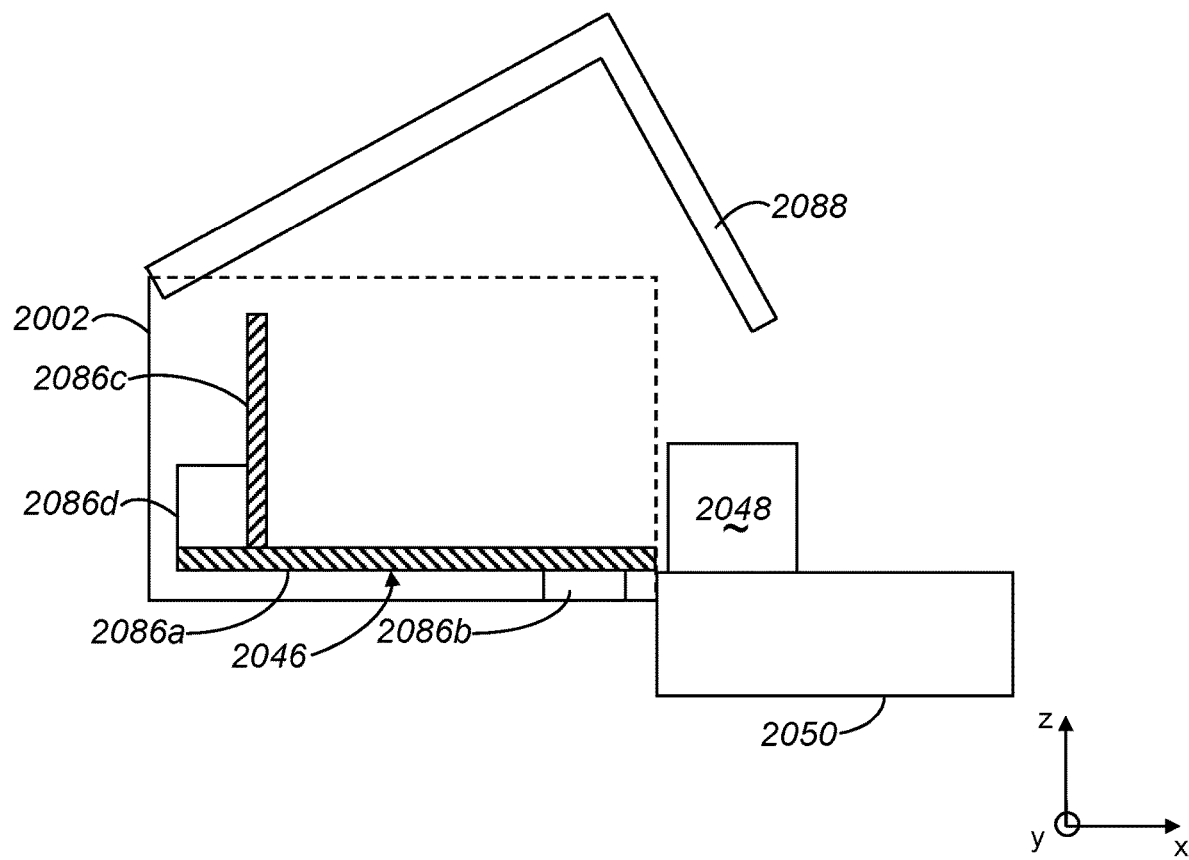
FIG. 20G is a diagrammatic representation of a compartment and a receiver, e.g., compartment 2002 and receiver 2050 of FIG. 20A, at a time t7 when a transfer mechanism, e.g., transfer mechanism 2046 of FIG. 20A, is deactivated by the receiver in accordance with an embodiment.

After item 2048 is transferred from compartment 2002 to receiver 2050, transfer mechanism 2046 may be substantially deactivated. As shown in FIG. 20G, at a time t7, transfer mechanism 2046 is deactivated. Deactivating transfer mechanism 2046 may generally include retracting arm 2086e and, hence, returning linear force mechanism 2086c to a home or default static orientation. In addition, deactivating transfer mechanism 2046 also includes utilizing transfer actuator 2086b to return transfer surface 2086a to a home or default orientation, as for example a position at which transfer surface 2086a is substantially flat and/or not angled.

Figure 20H:
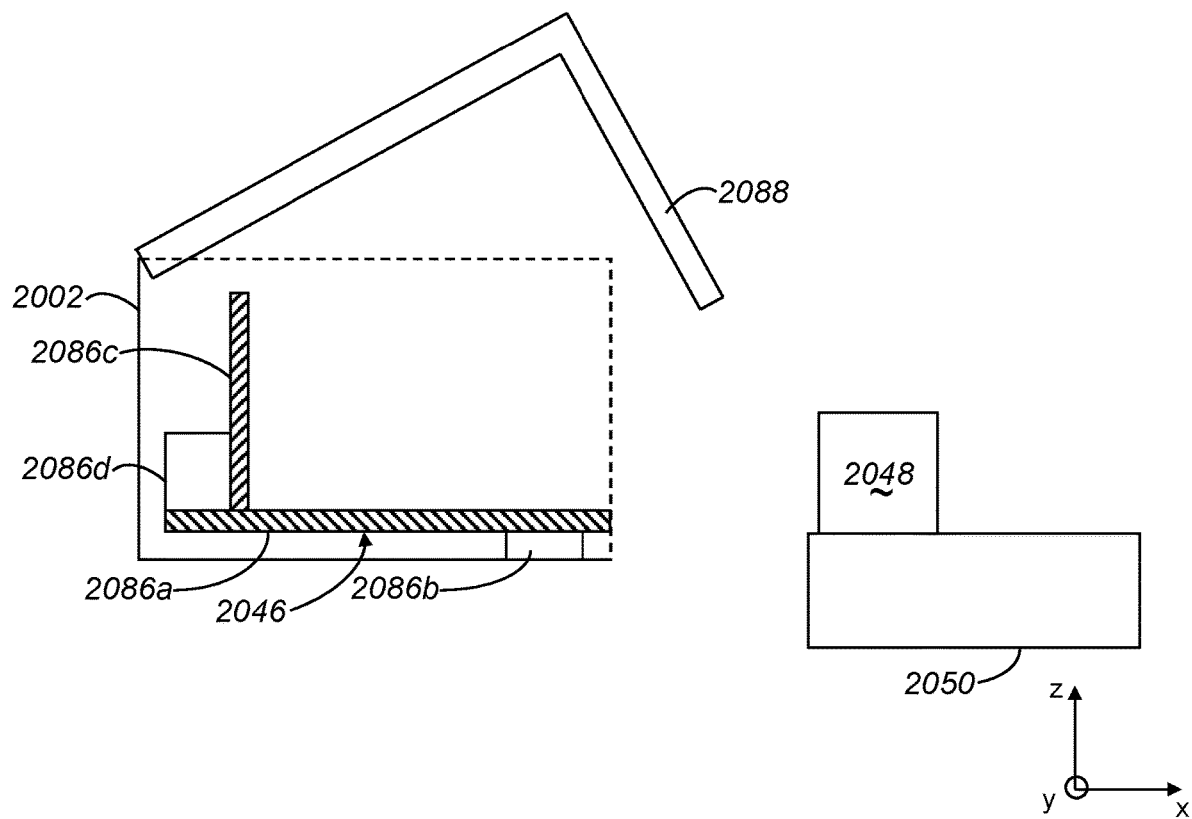
FIG. 20H is a diagrammatic representation of a compartment and a receiver, e.g., compartment 2002 and receiver 2050 of FIG. 20A, at a time t8 when the compartment and the receiver are moved away from each other in accordance with an embodiment.

Once transfer mechanism 2046 is deactivated, compartment 2002 and receiver 2050 may be separated. FIG. 20H is a diagrammatic representation of compartment 2002 and receiver 2050 at a time t8 when compartment 2002 and receiver 2050 are moved away from each other in accordance with an embodiment. At a time t8, compartment 2002 and receiver 2050 are substantially separated. The separation may be achieved by moving a vehicle (not shown) that includes compartment 2002, moving receiver 2050, and/or moving both the vehicle and receiver 2050. It should be appreciated that when a separation between compartment 2002 and receiver 2050 is not needed to enable compartment door 2088 to be closed, the separation may occur after compartment door 2088 is closed.

Figure 20I:
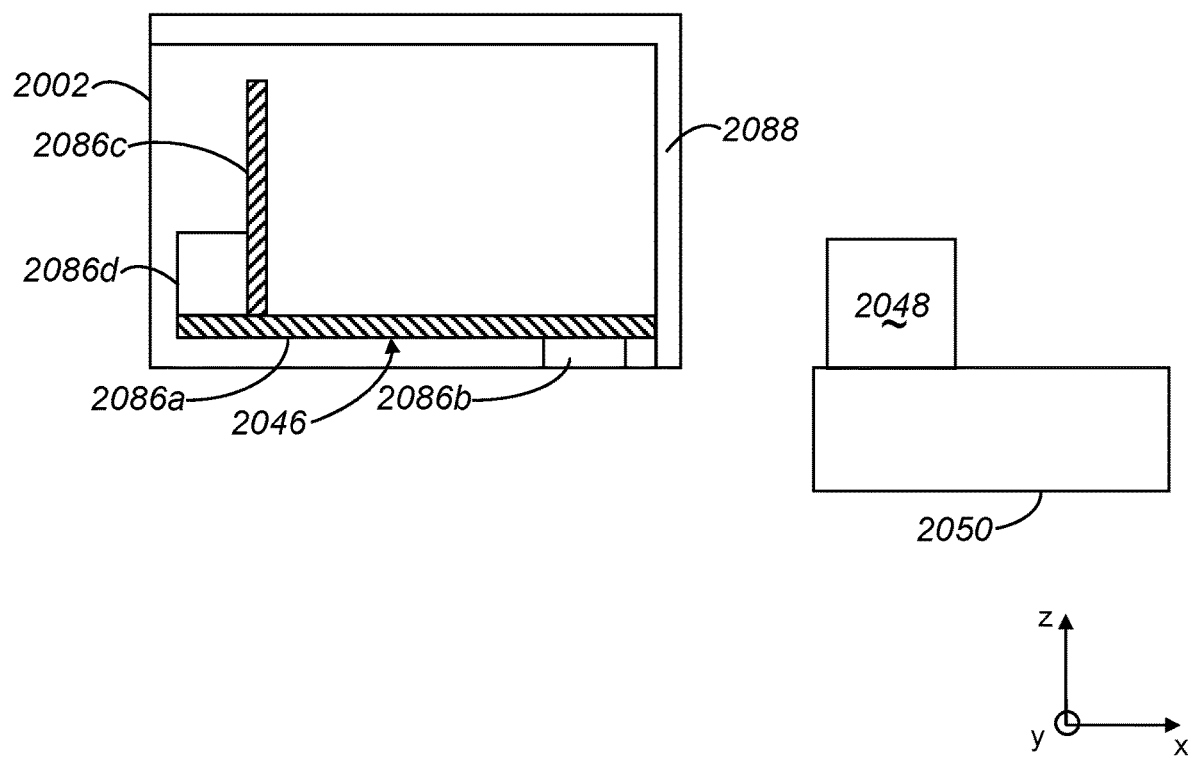
FIG. 20I is a diagrammatic representation of a compartment and a receiver, e.g., compartment 2002 and receiver 2050 of FIG. 20A, at a time t9 when the compartment is secured in accordance with an embodiment.

At a time t9, as shown in FIG. 20I, compartment door 2088 is closed and, as such, compartment 2002 is effectively secured. A delivery of item 2048 may be considered to be complete upon item 2048 being received by receiver 2050 and compartment 2002 being secured.

An item may be delivered in a container, as for example a portable locker or a locker module. Such a container may be arranged to be deposited on or in a receiver such that the item may remain substantially secure within the container until a customer may retrieve the item. In one embodiment, a locker module may be delivered to a location with an item, and subsequently retrieved from the location after the item has been removed. For example, an empty locker module may be retrieved from a customer when a new locker module is delivered to the customer during a subsequent delivery.

Figure 21:
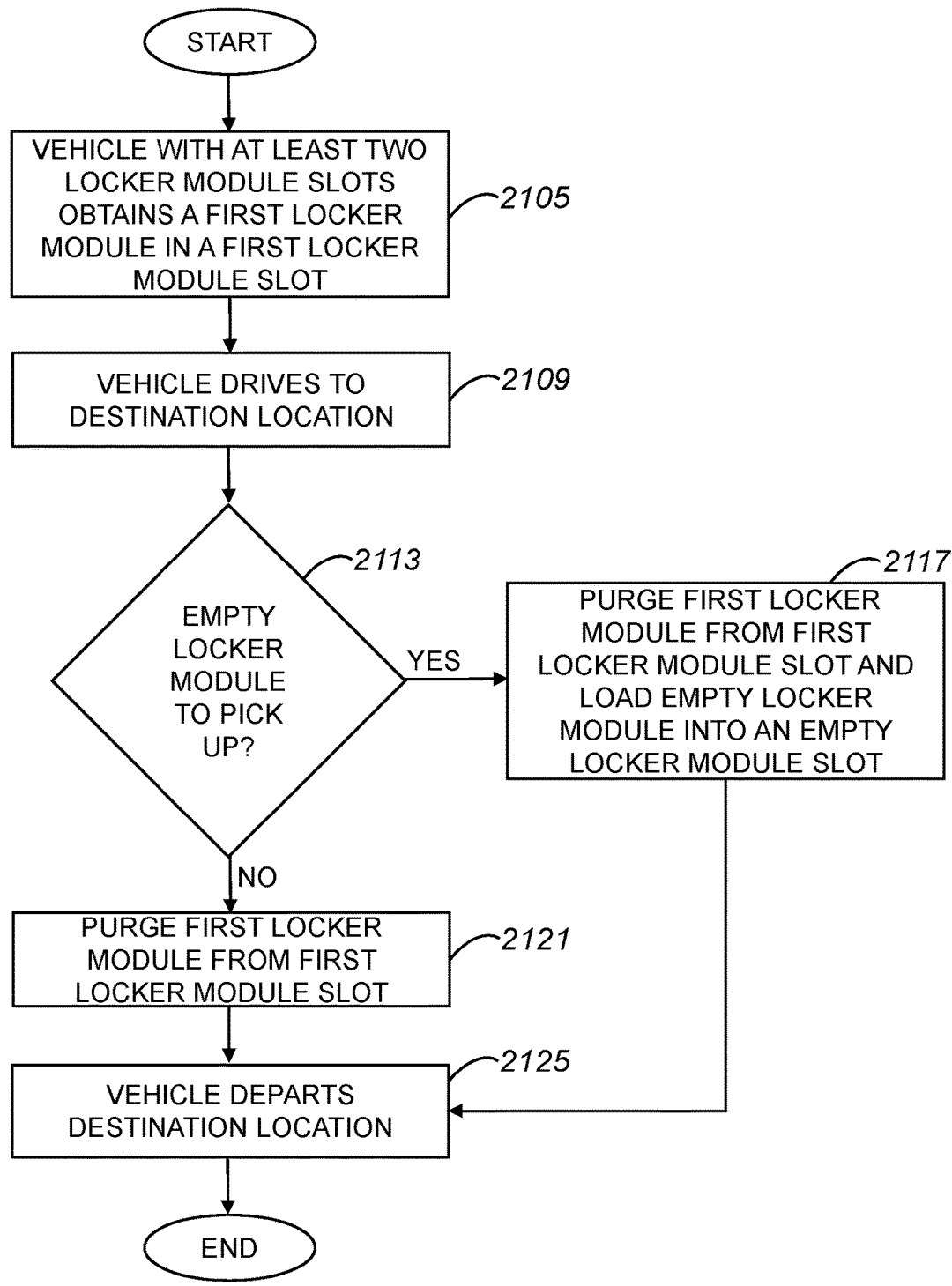
FIG. 21 is a process flow diagram which illustrates a method of delivering locker modules, e.g., locker modules that contain items for delivery, in accordance with an embodiment.

FIG. 21 is a process flow diagram which illustrates a method of delivering locker modules, e.g., locker modules that contain items for delivery, in accordance with an embodiment. A method 2100 of delivering locker modules begins at a step 2105 in which a vehicle, as for example an autonomous delivery vehicle, that has at least two locker module slots obtains a first locker module in a first locker module slot. The first locker module may generally contain at least one item that is to be delivered to a destination location. A locker module slot may be a slot, receptacle, or position within a compartment of the vehicle that is configured to hold a locker module, or a locker module slot may be a compartment.

With the first locker module in the first locker module slot, the vehicle drives to a destination location in a step 2109. The vehicle may drive to the destination autonomously or semi-autonomously. The destination location may generally be a location associated with a customer, e.g., a location at which a delivery that involves the first locker module is to be made.

Once the vehicle arrives at the destination location, a determination is made in a step 2113 as to whether there is an empty locker module at the destination location that is to be picked up or otherwise retrieved by the vehicle. If the determination is that there is no empty locker or no previously delivered locker to pick up, the first locker module is purged from the first locker module slot in a step 2121. Purging the first locker module may include, but is not limited to including, opening a compartment, actuating a mechanism on the vehicle that is arranged to unload the first locker module from the vehicle, actuating a mechanism on a receiver at the destination location to unload the first locker module from the vehicle, and/or actuating a mechanism of a receptacle at the destination location, When the first locker module is unloaded from the first locker module slot, the first locker may be deposited on a surface or in a receiver at the destination location.

After the first locker module is purged from the first locker module slot, the vehicle departs from the destination location in a step 2125. Prior to the vehicle departing from the destination location, a compartment door on the vehicle may be closed and the vehicle may be otherwise prepared to depart. Upon the vehicle departing from the destination location, the method of delivering locker modules is completed.

Returning to step 2113, if the determination is that there is an empty locker module or other locker module to pick up at the destination location, then in a step 2117, the first locker module is purged from the first locker module slot and the empty locker module is loaded into an empty locker module slot. It should be appreciated that the empty locker module slot may be the first locker module slot, or the empty locker module slot may be a second locker module slot. That is, the empty locker module may be loaded into the first locker module slot after the first locker module is purged, or the empty locker module may be loaded into an empty second locker module slot at substantially any time. Methods for purging one locker from a vehicle and loading another locker into the vehicle will be discussed below with reference to FIG. 22, and also FIGS. 23A and 23B. After the first locker module is purged and the empty locker module is loaded, process flow moves to step 2125 in which the vehicle departs from the destination location.

Purging one locker module from a vehicle and loading that locker module onto or into a receiver, and purging another locker module from the receiver and loading that locker module into the vehicle, may be accomplished using any suitable actuation mechanisms. One suitable actuation mechanism may include linear actuators onboard a vehicle and a receiver. Another suitable actuation mechanism may include telescoping platforms with spring pins which enable extended telescoping platforms to be retracted. Mechanisms may also include latches and/or hooks which effectively grab onto a locker module such that the locker may be manipulated.

Figure 22:
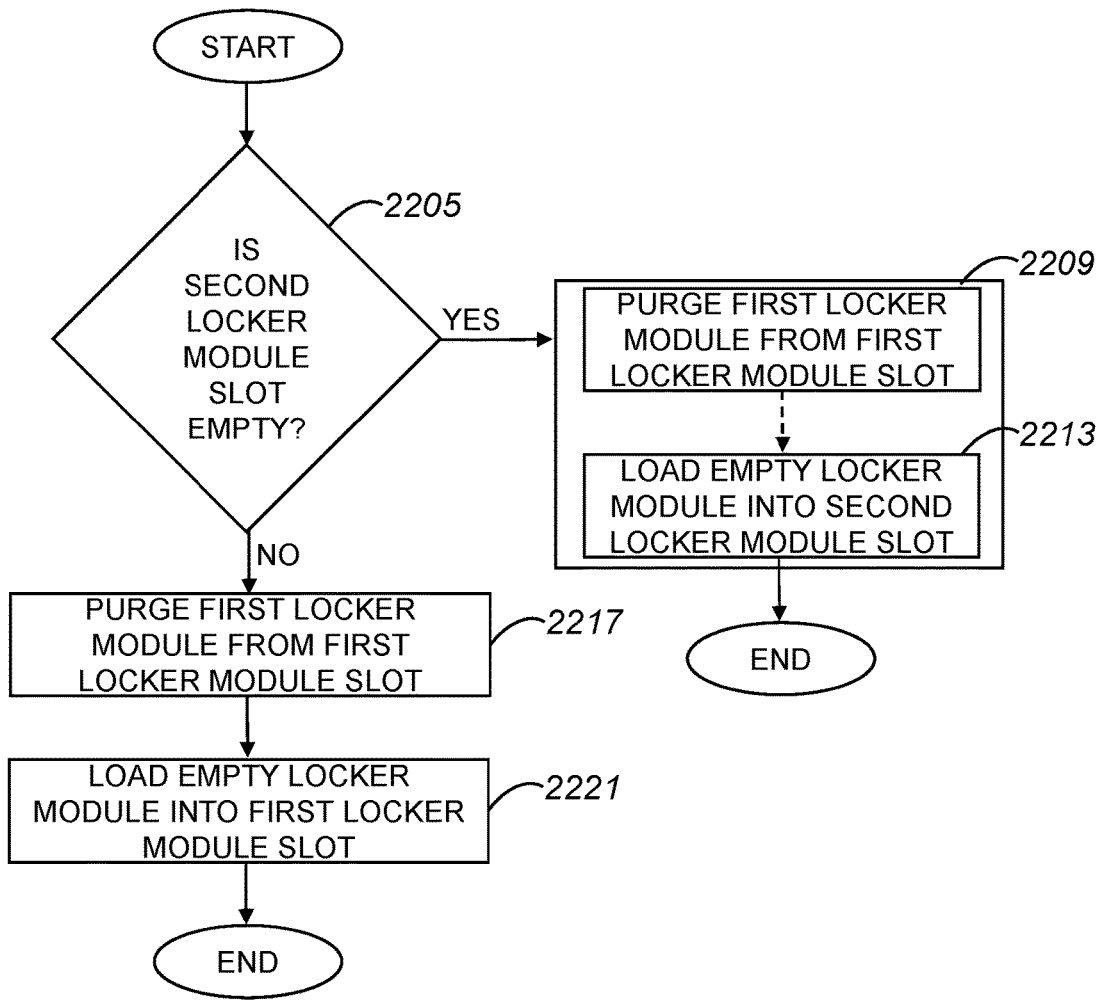
FIG. 22 is a process flow diagram which illustrates a first method of purging a locker module from a vehicle and loading another locker module, e.g., step 2117 of FIG. 21, in accordance with an embodiment.

With reference to FIG. 22, a first method of purging a locker module from a vehicle and loading an empty locker module into the vehicle, e.g., step 2117 of FIG. 21, will be described in accordance with an embodiment. Method 2117 of purging a locker module from a vehicle and loading an empty locker module into the vehicle begins at a step 2205 in which it is determined whether there is a second locker module slot onboard the vehicle that is empty, or is otherwise capable of receiving the empty locker module.

If the determination is that a second locker module slot is empty, the indication is that the empty locker module may be loaded into the second locker module slot. As such, in a step 2209, the first locker module is purged from the first locker module slot. Then, in a step 2213, the empty locker module is loaded into the second locker module slot. In the described embodiment, the first locker module is purged before the empty locker module is loaded. It should be appreciated, however, that the empty locker module may instead be loaded into the second locker module slot before, or substantially at the same time that, the first locker module is purged from the first locker module slot. Once the empty locker module is loaded into the second locker module slot, the method of purging a locker module from a vehicle and loading an empty locker module into the vehicle is completed.

Alternatively, if the determination in step 2205 is that there is no empty second locker module slot, the indication is that the empty locker is to be loaded into the first locker module slot after the first locker module slot becomes available. Accordingly, in a step 2217, the first locker module is purged from the first locker module slot. After the first locker module is purged from the first locker module slot, the empty locker module is loaded into the first locker module slot in a step 2221, and the method of purging a locker module from a vehicle and loading an empty locker module into the vehicle is completed.

In some instances, in order for a vehicle to unload a first locker module and load a second, e.g., empty, locker module, either the position of the vehicle may need to be adjusted and/or a position of the second locker module may need to be adjusted. For example, the vehicle may autonomously move to align a compartment on the vehicle with the second locker module using targets associated with the second locker module to enable the second locker module to be loaded into the compartment.

Figure 23A:
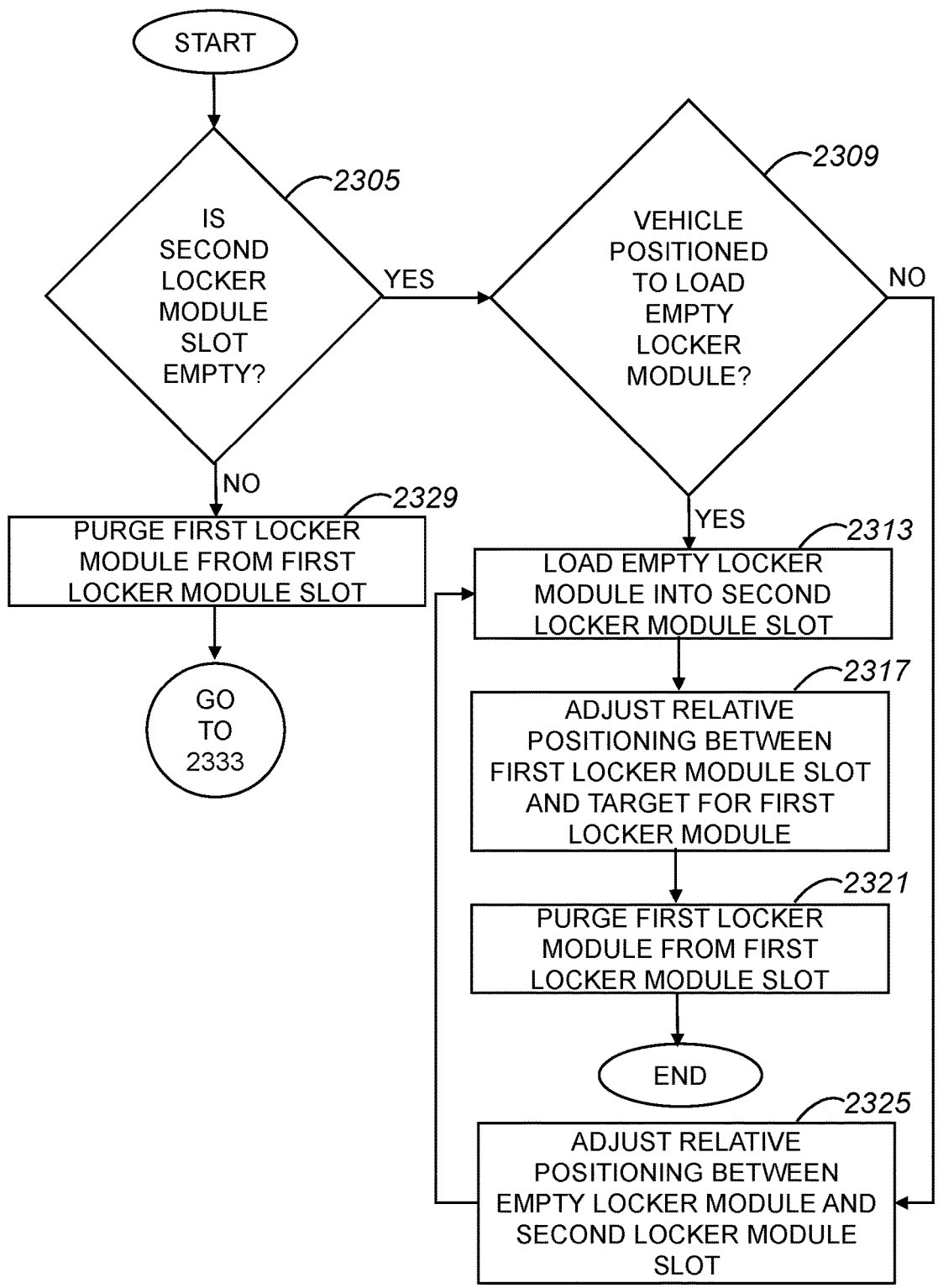
FIGS. 23A and 23B are a process flow diagram which illustrates a second method of purging a locker module from a vehicle and loading another locker module, e.g., step 2117 of FIG. 21, in accordance with an embodiment.
Figure 23B:
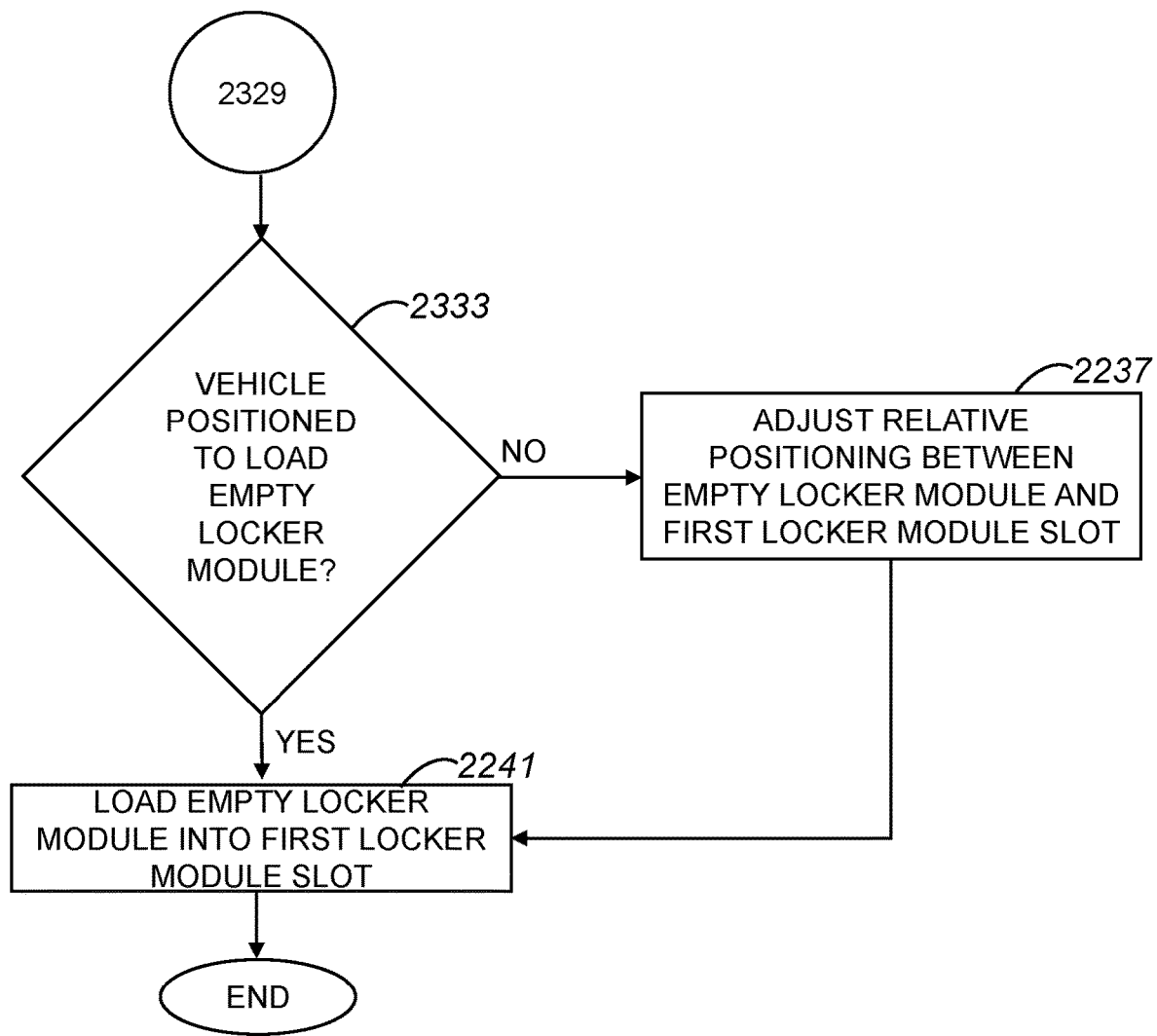

Referring next to FIGS. 23A and 23B, a second method of purging a first locker module from a vehicle and loading a second, empty locker module into the vehicle, e.g., step 2117 of FIG. 21, which may include positioning or repositioning the vehicle will be described with respect to the other locker module will be in accordance with an embodiment. Method 2117' of purging a locker module from a vehicle and loading a second, empty locker module into the vehicle begins at a step 2305 in which a determination is made as to whether a second locker module slot onboard the vehicle is empty or is otherwise unoccupied and, hence, available for use to hold the empty locker module.

If the determination in step 2305 is that the second locker module slot is empty, the indication is that the empty locker module may be loaded onto the vehicle in the second locker module slot. Accordingly, in a step 2309, a determination is made as to whether the vehicle is positioned appropriately to load the empty locker module into the second locker module slot. If the determination is that the vehicle is positioned to load the empty locker module into the second locker module slot, the empty locker module is then loaded into the second locker module slot in a step 2313. In one embodiment, a mechanism on the vehicle may be used to facilitate loading the empty locker module. Such a mechanism may be, for example, a robotic arm that is configured to effectively grab onto the empty locker module and to pull or to otherwise manipulate the empty locker module into the second locker module slot. In another embodiment, when the empty locker module is held in a receiver apparatus at the destination location, a mechanism of the receiver apparatus may substantially push the empty locker module into the second locker module slot.

After the empty locker module is loaded into the second locker module slot, the relative positioning between the first locker module slot and a target drop-off position for the first locker module is adjusted in a step 2317. For example, if the target drop-off position is the position previously occupied by the empty locker module, the vehicle may be autonomously driven to align the first locker module slot with the target drop-off position.

In a step 2321, the first locker module is purged from the first locker module slot and effectively provided to a target drop-off position. Upon purging the first locker module, the method purging a locker module from a vehicle and loading a second, empty locker module into the vehicle is completed.

Alternatively, if the determination in step 2309 is that the vehicle is not positioned to load the empty locker module, the relatively positioning between the empty locker module and the second locker module slot is adjusted in a step 2325. Adjusting the relative positioning may include, but is not limited to including, autonomously driving the vehicle to position the vehicle such that the second locker module slot is aligned with the empty locker module and/or adjusting the position of the empty locker module, e.g., if the empty locker module is carried in a receiver that is a movable smart locker. Once the relative position between the empty locker module and the second locker module slot is adjusted, process flow moves to step 2313 in which the empty locker module is loaded into the second locker module slot.

Returning to step 2305 and the determination of whether there is a second locker module slot that is empty, if it is determined that there is no empty second locker module slot, then process flow proceeds to a step 2329 in which the first locker module is purged from the first locker module slot. In the described embodiment, when the vehicle arrives at the destination location, the vehicle is positioned such that the first locker module may be unloaded at a desired or target drop-off position. Such a target drop-off position may be associated with a receiver apparatus.

After the first locker module is purged, a determination is made in a step 2333 as to whether the vehicle is positioned appropriately to load the empty locker module into the now empty first locker module slot. If the vehicle is determined to be positioned to load the empty locker module into the first locker module slot, the empty locker module is loaded into the first locker module slot in a step 2241, and the method purging a locker module from a vehicle and loading a second, empty locker module into the vehicle is completed.

Alternatively, if it is determined in step 2333 that the vehicle is not positioned to load the empty locker module into the first locker module slot, then in a step 2237, the relative positioning between the empty locker module and the first locker module slot is adjusted. Once the relative positioning is adjusted, process flow proceeds to step 2241 in which the empty locker module is loaded into the first locker module slot.

As mentioned above, a vehicle that is arranged to delivery and/or to pick up locker modules may generally include at least one compartment which is configured to contain a locker module that may be purged or unloaded from the compartment at a delivery location.

Figure 24:
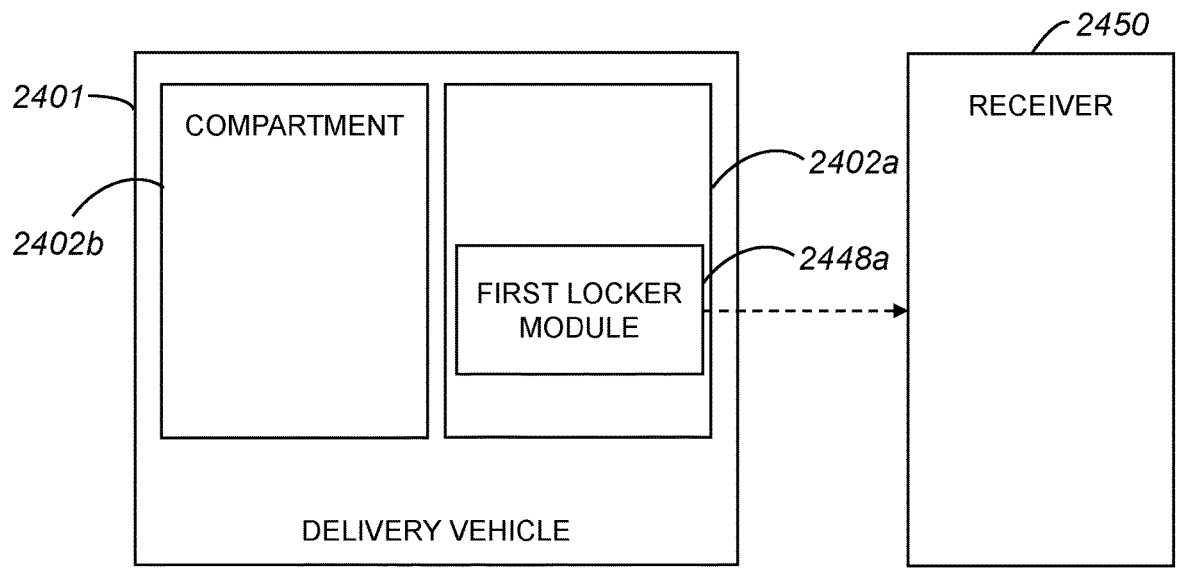
FIG. 24 is a block diagram representation of a delivery vehicle that is configured to purge a first locker module in accordance with an embodiment.

FIG. 24 is a block diagram representation of a delivery vehicle that is configured to purge a first locker module in accordance with an embodiment. A delivery vehicle 2401, which may be an autonomous vehicle such as autonomous vehicle 101 of FIGS. 2 and 3, compartments 2402a, 2402b. It should be appreciated that although two compartments 2402a, 2402b are shown, the number of compartments may vary widely and may include fewer or more than two compartments 2402a, 2402b.

First compartment 2402a includes a first locker module 2448a. That is, first locker module 2448a may be contained within first compartment 2402, and may effectively hold an item (not shown) that is to be delivered to a customer or, in one embodiment, a receiver 2450 associated with the customer. Receiver 2450 may be any surface or apparatus which is arranged to receive first locker module 2448a once first locker module 2448a is purged from or otherwise unloaded from compartment 2402a. For example, receiver 2450 may be a locker with a receptacle arranged to securely receiver locker module 2448a, or receiver 2450 may be a locking platform into which locker module 2448a may be inserted. To facilitate the effective transfer of first locker module 2448a from first compartment 2402a to receiver 2450, mechanisms including, but not limited to including, those discussed above with respect to FIGS. 13, 15, 17 and 20A-I may be utilized.

Figure 25A:
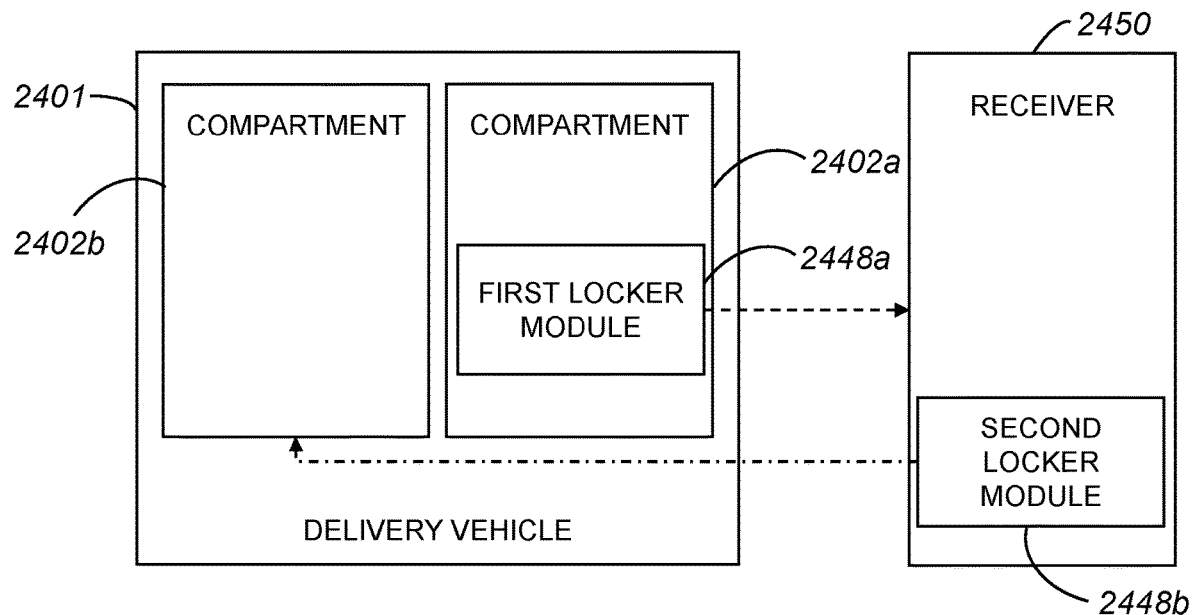
FIG. 25A is a block diagram representation of a delivery vehicle, e.g., vehicle 2401 of FIG. 24, that is configured to purge a first locker module from a first compartment and to load a second locker module into a second compartment in accordance with an embodiment.

In some situations, in addition to delivering first locker module 2448a to receiver 2450, vehicle 2401 may also retrieve a second locker module, as for example a second locker module that is either empty or contains one or more return items. FIG. 25A is a block diagram representation of vehicle 2401 configured to purge first locker module 2448a from first compartment 2402a and to load a second locker module into second compartment 2402b in accordance with an embodiment. A second locker module 2448b is located on or in receiver 2450. In the embodiment as shown, during a delivery of first locker module 2448a to a location at which receiver 2450 is located, second locker module 2448b may be substantially picked up or otherwise acquired by delivery vehicle.

As shown, first locker module 2448a may be arranged to be purged from compartment 2402a and loaded onto or into receiver 2450, and second locker module 2448b may be arranged to be loaded into compartment 2402b. First locker module 2448a may be unloaded from compartment 2402a before, after, or at substantially the same time that second locker module 1448b is loaded into compartment 2402b.

Figure 25B:
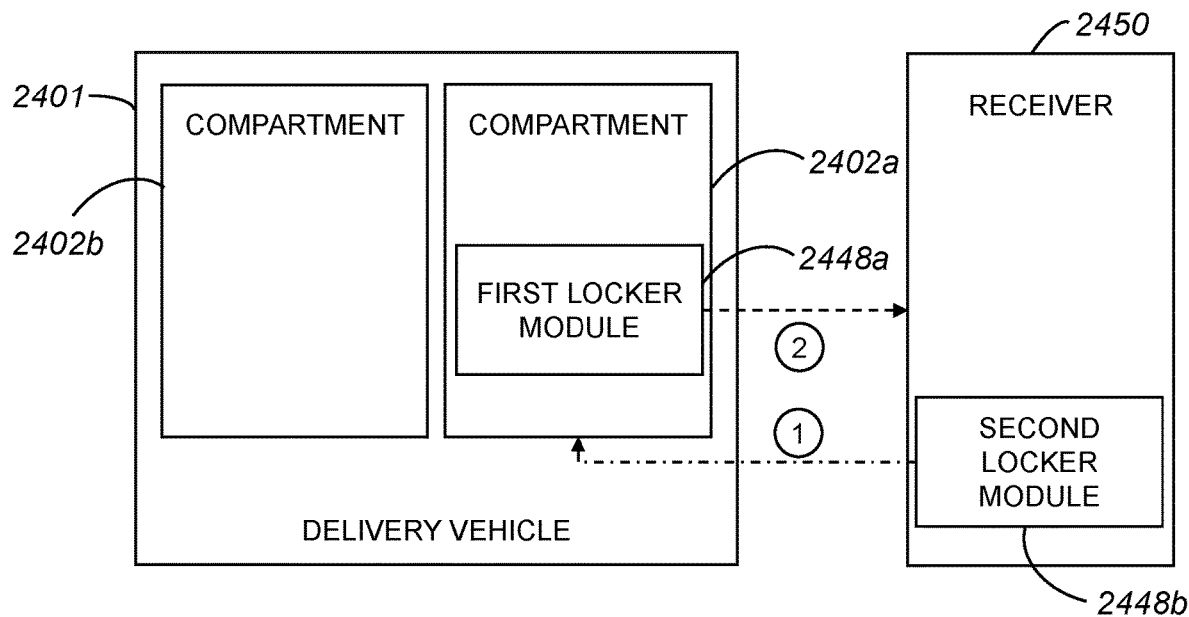
FIG. 25B is a block diagram representation of a delivery vehicle, e.g., vehicle 2401 of FIGS. 24 and 25A, that is configured to purge a first locker module from a first compartment and to load a second locker module into the first compartment in accordance with an embodiment.

In one embodiment, even in the event that vehicle 2401 includes more than one compartment 2402a, 2402b, second locker module 2448b may be loaded into compartment 2402a after first locker module 2448a is unloaded from compartment 2402a. That is, second locker module 2448b may swap into compartment 2402a and essentially replace first locker module 2448a. As shown in FIG. 25B, first locker module 2448a may be unloaded from compartment 2402a and loaded into receiver 2450 before second locker module 2448b is loaded into compartment 2402a.

First locker module 2448a may occupy a different space on or in receiver 2450 than was occupied by second locker module 2448b prior to second locker module 2448b being loaded into compartment 2402a. If first locker module 2448a is to occupy substantially the same space on or in receiver 2450 that was occupied by second locker module 2448b, it should be appreciated that first locker module 2448a may be temporarily placed in a staging location until second locker module 2448b is substantially loaded into compartment 2402a. Vehicle 2401, receiver 2450, and/or a standalone mechanism (not shown) may be arranged to move first locker module 2448a from a staging location to a spot on or in receiver 2450 that was previously occupied by second locker module 2448b.

As previously mentioned, a compartment of a delivery vehicle may include slots which are configured to accept locker modules. Slots, or locker storage positions within a compartment, may be receptacles within a compartment that are configured to receive locker modules, and may effectively be arranged to enable multiple locker modules to be carried in a compartment.

Figure 26:
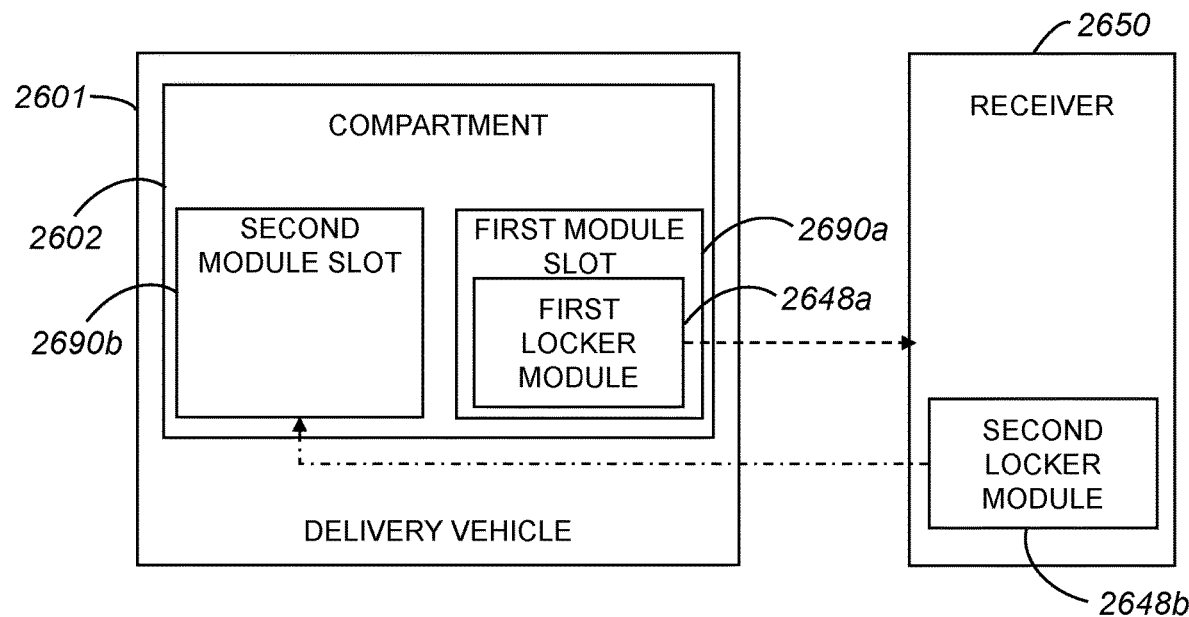
FIG. 26 is a block diagram representation of a delivery vehicle that is configured to purge a first locker module from a first module slot and to load a second locker module into a second module slot in accordance with an embodiment.

FIG. 26 is a block diagram representation of a delivery vehicle that is configured to purge a first locker module from a first module slot in a compartment and to load a second locker module into a second module slot in the compartment in accordance with an embodiment. A vehicle 2601, which may be an autonomous delivery vehicle, includes a compartment 2602 which has a first module slot 2690a and a second module slot 2690b. Module slots 2690a, 2690b are generally positions on vehicle 2601, as for example within compartment 1602, that are configured to receive and to substantially hold locker modules. For example, first module slot 2690a may substantially contain or secure a first locker module 2648a that is to be uploaded from compartment 2601 and loaded onto or into a receiver 2650.

In the embodiment as shown, a second locker module 2648b is held on or in receiver 2650 when vehicle 2601 arrives at a destination at which receiver 2650 is located. Second locker module 2648b may be unloaded from receiver 2650 and loaded into second module slot 2690b before, after, or at substantially the same time that first locker module 2648a is unloaded from first module slot 1690a and received by receiver 2650. Unloading and loading locker modules 2648a, 2648b may generally be accomplished using one or more mechanisms included on vehicle 2601 and/or on receiver 2650.

A locker module may be a container that may be locked to prevent unauthorized access. However, a locker module is not limited to being a container. For example, a locker module may be arranged to provide climate control, to provide cooling, and/or to provide heating. Such a locker module may draw power from a substantially dedicated battery included in the locker module, or the locker module may be coupled to power sources on a vehicle and/or associated with a receiver. Further, a locker module may include network communication capabilities which may enable the locker module to transmit status information to a fleet management system and/or substantially directly to a customer.

A locker module may include features such as mechanical features which enable the locker module to be coupled, e.g., securely coupled, to a receiver. For example, a locker module may include a fastener that is configured to cooperate with a fastener on a receiver to enable the locker module fastener to latch onto the receiver fastener.

Figure 27:
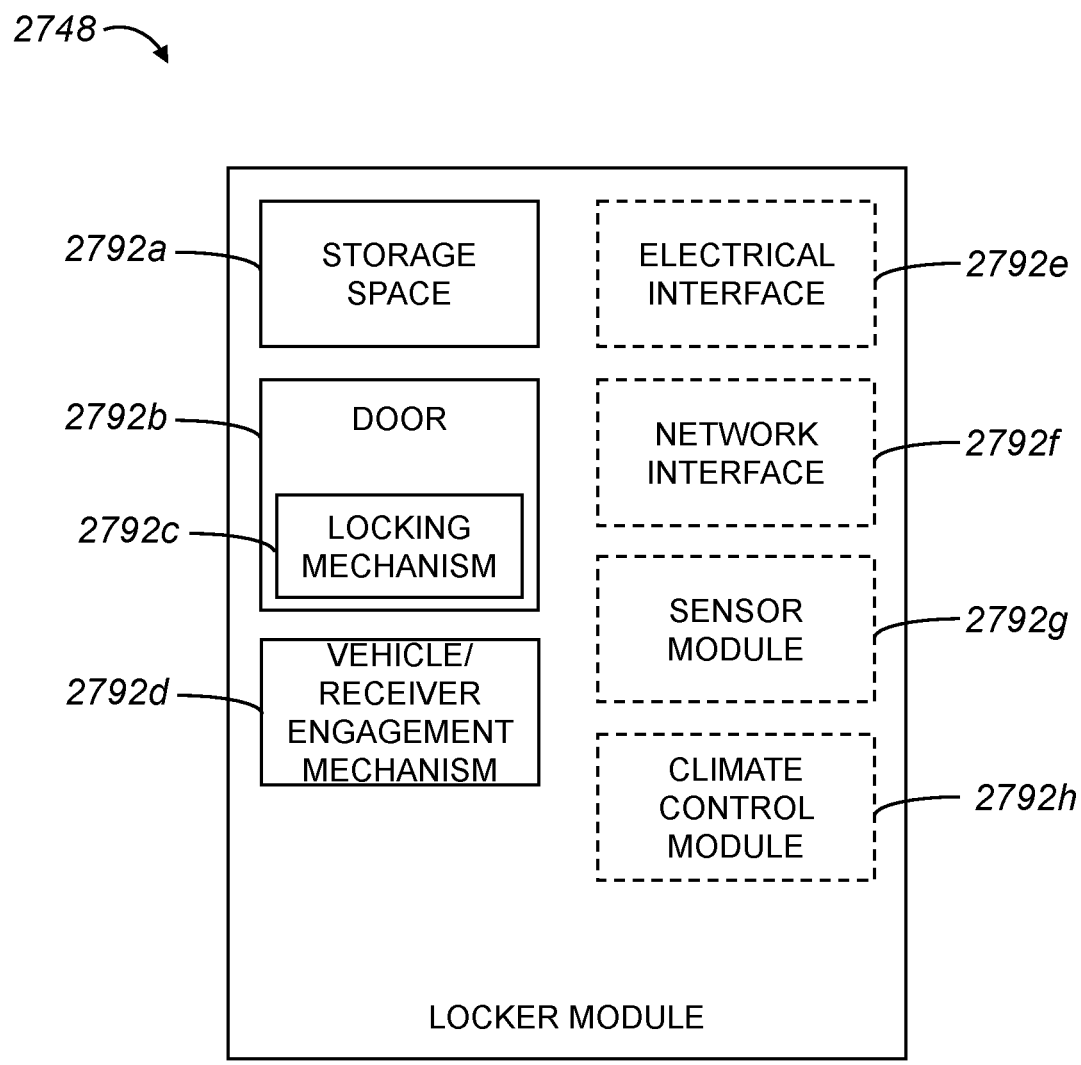
FIG. 27 is a block diagram representation of a locker module in accordance with an embodiment.

With reference to FIG. 27, a locker module will be described in accordance with an embodiment. A locker module 2748 generally includes a storage space 2792a in which one or more items may be placed. Storage space 2792a may be defined by walls of locker module 2748, which include a door 2792b or a cover which, when open, allows access to storage space 2792a. Door 2792 includes a locking mechanism 2792c which allows door 2792 to be locked and, as such, contents of storage space 2792a to be protected. Locking mechanism 2792c may include, but is not limited to including, a mechanical lock, an electromechanical lock, and/or a mechanical lock which may be locked and unlocked using a human machine interface (HMI). Locking mechanism 2792c may be substantially tamper-proof.

Locker module 2748 also includes a vehicle/receiver engagement mechanism 2792d. Engagement mechanism 2792d is generally configured to enable locker module 2748 to engage with a vehicle in which locker module may be transported, and to enable locker module 2748 to engage with a receiver. Engagement mechanism 2792d may include, but is not limited to including, mechanical components which enable engagement mechanism 2792d to couple with a vehicle and/or a receiver. By way of example, engagement mechanism 2792d may include a male portion of a physical connector that may engage with a female portion included in a vehicle and/or a female portion included in a receiver.

Locker module 2748 may also include an optional electrical interface 2792e, an optional network or communications interface 2892f, an optional sensor module 2702g, and/or an optional climate control module 2792g. Optional electrical interface 2702e may provide electrical power or electricity that may be used to power components within locker module 2748 including, but not limited to including, network interface 2792f, sensor module 2792g, and/or climate control module 2792h. Optional electrical interface 2702e may be a battery or an interface configured to enable locker module 2748 to draw electrical power from an external source such as a when locker module 2748 is onboard the vehicle or a receiver when locker module 2748 is on or in a receiver.

Optional network interface 2792f may include one or more communications ports which enables locker module 2748 to share information on a network, as for example a wireless network. Optional network interface 2792f may enable locker module 2748 to obtain commands which control optional sensor module 2792g and/or optional climate control module 2792h.

Optional sensor module 2792g may be commanded via optional network interface 2792f to share sensor data, to obtain sensor data, and to change parameters associated with optional sensor module 2792g. Optional sensor module

2792g may include, but are not limited to including, temperature sensors, cameras, weight sensors, humidity sensors, and the like.

Optional climate control module 2792h may be commanded via optional network interface 2792f to alter climate conditions within storage space 2792a. For example, climate control module 2792h may use commands obtained from a fleet management system, from a retailer, and/or from a customer, as well as data from optional sensor module 2792g, to set climate conditions. In one embodiment, optional climate control module 2792h may be a refrigeration system, a freezer system, or an oven. That is, locker module 2748 may be a refrigerated module, a freezer module, or an oven module.

Although only a few embodiments have been described in this disclosure, it should be understood that the disclosure may be embodied in many other specific forms without departing from the spirit or the scope of the present disclosure. By way of example, while a vehicle that is configured to perform unattended deliveries has generally been described as an autonomous vehicle, any suitable vehicle may be configured to perform unattended deliveries. A vehicle driven by a driver may include mechanisms, such as the mechanisms described above, which allow deliveries to be made without physical participation from the driver. In other words, a non-autonomous vehicle may include mechanisms that automatically unload goods from the vehicle.

In some embodiments, even when a customer is available to receive the delivery of an item from a delivery vehicle, the delivery may still occur substantially without physical intervention from the customer. That is, a delivery that is effectively supervised or otherwise observed by a customer may be considered to be unattended if the customer does not physically assist with completing the delivery. For instance, when an item being delivered is heavy and/or cumbersome, a customer may prefer to have the item substantially autonomously unloaded from a delivery vehicle and loaded onto a mobile locker for transport such that it is not necessary for the customer to physically carry the item. That is, mechanisms as described above may be used even when a customer is physically available to receive delivery.

A delivery vehicle and a receiver apparatus may generally meet to exchange an item or a good at any suitable location. As described above, such a location may be a hand-off location at which an item is transferred, and may generally be associated with a customer location or site. Such a location may be a substantially fixed point, e.g., a specific spot at an overall customer location at which substantially all deliveries to the customer are delivered. When a return is to be processed, a substantially fixed point may be a specific spot at an overall customer location at which substantially all returns from the customer are picked up or otherwise acquired. It should be appreciated that a location may specified by a customer, and may be specific to a particular delivery or return pick-up.

While a receiver apparatus has been described as an apparatus that is configured to receive deliveries of items and to temporarily store items to be returned, it should be understood that a receiver apparatus may be any apparatus that may hold or otherwise support a delivered item or a return item. A receiver apparatus may either be a dedicated receiver apparatus, i.e., an apparatus that is substantially only used to receive deliveries and/or to assist with returns, or an apparatus that may be used for multiple purposes, e.g., a car. Receiver apparatuses may include, but are not limited to including a bin such as a bin with an opening at the top, a platform that is lined with memory foam, an elevating platform, a vehicle such as a car, and/or a standard mailbox used by the U.S. Postal Service to deliver U.S. Mail. A standard mailbox, as will be appreciated by those skilled in the art, may be sized fixed to a location.

A receiver apparatus has generally been described as including a transfer mechanism that allows the receiver apparatus to participate in the active unloading of a delivered item from a delivery vehicle and/or to participate in the active loading of a returned item onto the delivery vehicle. It should be understood, however, that a receiver apparatus may instead be passive, and may not include a transfer mechanism without departing from the spirit or the scope of the disclosure.

In one embodiment, in order for a delivery vehicle to interface with a receiver apparatus such that an item may be transferred therebetween, the vertical positioning of at least one of the delivery vehicle and the receiver apparatus may be adjusted to facilitate the transfer of the item. For example, if a compartment on a delivery vehicle is at a height that is higher than the height of a receptacle on a receiver apparatus, the receiver apparatus may be raised to bring the height of the receptacle up to approximately the height of the delivery vehicle. Any suitable mechanism may be used to adjust the height of a receiver apparatus. Suitable mechanisms include, but are not limited to including, hydraulic mechanisms and mechanical lifts.

Items to be delivered may be contained within inserts loaded into compartments of a vehicle. For example, a pizza may be held in an oven insert that is positioned in a compartment of a vehicle and ice cream may be held in a freezer insert that is positioned in a compartment of a vehicle. When items are contained within inserts, transfer mechanisms may be arranged to essentially open the inserts as a part of a process of unloading the items.

As mentioned above, prior to executing an unattended delivery or pick-up, it may be determined whether it is safe for the unattended delivery or pick-up to occur. Any number of factors may be used to determine whether it is safe and, thus, prudent to perform an unattended delivery or pick-up. For example, sensors on a vehicle and/or a receiver apparatus may verify an address on a building at a hand-off location, verify license plate numbers on vehicles at the hand-off location, detect the presence of humans near the hand-off location, detect the presence of animals near the hand-off location, etc. In one embodiment, sensors on a vehicle and/or a receiver apparatus may include cameras, motion sensors, and/or microphones. Data from such sensors may be used by the vehicle and/or receiver apparatus to assess safety. Alternatively, the data from such sensors may be provided to a human, e.g., a remote operator who may take over operation of the vehicle using a remote control or a teleoperations system, such that the human may determine a safety level and approve the unattended delivery or pick-up.

Examples of transfer mechanisms have been described above. It should be appreciated that many other suitable transfer mechanisms may be used to facilitate unattended deliveries and pickups. For example, a transfer mechanism may take the form of a vehicle or mobile device that may be deployed from a compartment of a delivery vehicle. In one embodiment, a transfer mechanism in a compartment may be a drone that is equipped with a grip such as a claw or a suction grip, and is arranged to be released from, disgorged from, and/or ejected from the compartment to deliver an item held in the grip of the drone. Such a drone may return to the compartment when the delivery of the item is complete. In another embodiment, a transfer mechanism may be a mini tank robot or a humanoid robot that is configured to be released from a compartment of a delivery vehicle, and to traverse residential terrains in order to deliver an item.

A receiver apparatus may be configured to be tamper proof. For example, a receiver apparatus may be arranged to sound an alarm or to spray a substances when unauthorized access or tampering is detected.

In one embodiment, a compartment of an autonomous vehicle may be arranged as a sanitizing compartment. By way of example, the compartment may include a reservoir which contains a sanitizing or disinfecting liquid, and a dispensing mechanism which is arranged to spray the liquid over an item in the compartment to sanitize the item. Such a sanitization process may be substantially triggered when a door of the compartment is closed. In another embodiment, a compartment insert of an autonomous vehicle may be arranged as a sanitizing insert, or may include a sanitizing capability, that causes a sanitizing or disinfecting liquid to be sprayed over an item placed in the compartment and/or the compartment insert.

A compartment of an autonomous vehicle may, in one embodiment, be a sanitizing chamber that has the capability to cause UV rays to sanitize items in the compartment. The UV rays may be activated upon closure of a door to the compartment. In another embodiment, a compartment insert may be a sanitizing chamber.

In addition to, or in lieu of, a compartment of an autonomous vehicle having sanitization capabilities, a receiver apparatus may include sanitizing capabilities. Such sanitizing capabilities may include, but are not limited to including, applying UV rays to sanitize items in a receptacle of a receiver apparatus and/or dispensing a sanitizing or disinfecting liquid to sanitize the items. In one embodiment, an owner of a receiver apparatus may activate a sanitization process prior to accesses a receptacle of the receiver apparatus.

During an unattended delivery, a customer may wish to effectively watch the delivery, as for example for security purposes and/or to confirm that a delivery has occurred. As such, cameras on a delivery vehicle may be used to provide a customer with video and/or still images as a delivery is in progress. Such images may be transmitted, but are not limited to being transmitted, using network communications from the delivery vehicle substantially directly to the customer, or from the delivery vehicle to the customer indirectly via a fleet management system or a retailer. In one embodiment, images may be obtained by a camera at a delivery location, such as a camera mounted on a receiver, and provided to a customer by the camera.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. By way of example, while a method of delivering goods in a locker module to a delivery location has been described as including substantially picking up an empty locker module from the delivery location, it should be understood that a locker picked up at a delivery location is not limited to being empty. A locker picked up at a delivery location may, in one embodiment, include an item such as a return item. Therefore, the present examples are to be considered as illustrative and not restrictive, and the examples are not to be limited to the details given herein, but may be modified within the scope of the appended claims.

What is claimed is:

1. A method comprising:
   propelling a vehicle to a location, wherein the vehicle is an autonomous vehicle, the vehicle including at least one compartment and a propulsion system configured to propel the vehicle, the at least one compartment configured to contain at least one delivery item and at least one transfer mechanism, the transfer mechanism arranged to be activated to cause the delivery item to be purged from the at least one compartment, the transfer mechanism including a transfer surface, a linear force mechanism, and a linear force actuator, the linear force mechanism and the linear force actuator being disposed on the transfer surface;
   determining, after the vehicle arrives at the location, whether a delivery of the delivery item at the location is authorized, wherein determining whether the delivery of the delivery item at the location is authorized includes the vehicle communicating with a customer associated with the location to obtain permission to complete the delivery of the delivery item without the customer being physically present at the location;
   opening a door to the at least one compartment at the location when it is determined that the delivery of the delivery item at the location is authorized;
   at the location, aligning the vehicle with respect to a target after opening the door at the location, the target being arranged to receive the delivery item when the delivery item is purged from the at least one compartment, wherein aligning the vehicle with respect to the target includes autonomously propelling the vehicle; and
   after opening the door to the at least one compartment at the location, activating the transfer mechanism, wherein activating the transfer mechanism includes causing the transfer mechanism to purge the delivery item from the at least one compartment such that the delivery item is obtained by the target.

2. The method of claim 1 wherein the target is stationary, and wherein aligning the vehicle with respect to the target after opening the door at the location includes adjusting a relative positioning between the vehicle and the target such that the target is aligned along at least one axis with the at least one compartment.

3. The method of claim 2 wherein the transfer mechanism includes a transfer surface on which the delivery item is carried, and wherein aligning the vehicle with respect to the target further includes adjusting the relative positioning between the vehicle and the target such that the target is aligned along the at least one axis with the transfer surface.

4. The method of claim 3 wherein the linear force mechanism is configured to push the delivery item on the transfer surface to purge the delivery item from the at least one compartment, and wherein activating the transfer mechanism includes causing the transfer surface to tilt to create a sloped transfer surface and causing the linear force mechanism to push the delivery item on the sloped transfer surface to purge the delivery item from the at least one compartment.

5. The method of claim 3 wherein the target is a receiver, the receiver including a receptacle configured to receive the delivery item when the delivery item is purged from the at least one compartment by the transfer mechanism, and wherein aligning the vehicle with respect to the target includes adjusting the relative positioning in a horizontal direction and in a vertical direction.

6. The method of claim 1 wherein the target includes at least one sensor fiducial and the vehicle includes at least one sensor, wherein aligning the vehicle with respect to the target includes utilizing the at least one sensor and the at least one sensor fiducial.

7. The method of claim 1 further including:
determining when the delivery item is obtained by the target;
determining whether there is a pickup item at the location, wherein determining whether there is a pickup item at the location occurs at the location;
when it is determined that there is a pickup item at the location, retrieving the pickup item from the location, wherein retrieving the pickup item includes loading the pickup item into the at least one compartment;
when it is determined that the delivery item is obtained by the target, deactivating the transfer mechanism;
after deactivating the transfer mechanism, closing the door to the at least one compartment, wherein when it is determined that there is a pickup item at the location, closing the door to the at least one compartment occurs after loading the pickup item into the at least one compartment; and
propelling the vehicle away from the location.

8. The method of claim 7 wherein retrieving the pickup item from the location includes retrieving the pickup item from the target.

9. A method comprising:
opening at least one compartment of a vehicle at a delivery location, the vehicle including a propulsion system configured to propel the vehicle, the at least one compartment configured to contain at least one delivery item and at least one transfer mechanism, the transfer mechanism arranged to be activated to cause the delivery item to be transferred out of the at least one compartment, wherein the transfer mechanism includes a transfer surface, a linear force mechanism, and a linear force actuator, the linear force mechanism and the linear force actuator being disposed on the transfer surface;
autonomously aligning the vehicle with respect to a target after opening the at least one compartment at the delivery location, the target being located at the delivery location and stationary, wherein autonomously aligning the vehicle with respect to the target includes adjusting a position of the vehicle to align with the target along a horizontal axis and a vertical axis; and
activating the transfer mechanism after opening the at least one compartment and after autonomously aligning the vehicle with respect to the target, wherein activating the transfer mechanism includes causing the transfer mechanism to transfer the delivery item from the at least one compartment such that the delivery item is transferred from the at least one compartment to the target.

10. The method of claim 9 wherein the transfer mechanism includes a transfer surface on which the delivery item is carried, and wherein autonomously aligning the vehicle with respect to the target further includes adjusting the relative positioning between the vehicle and the target such that the target is aligned along the horizontal axis and the vertical axis with the transfer surface.

11. The method of claim 10 wherein the transfer mechanism further includes a linear force mechanism, where the linear force mechanism is configured to push the delivery item on the transfer surface to transfer the delivery item from the at least one compartment.

12. The method of claim 11 wherein activating the transfer mechanism includes causing the transfer surface to tilt to create a sloped transfer surface and causing the linear force mechanism to push the delivery item on the sloped transfer surface to transfer the delivery item from the at least one compartment.

13. The method of claim 9 wherein the target includes at least one sensor fiducial and the vehicle includes at least one sensor, wherein autonomously aligning the vehicle with respect to the target includes utilizing the at least one sensor and the at least one sensor fiducial.

14. The method of claim 9 wherein the transfer mechanism further includes a transfer surface, a transfer surface actuator, a linear farce mechanism, and a linear force actuator, the linear force mechanism and the linear force actuator being disposed on the transfer surface.

15. The method of claim 14 wherein the transfer surface is arranged to support the delivery item, the transfer surface actuator is arranged to tilt the transfer surface such that the transfer surface is sloped, and the linear force actuator is configured to apply a first force to the linear force mechanism to cause the linear force mechanism to apply a second force to the delivery item to push the delivery item along the transfer surface.

16. The method of claim 9 wherein the delivery item is contained in a first secured locker when the delivery item is transferred from the at least one compartment by the transfer mechanism, the first secured locker is transferred from the at least one compartment, and wherein the pickup item is a second secured locker and transferring the pickup item from the receiver to the at least one compartment includes transferring the second secured locker from the receiver to the at least one compartment.

17. A vehicle comprising:
a propulsion system, the propulsion system configured to enable the vehicle to drive; and
at least one compartment having a first compartment door, a first locker module slot, and a second locker module slot, the at least one compartment configured to contain at least a first locker containing a delivery item and at least one transfer mechanism, the first locker module slot arranged to hold the first locker, the transfer mechanism arranged to be activated to cause the first locker to be purged from the at least one compartment when the first compartment door is open, wherein the transfer mechanism includes a transfer surface, a transfer surface actuator configured to pivot the transfer surface, a linear force mechanism, and a linear force actuator, the linear force mechanism and the linear force actuator being disposed on the transfer surface, and wherein the first locker is situated on the transfer surface and is arranged to be purged from the at least one compartment using the transfer mechanism, the transfer mechanism further arranged to be activated to cause a second locker to be onboarded into the at least one compartment when the first compartment door is open, the second locker module slot arranged to hold the second locker.

18. The vehicle of claim 17 wherein the transfer surface is arranged to support the first locker, the transfer surface actuator is arranged to tilt the transfer surface such that the transfer surface is sloped, and the linear force actuator is configured to apply a first force to the linear force mechanism to cause the linear force mechanism to apply a second force to the first locker to push the first locker along the transfer surface and out of the at least one compartment.

19. The vehicle of claim 18 further including:
at least one sensor arranged to determine a position of the at least one compartment relative to a target, the at least sensor configured to cooperate with the propulsion system to enable the propulsion system to autonomously align the at least one compartment with the target, the target having a target surface, wherein the propulsion system is configured to autonomously align the transfer surf ace and the target surface such that the transfer surface and the target surface are in a same plane, and wherein the linear force mechanism is configured to push the first locker out of the at least one compartment and onto the target surface.

\* \* \* \* \*